United States Patent [19]

Sokoloff

[11] 3,725,869

[45] Apr. 3, 1973

[54] COMPUTER DEVICE

[76] Inventor: Boris Alexandre Sokoloff, 4, rue Boris Vilde, Fontenay-aux-Roses, France

[22] Filed: Nov. 23, 1970

[21] Appl. No.: 92,117

[52] U.S. Cl. ................340/172.5, 235/154, 235/168

[51] Int. Cl. ............................G06f 7/38, G06f 13/06

[58] Field of Search ............340/172.5; 235/154, 168

[56] References Cited

UNITED STATES PATENTS

| | | | |
|---|---|---|---|
| 3,354,296 | 11/1967 | Horwitz et al. | 235/154 |
| 3,293,616 | 12/1966 | Mullery et al. | 340/172.5 |
| 3,047,228 | 7/1962 | Bauer et al. | 340/172.5 X |
| 3,200,379 | 8/1965 | King et al. | 340/172.5 |
| 3,251,042 | 5/1966 | King | 340/172.5 |
| 3,328,763 | 6/1967 | Rathbun et al. | 340/172.5 |
| 3,496,550 | 2/1970 | Schachner | 340/172.5 |
| 3,614,406 | 10/1971 | Brown | 235/168 |

*Primary Examiner*—Paul J. Henon
*Assistant Examiner*—Jan E. Rhoads
*Attorney*—Cushman, Darby and Cushman

[57] ABSTRACT

Computer device of the immediate interpretation and evaluation type, characterized by the fact that it is combined with a memory that can be used in accordance with the principles of symmetrical linking of different elements of one or several pieces of information and enabling complex expressions written in accordance with specific rules without the aid of preparation, translation or coordination programs of any kind, to be evaluated rapidly. The invention is applicable to automatic data processing.

8 Claims, 64 Drawing Figures

(SHOWN GENERALLY AT FIG. 8)

| AA | SP | D | + | - | x% | ( | ) | NL | L | & |
|---|---|---|---|---|---|---|---|---|---|---|
| DEB | SP | P | pP | pN | ERR | DPAR | ERR | ____ | | FNOM |
| SP | SP | P | pP | pN | ERR | DPAR | ERR | ____ | | FNOM |
| pP | pP | P | ERR | ERR | ERR | ERR | ERR | ERR | ERR | ERR |
| pN | pN | N | ERR | ERR | ERR | ERR | ERR | ERR | ERR | ERR |
| P | C | P | BP | BP | BP | ERR | FPAR | IMP | ERR | DNOM |
| N | C | N | BP | BP | BP | ERR | FPAR | IMP | ERR | DNOM |
| C | C | ERR | BP | BP | BP | ERR | FPAR | IMP | ERR | DNOM |
| BP | BP | B | pB | nB | ERR | DPAR | ERR | ERR | NOM | ERR |
| pB | pB | B | ERR | ERR | ERR | ERR | ERR | ERR | ERR | ERR |
| nB | nB | B | ERR | ERR | ERR | ERR | ERR | ERR | ERR | ERR |
| B | UA | B | UA | UA | UA | ERR | UA | UA | ERR | UA |

Fig. 15

Fig. 17 (CONT. FROM FIG. 1G)

| | B7 | B6 | B5 | B4 | B3 | B2 | B1 | | |
|---|---|---|---|---|---|---|---|---|---|
| | 0 | 0 | 0 | 0 | 0 | 0 | 0 | $\bar{7}\bar{6}\bar{5}\bar{4}\bar{3}\bar{2}\bar{1}$ | (F0) |
| SP | 0 | 1 | 0 | 0 | 0 | 0 | 0 | $\bar{7}6\bar{5}\bar{4}\bar{3}\bar{2}\bar{1}$ | (F1) |
| NL | 0 | 0 | 0 | 1 | 0 | 1 | 0 | $\bar{7}\bar{6}\bar{5}4\bar{3}2\bar{1}$ | (F2) |
| + | 0 | 1 | 0 | 1 | 0 | 1 | 1 | $\bar{7}6\bar{5}4\bar{3}21$ | (F3) |
| − | 0 | 1 | 0 | 1 | 1 | 0 | 1 | $\bar{7}6\bar{5}43\bar{2}1$ | (F4) |
| × | 0 | 1 | 0 | 1 | 0 | 1 | 0 | $\bar{7}6\bar{5}4\bar{3}2\bar{1}$ | (F5) |
| / | 0 | 1 | 0 | 1 | 1 | 1 | 1 | $\bar{7}6\bar{5}4321$ | (F6) |
| ( | 0 | 1 | 0 | 1 | 0 | 0 | 0 | $\bar{7}6\bar{5}4\bar{3}\bar{2}\bar{1}$ | (F7) |
| ) | 0 | 1 | 0 | 1 | 0 | 0 | 1 | $\bar{7}6\bar{5}4\bar{3}\bar{2}1$ | (F8) |
| & | 0 | 1 | 0 | 0 | 1 | 1 | 0 | $\bar{7}6\bar{5}\bar{4}32\bar{1}$ | (F9) |
| 0 | 0 | 1 | 1 | 0 | 0 | 0 | 0 | | |
| 1 | 0 | 1 | 1 | 0 | 0 | 0 | 1 | | |
| 2 | 0 | 1 | 1 | 0 | 0 | 1 | 0 | | |
| 3 | 0 | 1 | 1 | 0 | 0 | 1 | 1 | | |
| 4 | 0 | 1 | 1 | 0 | 1 | 0 | 0 | $\bar{7}65\bar{4} \vee \bar{7}65\bar{3}\bar{2}$ | (F10) |
| 5 | 0 | 1 | 1 | 0 | 1 | 0 | 1 | | |
| 6 | 0 | 1 | 1 | 0 | 1 | 1 | 0 | | |
| 7 | 0 | 1 | 1 | 0 | 1 | 1 | 1 | | |
| 8 | 0 | 1 | 1 | 1 | 0 | 0 | 0 | | |
| 9 | 0 | 1 | 1 | 1 | 0 | 0 | 1 | | |
| A | 1 | 0 | 0 | 0 | 0 | 0 | 1 | | |
| B | 1 | 0 | 0 | 0 | 0 | 1 | 0 | | |
| C | 1 | 0 | 0 | 0 | 0 | 1 | 1 | | |
| – | – | – | – | – | – | – | – | $7\bar{6}\bar{5}1 \vee 7\bar{6}\bar{5}2 \vee 7\bar{6}\bar{5}3 \vee 7\bar{6}\bar{5}4 \vee 7\bar{6}5\bar{4} \vee 7\bar{6}5\bar{3}\bar{2} \vee 7\bar{6}5\bar{3}\bar{1}$ | (F11) |
| P | 1 | 0 | 1 | 0 | 0 | 0 | 0 | | |
| Q | 1 | 0 | 1 | 0 | 0 | 0 | 1 | | |
| R | 1 | 0 | 1 | 0 | 0 | 1 | 0 | | |
| – – | – | – | – | – | – | – | – | | |
| Z | 1 | 0 | 1 | 1 | 0 | 1 | 0 | | |

| | | | | |
|---|---|---|---|---|
| | 0 | 0 | 0 | 0 |
| DEB | 0 | 0 | 0 | 1 |
| SP | 0 | 0 | 1 | 0 |
| pP | 0 | 0 | 1 | 1 |
| pN | 0 | 1 | 0 | 0 |
| P | 0 | 1 | 0 | 1 |
| N | 0 | 1 | 1 | 0 |
| C | 0 | 1 | 1 | 1 |
| BP | 1 | 0 | 0 | 0 |
| pB | 1 | 0 | 0 | 1 |
| nB | 1 | 0 | 1 | 0 |
| B | 1 | 0 | 1 | 1 |

Fig. 21

Fig. 23

| | RAA \ L4 | SP F1 | D F10 | + F3 | − F4 | × F5 | % F6 | ( F7 | ) F8 | NL F2 | ∠ F11 | & F9 |
|---|---|---|---|---|---|---|---|---|---|---|---|---|
| | 0000 | | | | | | | | | | | |
| DEB | 0001 | 0010 | 0101 | 0011 | 0100 | ERR | ERR | DPAR | ERR | 0000 | NOM | FNOM |
| SP | 0010 | 0010 | 0101 | 0011 | 0100 | ERR | ERR | DPAR | ERR | 0000 | NOM | FNOM |
| pP | 0011 | 0011 | 0101 | ERR | ERR | ERR | ERR | ERR | ERR | ERR | ERR | ERR |
| pN | 0100 | 0100 | 0110 | ERR | ERR | ERR | ERR | ERR | ERR | ERR | ERR | ERR |
| P | 0101 | 0111 | 0101 | 1000 | 1000 | 1000 | 1000 | ERR | FPAR | IMP | ERR | DNOM |
| N | 0110 | 0111 | 0110 | 1000 | 1000 | 1000 | 1000 | ERR | FPAR | IMP | ERR | DNOM |
| C | 0111 | 0111 | ERR | 1000 | 1000 | 1000 | 1000 | ERR | FPAR | IMP | ERR | DNOM |
| BP | 1000 | 1000 | 1011 | 1001 | 1010 | ERR | ERR | DPAR | ERR | ERR | NOM | ERR |
| pB | 1001 | 1001 | 1011 | ERR | ERR | ERR | ERR | ERR | ERR | ERR | ERR | ERR |
| nB | 1010 | 1010 | 1011 | ERR | ERR | ERR | ERR | ERR | ERR | ERR | ERR | ERR |
| B | 1011 | UA | 1011 | UA | UA | UA | UA | ERR | UA | UA | ERR | UA |

FROM FIG. 28a

```
30    EL4←0101101
31    ECG
32    CA←L1  ←――――  19    7-4
33    LR1
34    CA←E
35    LR2
36    H1
37    CA←000
38    LEG
39    CA←L1
40    LR1
41    CA←K
42    LR2
43    H1
44    UAA←0; DEB; CA←E
```

Fig. 28b

```
DPAR ――→ 0    EL3←E; EE←AD; PARA←1
         1    ECG
         2    DEB; PARA←0

F PAR ――→ 0   EL4←0100000; EX←AD
          1   ECG
          2   CA←E
          3   LEG
          4   EE←L3; EOP2←X; L4=0101000? ――→ ERR
          5   EL4←0100000
          6   ECG
          7   DEB; PARA←0; CA←E
```

Fig. 24

| TO[1] | TO[2] | TO[3] | TO[4] | MIN | | |
|---|---|---|---|---|---|---|
| 0 | 0 | 0 | 0 | 0 | + | |
| 0 | 0 | 0 | 1 | 1 | diff(1) | A-B |
| 0 | 0 | 1 | 0 | 1 | diff(1) | A-B |
| 0 | 0 | 1 | 1 | 0 | + | |
| 1 | 0 | 0 | 0 | 1 | diff(1) | |
| 1 | 0 | 0 | 1 | 0 | − | B-A |
| 1 | 0 | 1 | 0 | 0 | − | B-A |
| 1 | 0 | 1 | 1 | 1 | diff(1) | |

A
B
diff(1)

$ERAA[1] \leftarrow (F1)\,1\bar{2}(\bar{3} \vee \bar{4}) \vee (F3 \vee F4 \vee F5 \vee F6)\,\bar{1}2\,(3 \vee 4) \vee (F3 \vee F4)\,1\bar{2}\bar{3}\bar{4} \vee$ $ERAA[2] \leftarrow (F1)\,\bar{1}2 \vee (F4)\,\bar{1}\bar{2}\,(3\bar{4} \vee \bar{3}4) \vee (F10)\,\bar{1}(\bar{3}4 \vee 3\bar{4} \vee 2\bar{3}) \vee B$ $ERAA[3] \leftarrow (F1)\,\bar{1}\,(3 \vee 4 \vee \bar{2}3\bar{4}) \vee (F4)\,1\bar{2}3\bar{4} \vee (F10)(1\bar{2} \vee \bar{1}2\bar{4}) \vee$ $ERAA[4] \leftarrow (F1)\,\bar{1}\,(23 \vee 34 \vee 42) \vee (F1)\,1\bar{2}\bar{3}4 \vee (F3)(\bar{1}2\bar{3}4 \vee \bar{1}\bar{2}3\bar{4} \vee$ $D \equiv (F1)(\bar{1}\,(2 \vee 3 \vee 4) \vee 1\bar{2}(\bar{3} \vee \bar{4})) \vee (F10)(\bar{2}(1 \vee 3 \vee 4) \vee \bar{1}2\,(\bar{3} \vee \bar{4})) \vee$ $DPAR \equiv (F7)(\,\bar{1}\bar{2}\,(3\bar{4} \vee \bar{3}4) \vee 1\bar{2}\bar{3}\bar{4})$ $FPAR \equiv (F8)\,\bar{1}2\,(3 \vee 4)$ $DNOM \equiv (F9)\,\bar{1}2\,(3 \vee 4)$ $NOM \equiv (F11)(\,1\bar{2}\bar{3}\bar{4} \vee \bar{1}\bar{2}\bar{3}4 \vee \bar{1}\bar{2}3\bar{4})$ $FNOM \equiv (F9)\,\bar{1}\bar{2}\,(3\bar{4} \vee \bar{3}4)$ $IMP \equiv (F2)\,\bar{1}2\,(3 \vee 4)$ $ERR \equiv ((F2) \vee (F9))\,(\bar{1}\bar{2}34 \vee \bar{1}\bar{2}\bar{3}\bar{4} \vee (\bar{2}3 \vee 1\bar{2}\bar{4}) \vee ((F3) \vee (F4))(\bar{1}\bar{2}34 \vee \bar{1}\bar{2}\bar{3}\bar{4} \vee$ $UA \equiv (F1 \vee F2 \vee F3 \vee F4 \vee F5 \vee F6 \vee F8 \vee F9)\,1\bar{2}34$ $LEG \equiv (1 \vee 2 \vee 3 \vee 4)$ $ETO[1] \equiv \bar{1}2\bar{3}\bar{4}$ $ETO[2] \equiv ((F5) \vee (F6))(\bar{1}2\,(\bar{3}4 \vee 3\bar{4})$ $ETO[3] \equiv ((F4) \vee (F6))(\bar{1}2\,(\bar{3}4 \vee 3\bar{4})$ $ETO[3] \equiv ((F4) \vee (F6))(\bar{1}2\,(\bar{3}4 \vee 3\bar{4})$ $ETO[4] \equiv 1\bar{2}3\bar{4}$ $EOP1 \equiv ((L1)(F10) \vee (OP1)(\overline{F10}))\,\bar{1}2\,(\bar{3}4 \vee 3\bar{4})$ $EOP2 \equiv (L1)\,1\bar{2}34$ $CAE \equiv 1234$

Fig. 38

| | | |
|---|---|---|
| 0 | 00000 | $R \leftarrow ((00000) \wedge \overline{VE}) \vee ((00001) \wedge VE)$ |
| 1 | 00001 | $R \leftarrow 00010;\ ENRA \leftarrow 1;\ CA \leftarrow 0000000$ |
| 2 | 00010 | $R \leftarrow 00011;\ LEG$ |
| 3 | 00011 | $R \leftarrow ((00011) \wedge MA) \vee ((00100) \wedge \overline{MA});\ D \leftarrow \overline{MA}$ |
| 4 | 00100 | $R \leftarrow 00101;\ LEG$ |
| 5 | 00101 | $R \leftarrow ((00101) \wedge MA) \vee ((00110) \wedge \overline{MA});\ \overline{MA} \wedge EL4 \leftarrow LMAE;\ ECG \leftarrow \overline{MA}$ |
| 6 | 00110 | $R \leftarrow ((00110) \wedge MA) \vee ((00111) \wedge \overline{MA};\ MA \wedge CA \leftarrow E;\ VER \leftarrow (L4 = 0001010)$ |
| 7 | 00111 | $R \leftarrow 01000;\ LEG$ |
| 8 | 00000 | $R \leftarrow ((01000) \wedge MA) \vee ((01001) \wedge \overline{MA});\ R \leftarrow \overline{MA}$ |
| 9 | 01001 | $R \leftarrow 01010;\ LEG$ |
| 10 | 01010 | $R \leftarrow ((01010) \wedge MA) \vee ((01011) \wedge \overline{MA});\ \overline{MA} \wedge CA \leftarrow AD$ |
| 11 | 01011 | $R \leftarrow 01100;\ LR1$ |
| 12 | 01000 | $R \leftarrow 01101;\ CA \leftarrow 00000000$ |
| 13 | 01101 | $R \leftarrow 01110;\ LEG$ |
| 14 | 01110 | $R \leftarrow ((01110) \wedge MA) \vee ((01111) \wedge \overline{MA};\ D \leftarrow \overline{MA}$ |
| 15 | 01111 | $R \leftarrow 10000;\ LEG$ |
| 16 | 10000 | $R \leftarrow ((10000) \wedge MA) \vee ((10001) \wedge \overline{MA});\ \overline{MA} \wedge CA \leftarrow AD$ |
| 17 | 10001 | $R \leftarrow 10010;\ LR2$ |
| 18 | 10110 | $R \leftarrow 10011;\ H1$ |
| 19 | 10011 | $R \leftarrow ((10011) \wedge MA) \vee ((10100) \wedge \overline{MA});\ \overline{MA} \wedge CA \leftarrow 00000000$ |
| 20 | 10100 | $R \leftarrow 10101;\ LR2$ |
| 21 | 10101 | $R \leftarrow 10110;\ H1$ |
| 22 | 10110 | $R \leftarrow ((10110) \wedge MA) \vee ((10111) \wedge \overline{MA});\ \overline{MA} \wedge ENRA \leftarrow 0$ |
| 23 | 10111 | $R \leftarrow ((10111) \wedge VE) \vee ((00000) \wedge \overline{VE})$ |

$$ER[1] \equiv (1\bar{2} \vee \bar{1}2345) \wedge (\overline{1\bar{2}345} \vee VE)$$

$$ER[2] \equiv \bar{1}((2 \wedge \overline{345}) \vee (\bar{2} \wedge 345)) \equiv \bar{1}(2345 \vee \bar{2}\,\overline{345})$$

$$ER[3] \equiv (\bar{1}(\bar{2} \vee \bar{3}) \vee 1\bar{2}3)(\bar{4} \vee \bar{5}) \vee \bar{1}(2 \vee \overline{MA})\bar{3}45 \vee 1\bar{2}((\bar{3} \wedge \overline{MA}) \vee (3 \wedge VE))45$$

$$ER[4] \equiv (1\bar{2} \vee \bar{1}2)(4\bar{5} \vee \bar{4}5) \vee \bar{1}\bar{2}\dot{4}5(\overline{MA} \vee \bar{3}) \vee \bar{2}4\bar{5}((13 \wedge VE) \vee (\bar{3} \wedge MA))$$

$$ER[5] \equiv \bar{2}\bar{5}(3\bar{4} \vee \bar{3}4) \vee \bar{1}23\bar{4}\bar{5} \vee MA \wedge (\bar{2}5(\bar{3}4 \vee 3\bar{4})) \vee (\overline{MA} \wedge (1\bar{2}\bar{3}4\bar{5} \vee \bar{1}2\bar{3}5 \vee 34\bar{5}(\bar{1} \vee \bar{2}))$$
$$\vee (VE \wedge \bar{2}(\bar{1}34\bar{5} \vee 1345)$$

$$CAAD \equiv \overline{MA}(\bar{1}24 \vee 1\bar{2}\bar{4})\bar{3}\bar{5}$$

$$CA00 \equiv \overline{MA}(1\bar{2}\bar{3}45) \vee \bar{1}4(\bar{2}\bar{3}5 \vee 23\bar{5})$$

Fig. 45

COMPUTER DEVICE

The present invention relates to a group of means intended to improve the efficiency of computer devices using coded data and recorded sequential execution programs.

It is known that computers using coded data and programs recorded in a memory with erasable recording and reading and individually addressable cells of fixed dimensions have certain characteristics leading to various disadvantages.

The chief disadvantage is the obligation to provide the said computers with operation programs such as assemblers, compilers, input-output editors, monitors, etc. whose price considerably increases the operational costs for the user.

The purpose of the present invention is to reduce the relative importance of these programs by various means.

The first important means in the present invention consists in using a memory which, by means of a suitable device satisfying for example, but not limited by, the description given in my copending U.S. Pat. application Ser. No. 39038 filed May 20, 1970, is usable as a memory with cells of dimensions adapted at each instant to the data they contain. These cells or "links" in accordance with the terminology adopted in the Pat. application No. 39038 are closed, can be read, recorded, erased in both directions and combined together or split up by means of a limited set of specialized instructions. It was stated in the same application how such an arrangement is used, in particular for the various successive conversions of the same mathematical formula. Such a use however requires the association of various other important means listed hereafter.

The second important means in the present invention consists in arranging a layer of conducting wires as an interconnecting channel to which can be connected one or several specialized sequential logic circuits including those which are themselves important means in the present invention.

The third important means in the present invention, a group of registers and specialized sequential logic circuits, connected to the interconnecting channel has the essential role of allowing data and programs typed on the key-board of a transmitter-receiver typewriter or on any other transmitter system to be recorded in the memory as well as the printing of the results by this machine or any other receiver system.

The fourth important means in the present invention is an assembly consisting of a sequential logic circuit so arranged as to detect in an expression recorded during an analysis all the variations of a simple arithmetic expression and, in combination with several registers and a mathematical unit, enables any simple arithmetic expression to be replaced by the resulting constant by the use of appropriate instructions and signals sent and received through the interconnection channel to which it is connected.

The fifth important means in the present invention is an assembly of sequential logic circuits connected to the interconnection channel so arranged as to detect any occurrence of names of variables and, by the use of appropriate instructions and signals sent and received through the interconnection channel, carries out the substitution of constants for the variable names already created and finally enables constants associated with newly produced names to be created.

The operating method of each of these means and that of their assembly and examples of their production, which are not restrictive, will be better understood by referring to the figures, schematics and tables which follow.

FIG. 1 is a generalized block diagram of a computer organized according to this invention;

FIGS. 2, 2*a* and 35 are exemplary schematic depictions of data organizations used in the chaining memory type computer used in this invention;

FIGS. 8, 9, 10, 11, 12, 13, 14, 45 and 46 are schematic diagrams and tables depicting the operation of exemplary input/output circuits of the invention;

FIGS. 15, 16, 17, 18, 19, 21, 22a, 22b, 23, 38 and 42 are exemplary schematic diagrams and tables depicting the device used for detecting arithmetic expressions and the manner in which this device is connected to the arithmetic unit;

Figure 1:
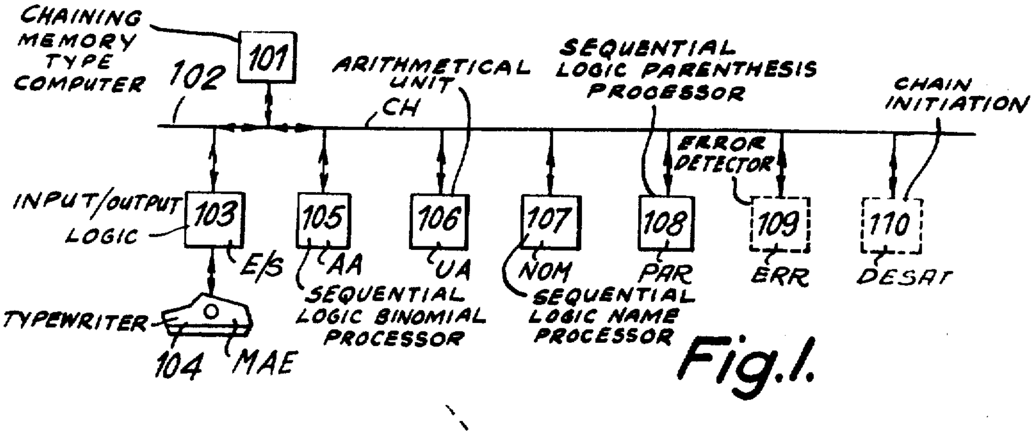
Figure 19:
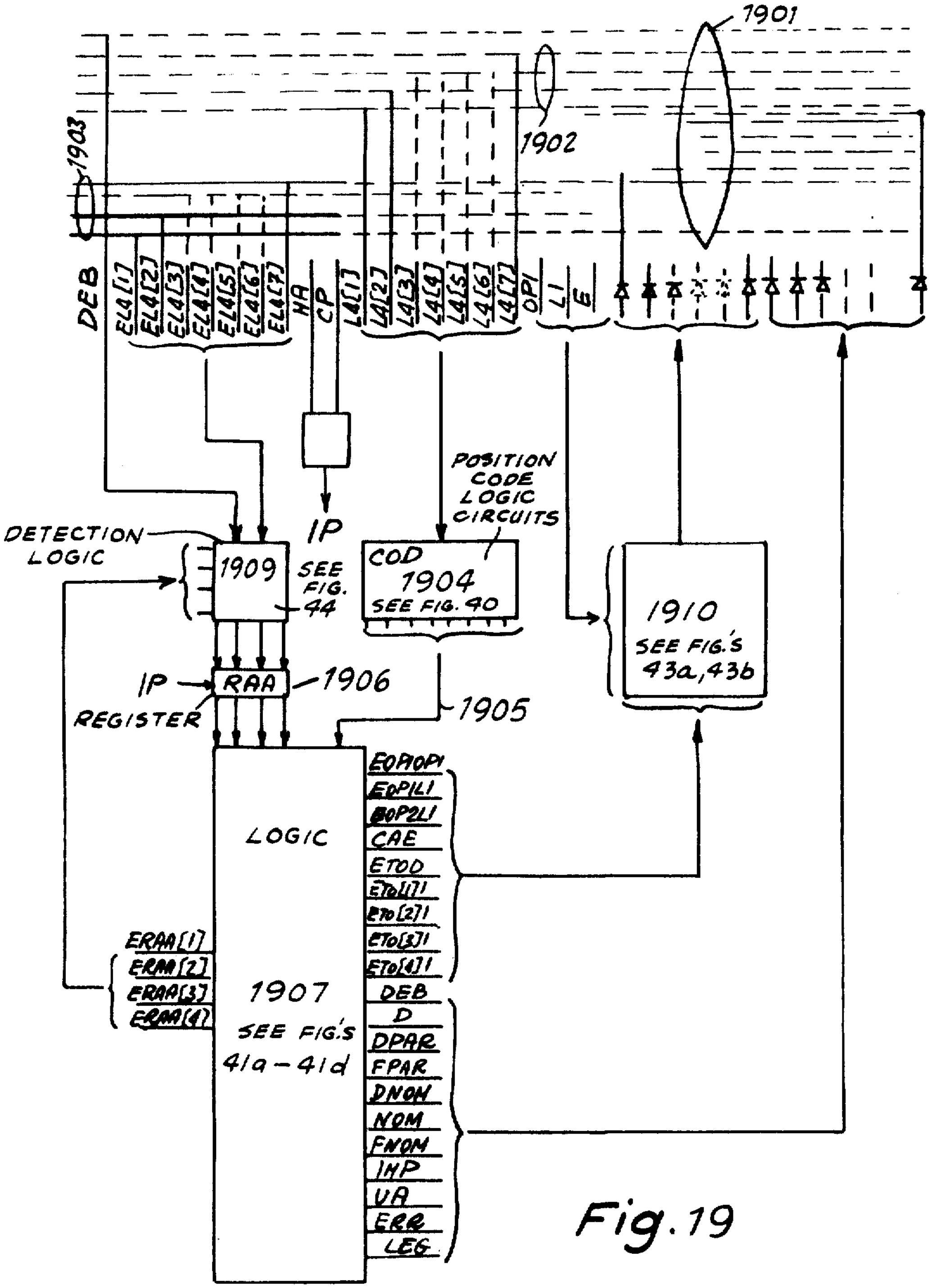
Figure 36A:
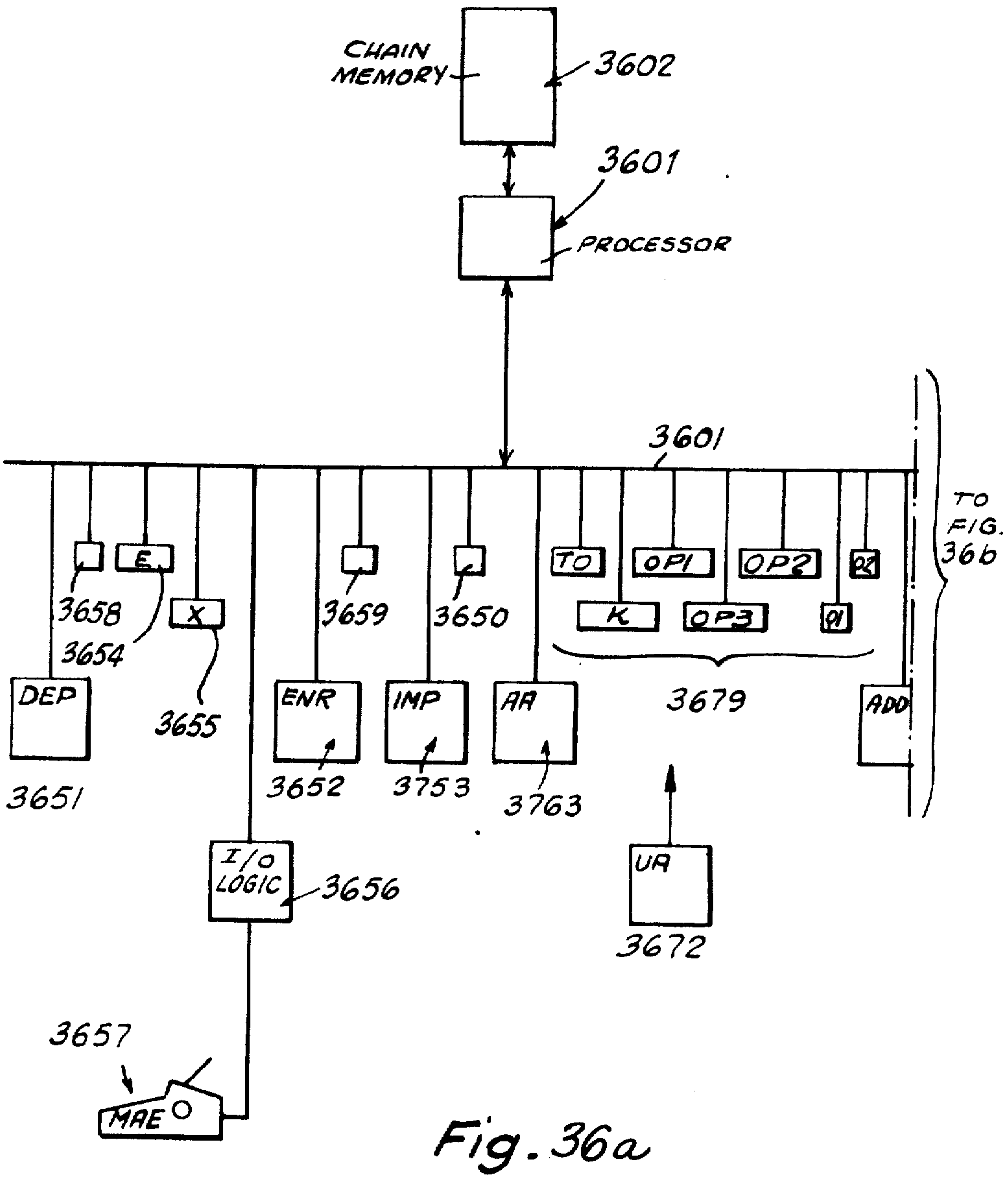
Figure 36B:
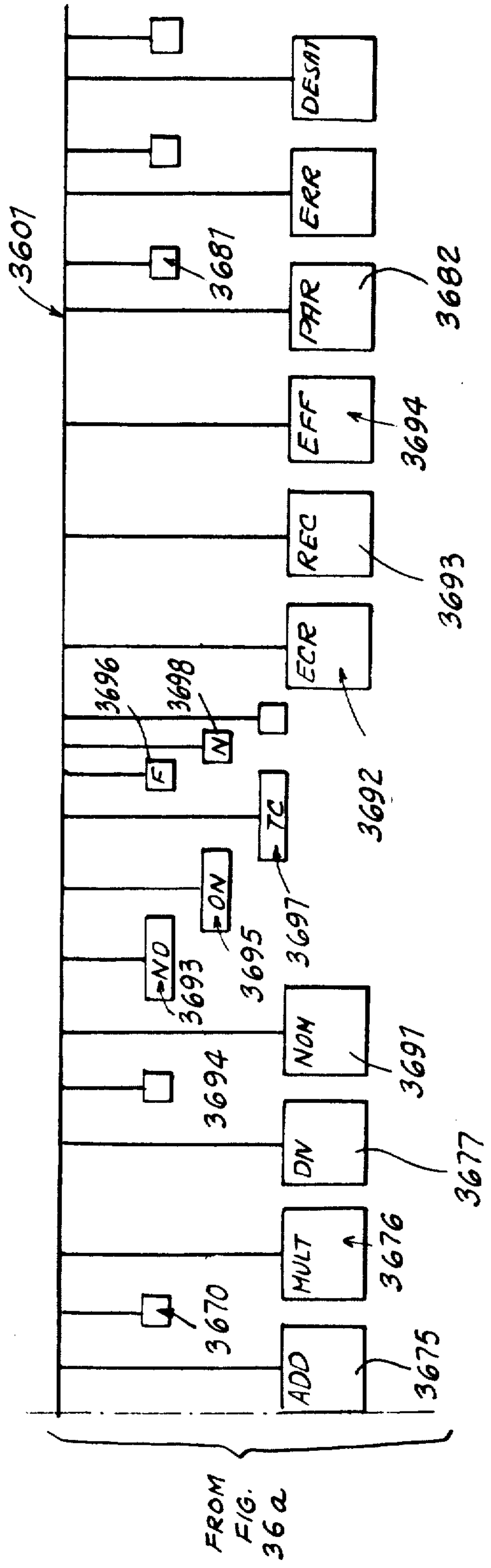
Figure 37:
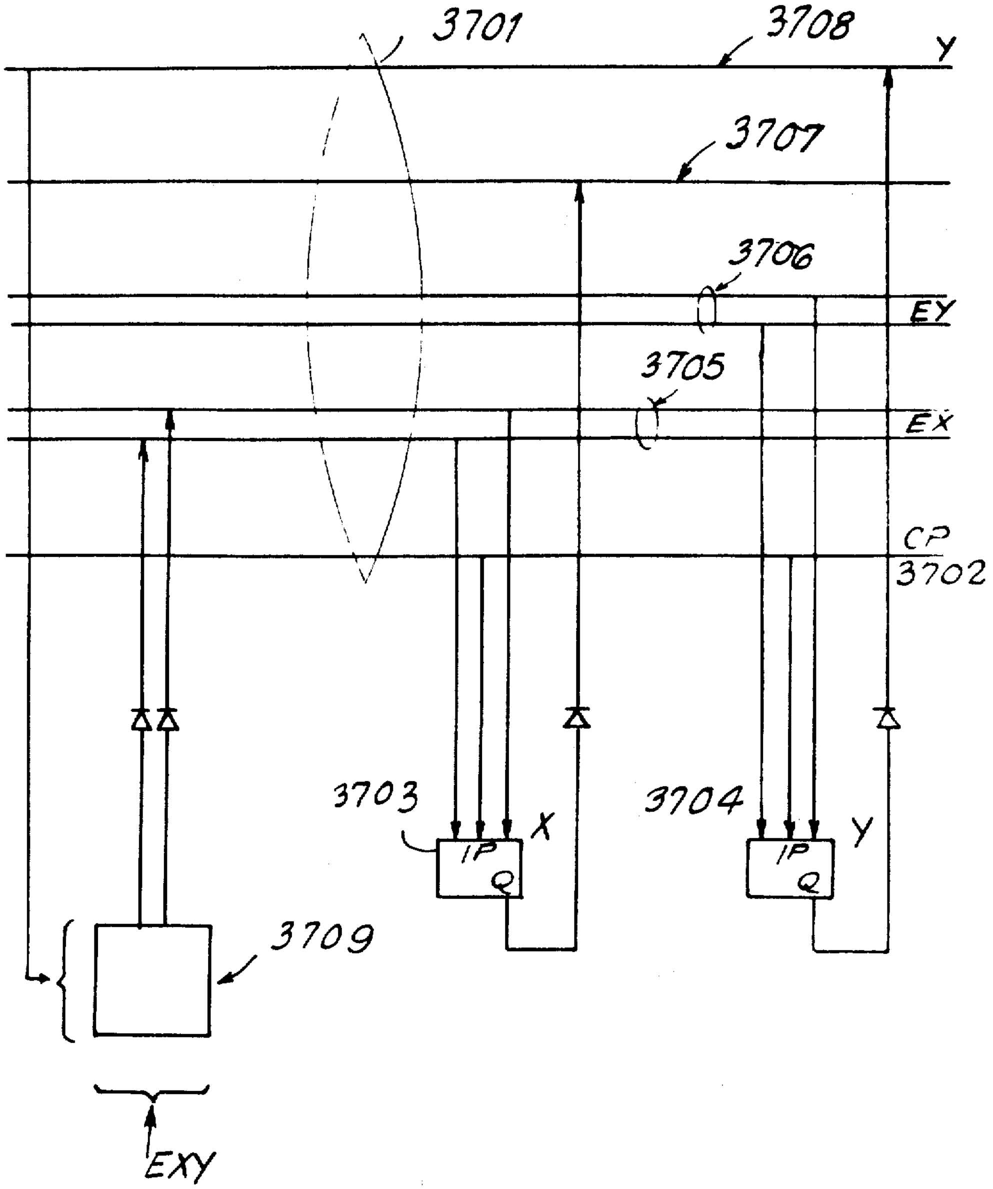
Figure 39:
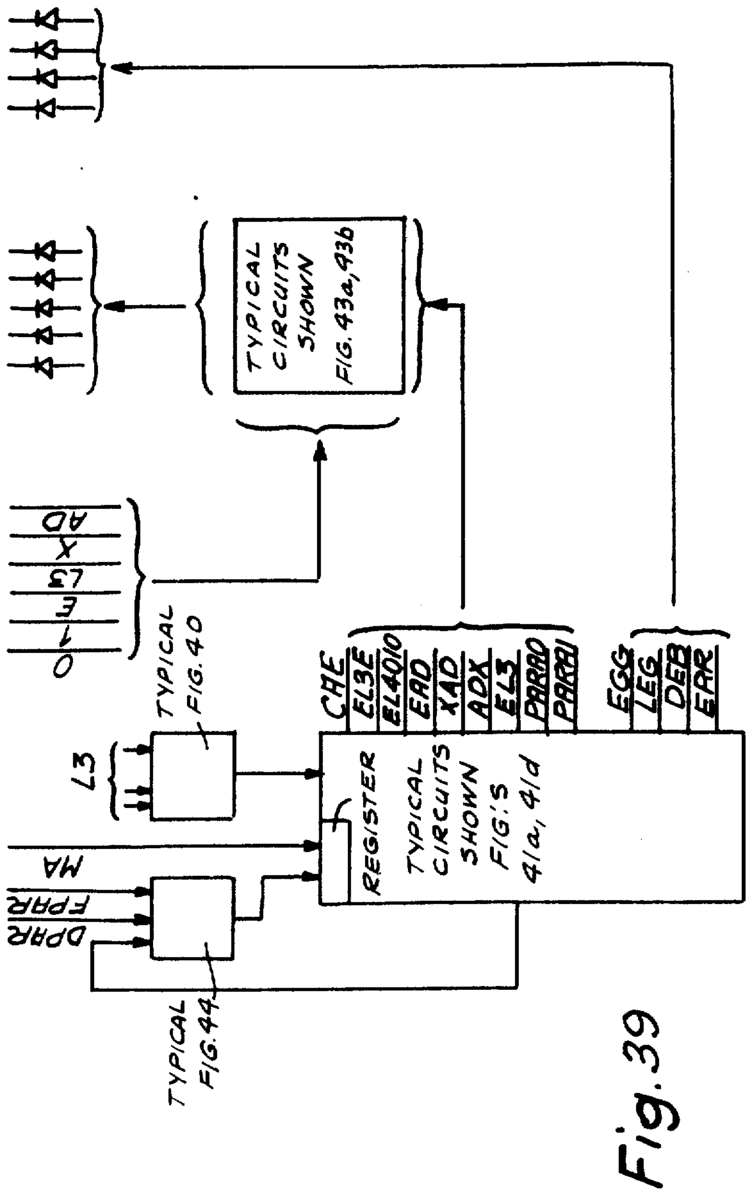

FIGS. 20, 25, 26, 27, 28*a*, 28*b*, 29, 30, 31*a*, 31*b*, 32*a* and 32*b* are exemplary schematic diagrams and tables depicting the arithmetic unit;

FIGS. 24 and 39 are exemplary schematics and tables for explaining how brackets are processed in the invention;

FIGS. 33*a*, 33*b*, 33*c*, 33*d*, 34*a*, 34*b*, 34*c*, 34*d*, 34*e* and 34*f* are exemplary schematic diagrams and tables depicting the name processor of this invention;

FIGS. 36*a*, 36*b* and 37 are more detailed general schematics of parts of the system shown in FIG. 1;

FIGS. 40, 41*a*, 41*b*, 41*c*, 41*d*, 43*a*, 43*b* and 44 are detailed schematic diagrams showing the logic circuits more generally depicted in FIG. 19 and typical of similar logic circuits generally shown in other figures.

Referring to FIG. 1, the computer device, which is the subject of the present invention results from the connection to a standardized interconnection channel 102, an important means in the invention, of a memory 101 of a "chains" computer, whose construction or operation are as in the chain's memory drawn in the Patent application No. 39038 and which is also an important means in the present invention.

A group of input-output sequential logic circuits 103, by means of an electric, transmitter-receiver typewriter 104 of the usual type, taken as a non-restrictive example, enables different mathematical expressions, at least one of which should be evaluated at the instant considered, in other words converted into a positive or negative numerical constant, to be recorded in the memory.

The expression to be evaluated, contained in a chain called the evaluation chain, whose links have been extracted in the course of recording in the memory 101 a chain called the reserve's chain, is analyzed in this non-restrictive example from left to right, in other words the evaluation chain is read in the direction chosen as the forward one, link by link.

Depending on the character contained in a link which is being read, presented simultaneously by the necessary arrangement of the channel to all the sequential logic circuits connected to it, one of them reacts on the one hand by the change in its own state and on the other by the possible emission of command or appropriate sequences of commands sent along the channel and to be carried out by one of the other organs connected to it.

Thus, for example, an uninterrupted series of letters is recognized as the name of a variable of program as soon as this series is interrupted by a space, an arithmetical operation signal, a right hand bracket, etc. by the sequential logic circuit 107 processor of names which then sends a series of commands in particular to the chain's memory so as to substitute the constant corresponding to the name of the variable thus detected.

In order to simplify the text, mention will not be made in the present application of all the limiters, in other words the symbols other than figures, letters, spaces, arithmetical operation signs, left and right hand brackets. These other limiters, commonly employed by most programming languages for sequential computers using coding as for example left and right anh square brackets, commas, colons and semi-colons, apostrophes, inverted commas, quotation and question marks, etc., if they have to be included in an expression to be evaluated, require specialized sequential logic circuits, that can be connected as required to the interconnection channel thanks to the standardizing of the inputs to this channel, circuits whose design and construction are similar in all respects to those of the circuits described in the present application and which only require a normal knowledge of such work. The absence of their description from the present application must in no way be considered as limiting the claims specific to the invention.

In the same way, the sequential logic circuit 105 recognizes binomials, in other words any arithmetical operation sign enclosed by two numerical constants and, with an appropriate set of commands combined with the contents of a small number of address registers, commands sent along the channel and to the arithmetical unit 106, works out the result of the above-mentioned arithmetical operation and then, having done this, replaces the binomial with this result.

Progressively, by analyzing in a non-restrictive way from left to right the expression to be evaluated in the calculation channel, passed through in the forward direction, the computer device replaces the names of the variables with constants replaces the binomials with constants, and, in this way, replaces the whole expression with a single constant which is the result of the evaluation of the said expression; this will appear more clearly thanks to the examples which follow.

The user types on the key-board of the typewriter 104 the expression 85 & JOUR.

This expression amounts to allocating a constant to the name of the variable JOUR. After the type roller has returned to the left hand margin, one line below, caused by the key NL (new line) being pressed, the computer is arranged so that until further orders the constant 85 remains associated with the name JOUR and will replace this name every time that it is mentioned in expressions to be evaluated later.

If the user then types

JOUR X 24 – ABSENCE JOUR ₌ 24 – ABSENCE and then presses the NL key, the expression will be analyzed from left to right after it has been placed in the evaluation chains. The name of the variable JOUR will be recognized by the sequential logic device 107 and appropriate commands sent to the channel memory so that:

1. the name of the variable JOUR is sought in the memory, 2. if it is found, which corresponds to the present case, the chain which contains 85 is recopied in a segment of the reserve chain which is then exchanged for the segment of the evaluation chain containing JOUR; this has the effect of replacing the original expression by 85 × 24 - ABSENCE or 85 ₌ 24 – ABSENCE.

This having been done, the analysis continues by the reading of what follows 85, in other words X 24 ₌ 24 and, when it arrives at the symbol –, the arithmetical analyzer incorporated in the sequential logic circuit 105 recognizes the existence of a binomial, notes the addresses of the links containing the 5 and the 4 and, taking into account the multiplication symbol, sends appropriate instructions to the arithmetical unit 106. The result of this unit's work is 2040 which, by the sending of appropriate commands to the chain memory by the sequential logic circuit 1-5, is substituted for the segment of evaluation chain containing 85 X 24 and, in the latter, the residual expression will become

2040 - ABSENCE.

Analysis of the expression continues and, starting with the letter A, the sequential logic circuit 1-7 recognizes the non-existence of any variable name A (or beginning with A). If the name ABSENCE existed, which is not the case since it is supposed not to have been declared in this example, a presumption of the existence of the name A would also exist, given the lexicographic nature, explained later, of the process of memorizing names which is used thanks to the computer device's chain memory that is the subject of the present invention.

In the present case, the circuit 109 sends a sequence of commands so that the print-out roller, after moving down a line, stops under the letter A and types the symbol ? .

If, on the other hand, ABSENCE had previously been declared by

20 & ABSENCE the evaluation would be continued by the substitution of 20 for ABSENCE then of 2020 for 2040 – 20 and hence the evaluation chain would only contain the constant 2020 followed by the return to margin symbol one line below symbolized by NL.

The sequential logic circuit 105 is so arranged as to recognize constant followed by a symbol NL as a command for the printing of the evaluation chain contents, command transmitted for execution to the sequential logic circuit 103.

The latter then acts to read the evaluation chain, link after link and, simultaneously, by appropriate command sent to the typewriter 1-4 acting as receiver, to ensure its printing and the placing of the links containing 2020 and NL in the reserve chain so that the computer device may again be ready for the evaluation of any expression which the user may type later.

Figure 2:
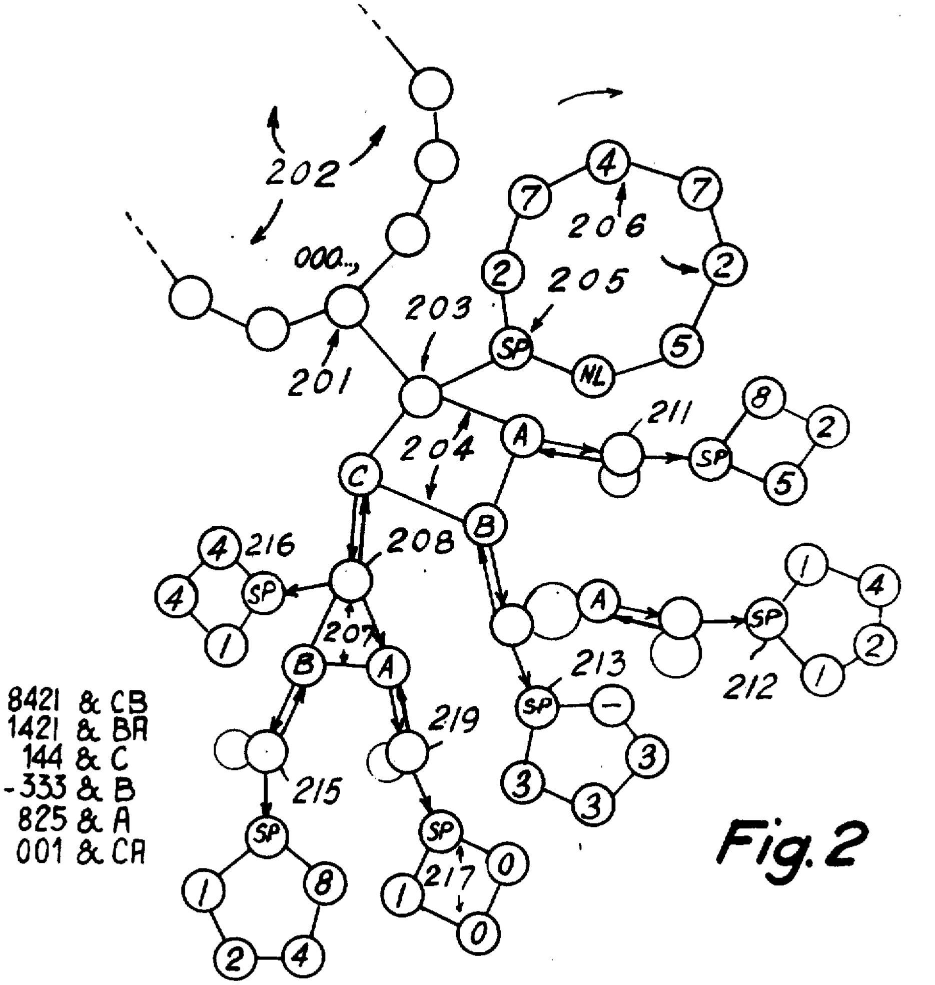

The arrangement of various chains during the use of the computer and the lexicographic organization of the assembly of names of variables, called in what follows "the file," will be better understood by referring to FIG. 2.

It will be supposed in this new non-restrictive example that a constant 274725 followed by a symbol NL (hence ready to be printed) is contained in the evaluation chain and that the following variables have been memorized after preceding evaluations.

8421 & CB

1421 & BA

144 & C

−333 & B

825 & A

001 & CA

Each link is, by convention proper to this figure, symbolized by a circle at the center of which is inscribed the corresponding recorded symbol. The forward reading direction is that of the motion of clock's hands. Each link is then followed by a link called the direct brother and preceded by another called the retrograde brother. The corresponding link connections are symmetrical and represented by ordinary full lines.

From the U.S. Patent application Ser. No. 39,038 concerning a linked memory, each link must have at least three segments, two to give the connections in the forward and reverse directions and a third containing the symbol recorded.

In the application to the computer device, which is the subject of the present application, it is also necessary that each link contain a fourth segment intended for the address in the memory of another link which is neither retrograde brother nor direct brother. This other link will be called the successor (or son) and will be shown in FIG. 2 by an arrowed line leaving the link considered the predecessor (or father) to go to the successor, the arrow being contiguous to the successor.

As an example, in the FIG. 2, the address link 000 . . . (201), hereafter called the permanent initial link, bears as recorded symbol a NUL symbol (code 0000000). It has as brothers all the links of the reserve chain (202); it also has a successor (203) which also bears a NUL symbol and is hereafter called the initial file link. This successor belongs to a symmetrical closed chain (204) all of whose link members contain all the different initials of all the names of variables in the file, in other words the letters C, B and A.

The initial file link has, in its turn, a successor, the initial evaluation link (205) followed and preceded by its brothers of the evaluation chain (206).

It will be noted that the reading in the forward direction of the contents of the evaluation chain (206) ends with that of the symbol NL (new line) which then triggers the return of the print-out roller to the left hand margin one line lower down. This replaces the input-output assembly in the standby position.

The initial link of the file (203) is part of the initial chain of the file, which contains all the initials of the variables present in the said file, these being arranged in the retrograde order of their entry in the memory; this arrangement is not however a limitation to the claims of the present application. In particular and as an example, the link bearing the symbol C, the first entered, is the retrograde brother of the file's initial link while the link bearing the letter A, the last entered, is the direct brother.

The link bearing the letter C has a successor (208), which is not significant and is the initial link of the second letters of all the names of variables with an initial C, i.e., B and A. The initial link of the second letters with an initial C has in its turn a successor which is the carrier chain initial link of the constant attached to the same of the variable C, i.e., 144.

The link bearing the letter B, of initial C, has as successor the first initial link of the third letters with initials CB and, no name of a variable with three letters or more corresponding to this condition having been indicated, this first successor is closed on itself. Its own successor is the initial link of the constant belonging to the chain containing 8421 (215 and 216).

In the same way, the link bearing an A, of initial C, has two successors, the second being the initial of the constant 001 (217).

It is also the same with the other two initials B and A of the names in the file and, as a general rule, any link bearing a letter has two successors, the second being the initial of a constant, while any link bearing figures and algebraic signs has only brothers. This general rule does not apply to the links in the evaluation chain nor, of course, to those in the reserve chain.

Later on, the selective erasure of the variable C, obtained by typing the expression & C, can be easily arranged; this will be explained in connection with the operation of the sequential logic circuit name's processor (107 of FIG. 1), so as not to alter in any way the variables of the names CA and CB.

This data structure, from the file of this data, therefore allows recording or selective erasure while retaining lexicographic properties necessary to make the creation, maintenance and use of the said file easier.

The mechanisms adapted to the data assembled in the form of files as well as to the various operations of infix substitution in the expressions are based on the use of a link memory (or chain memory).

Such a memory can with advantage satisfy entirely the description given in the application No. 39,038 to which the list of means makes reference.

It is sufficient however that it satisfy the requirements for use above.

Figures 2A, 3, 4:
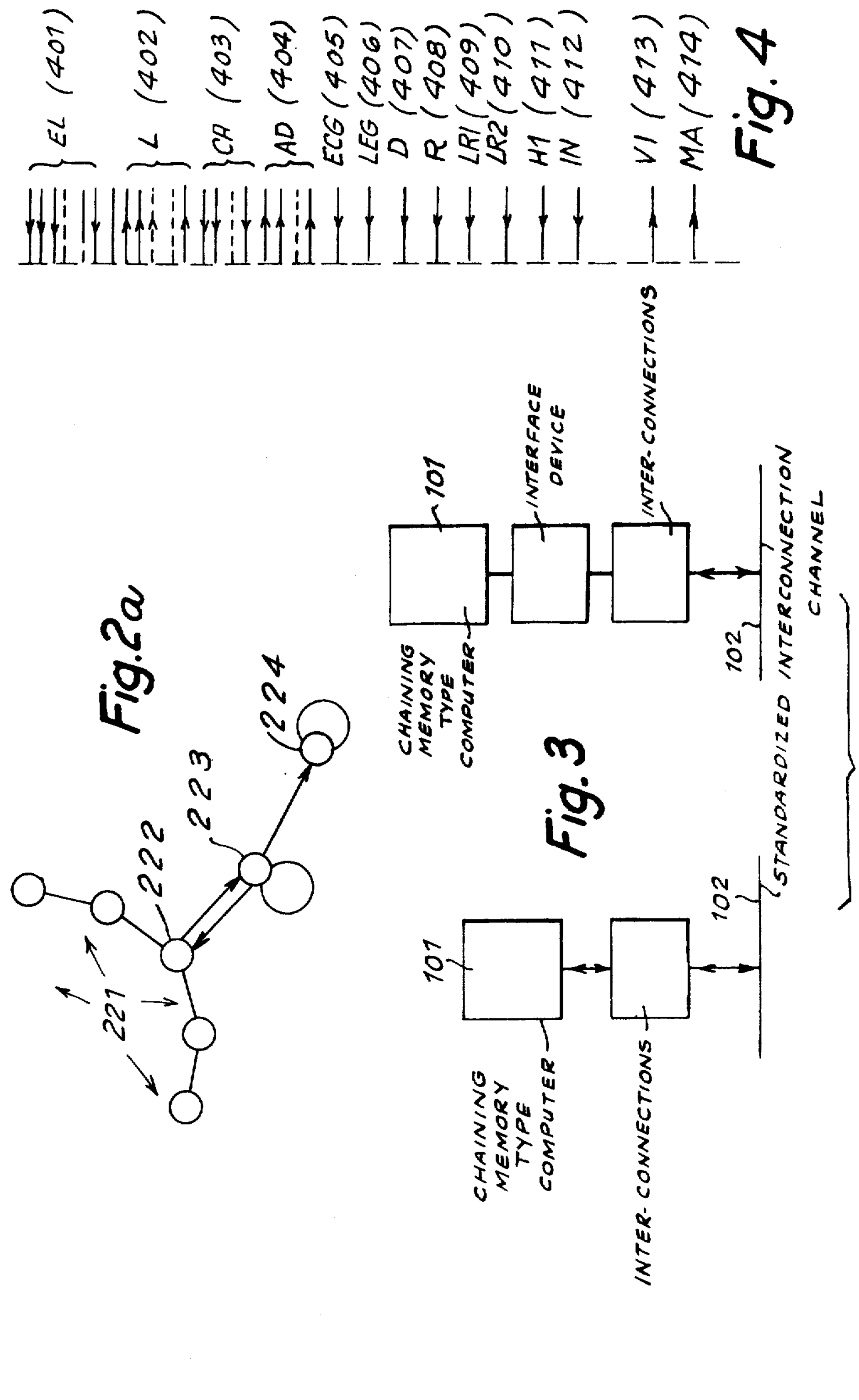
FIGS. 3 and 4 are exemplary schematic depictions of computer input/output arrangements for use in this invention.

In the first, it must be able to be connected to the standardized interconnection channel, either directly or through an interface device (FIG. 3).

In the second, either directly or through the interface device, the link between the channel and this memory must include (FIG. 4) :

*a*. a group of conducting wires (401) later called EL, enabling binary vectorial data to be recorded in the memory register. As a non-limiting example, this group may, for a memory with 4096 addressable cells, be composed of two groups of 12 conductors each intended to contain the linkage binary addresses, a third group of 12 conductors for possible addressing of successor links and one or several groups each intended to contain a symbol.

Without limiting the claims, in order to simplify the description of the computer device and its operation, it will be accepted, as with the examples already given, that a link only contains one data symbol;

*b.* a group of conducting wires (402) enabling the data contained in the memory link register and referenced later by the letter L to be read;

*c.* a group of conducting wires (403), referenced CA, of a size determined by the number of addressable cells in the memory (for example 8 wires for 256 cells, 10 for 1024, 12 for 4096, 16 for 65536, etc.), enabling a binary address to be recorded in the memory address register;

*d.* a group of conducting wires (404), referenced AD, enabling the contents of the aforementioned addressing register to be read;

*e.* a wire enabling the recording (405), referenced ECG, of the memory register contents with the address given by the addressing register;

*f.* a wire enabling the reading (406), referenced LEG, causing the contents of the cell whose address is given by the addressing register to appear in the memory register;

*g.* a wire enabling the forward direction of reading or recording (407), referenced D;

*h.* a wire enabling the reverse direction of reading or recording (408), referenced R;

*i.* a wire enabling the loading of the first link parameter (409), referenced LR1;

*j.* a wire enabling the loading of the second link parameter (410), referenced LR2;

*k.* a wire enabling the linking (411) referenced H1;

*l.* a wire enabling the initialization (412) referenced IN;

*m.* a wire signaling an empty chain (413) referenced VI;

*n.* a wire signaling memory unavailability (414) referenced MA.

The absence of enabling signal on wires D and R enables the memory to be used in accordance with the operation of individually addressable cell memories. On the other hand, if wire D bears the electric voltage corresponding to the logic signal 1, the reading or recording concerns the direct brother of the link previously recorded in the link register referenced L. In the same way, the logic signal 1 in wire R ensures the reading or recording of the retrograde brother.

The parametric link registers are filled from the group CA by the commands on wires LR1 and LR2.

Figure 5:
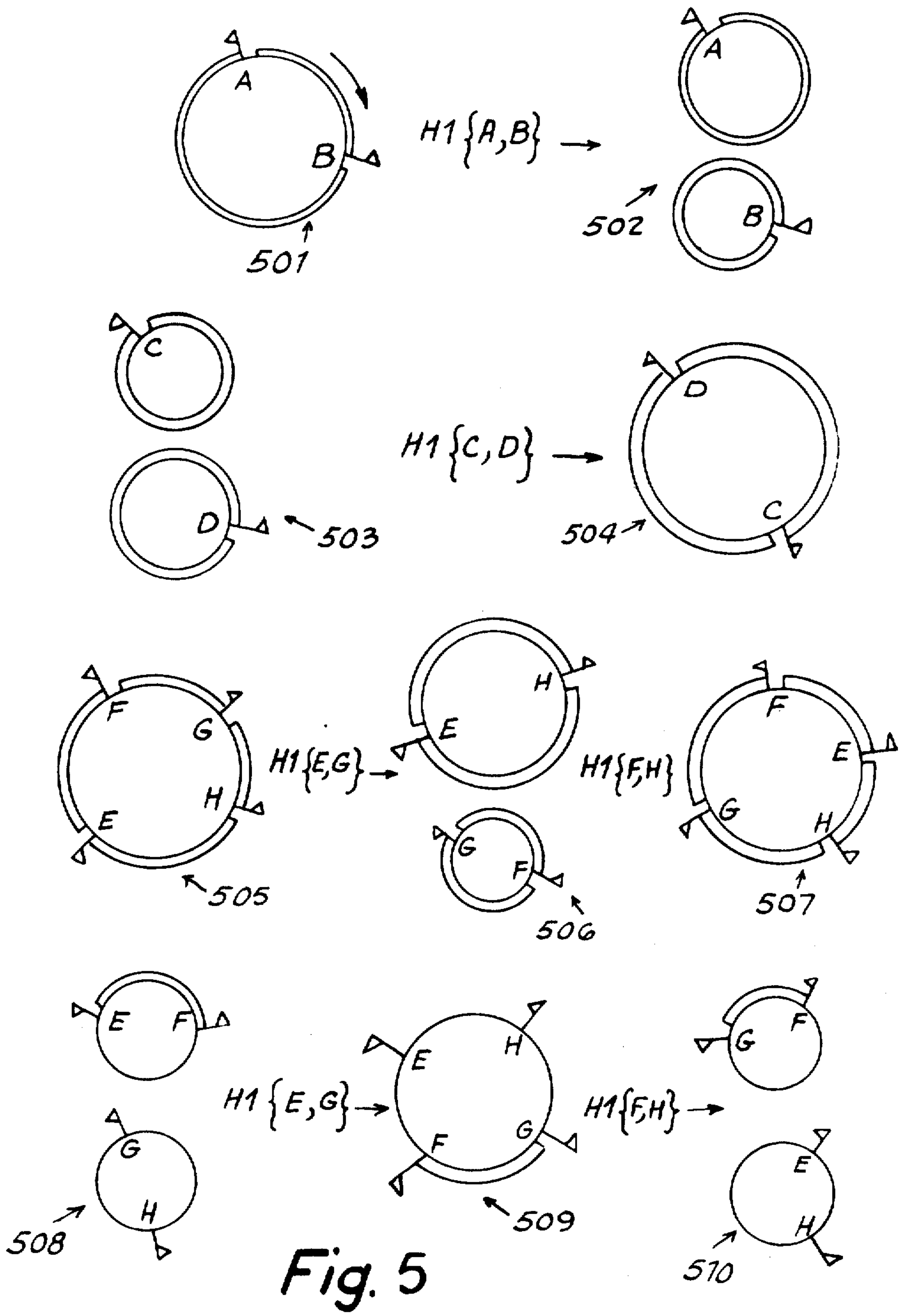
FIGS. 5 and 6 are exemplary schematic depictions of data chains and techniques of reorganizing same in the chaining memory computer used in this invention.
Figure 6:
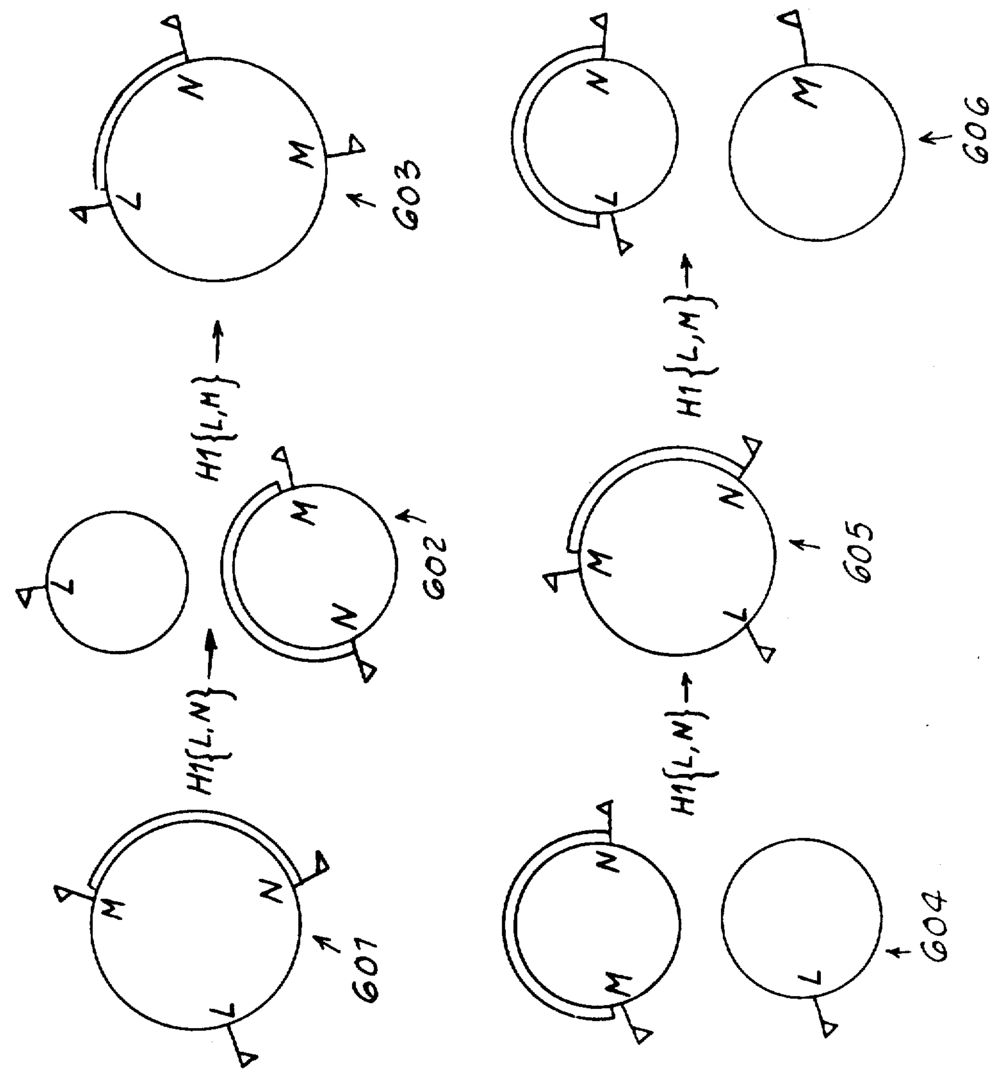

The effect of a link command on a wire (411), referenced H1, can be understood by referring to FIGS. 5 to 6.

In particular, if the registers whose loading is ordered on wires LR1 and LR2 contain the addresses and B of two links belonging to the same channel, the effect of the instruction H1, shown conventionally by H1{A, B}, is to divide the chain as at 501 into two chains as at 502 in FIG. 5.

It is advisable to note here that A and B are the addresses of the terminal links in the forward reading direction for the segments that it is desired to separate.

In the same way, the use of an instruction H1{C, D} when the address links C and D belong to two chain has as effect the combining of these chains in accordance with 503 and 504.

It is not outside the claims of the present application if use is made of a link memory whose parameters are the initial links of the segments to be separated and combined and all the examples given later can be transposed without difficulty.

It has been stated insistently that the operation of the computer device, which is the subject of the present invention, relies essentially on the substitution of infixes in mathematical expressions or, effectively, in the segments of various chains.

These substitutions result from the execution of consecutive linking commands with appropriation of the parameters.

Referring to FIG. 505 in FIG. 5, a command H1{E, G} concerning a chain containing at least four links including those of the address E, F, G, H, will split this chain into two other chains, one containing the address links E and F as well as the segments of which they are the ends, the other the segments ending in the address links G and H (506 and 507).

A second command H1{F, H} causes the two preceding chains to join and it will be noted from the FIG. 507 that the segment ending in the address link H follows the segment ending in the address link E while the segment of terminal link addressed F follows the segment of terminal link addressed G and, to resume, the effect resulting from the two consecutive commands H1{E, G} and H1{F, H} is to exchange the two terminated segments with the links addressed G and H.

If, in another example, the two segments terminated with F and H (by abbreviation) are placed at the start in two different chains (508), the result of the two consecutive commands given will become the exchange of the segments terminated with G and H (509,510).

Later, the segment terminated with the address link F will be referenced segment E, F, E being the address of the first link external to this segment in the reverse direction and, in the same way, the segment terminated with the address link H will be called the segment G, H.

The exchange of two segments (and of two infixes when the channels contain significant data) designated by E, F and G, H will result from the action of two consecutive commands H1{E, G} and H1{F, H}.

If one of the segments is void, the corresponding address L specifies a break and the effect of two consecutive commands H1{L, N} and H1{L, M} is to insert the segment M, N immediately after (in the forward direction) the address link L, in accordance with 601, 602 and 603 in FIG. 6 if L, M and N belong to the same chain while 604, 605 and 606 in FIG. 6 enable the identity of the effect of these instructions to be checked when L on the one hand and the segment MN on the other belong to two different chains.

As has already been stated, the standardized intercommunication and interconnection channel form the link between the different sequential logic circuits, important means of the present invention specifically described in the present application and any other sequential logic device intended for the processing of symbols whose interpretation is not described or envisaged differently from that described in the present application. This is why the channel is called a standardized interconnection.

This possibility to change or add rules for interpreting expressions by modifying, withdrawing or adding various sequential logic circuits, assembled preferably, but not in a limiting way, with the help of the usual logic circuits in the present state of the art regrouped on "cards" or panels, which can be connected individually to any position on the standardized interconnection channel, is an important characteristic of the present invention.

Figure 7:
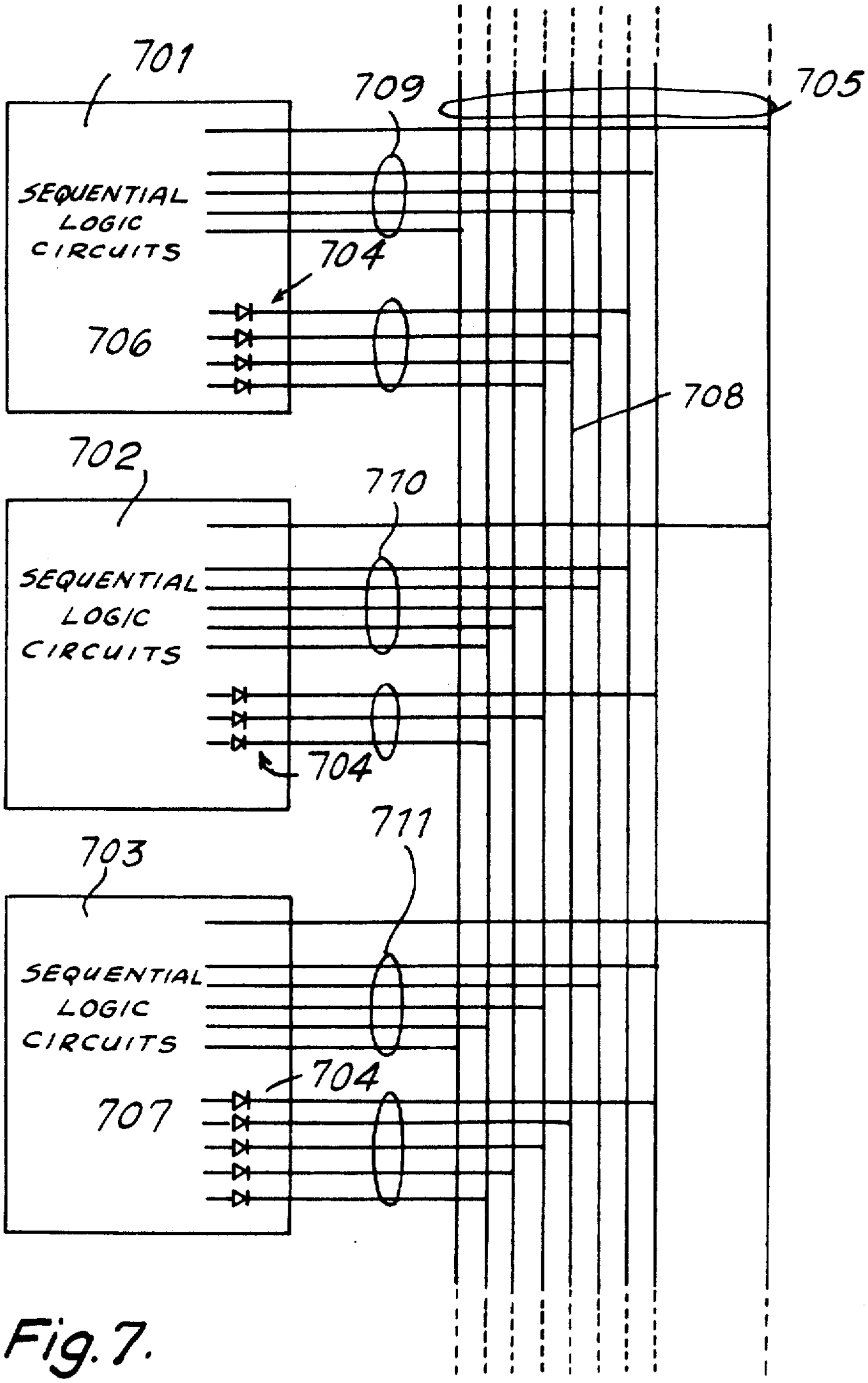
FIG. 7 is an exemplary schematic diagram showing how typical sequential logic circuits are connected to the standardized communication channel.

A non-limiting description of the channel can be understood by referring to the schematic of FIG. 7 which represents one of the assembly methods.

Sequential logic circuits resulting from the conception of these circuits are represented on their interface with the channel by 701, 702 and 703.

As far as their connection with the channel is concerned, each of them can be assimilated to a group of wires called emission wires, connected inside the card or cards containing the said circuit to the outputs of amplifiers which are independant or part of the unit containing the discrete or integrated logic circuits, made the most often in the present state of the technique with semi-conductor elements, such as bipolar or unipolar transistors.

In the most common case, these amplifiers are an integral part of binary memory elements or "flip-flops" or elements of logic functions such as "AND," "OR" or even "COMPLEMENTARY AND" circuits, etc.

It will be assumed, in this non-limiting example of assembly, that the electric signal representing a logic value 0 (zero or false), is close to the whole device's reference potential, while the logic level 1 (one or true) is of the order of a few volts positive or negative depending on the technical choice previously made. It will also be supposed that these amplifiers are able to supply to several logic circuit inputs the current necessary without the level 1 signal diminishing considerably, which, in the usual terms, is qualified by the word "fan out."

One or several diodes in parallel (704) are inserted between each of these outputs and the connector of the card or panel regrouping all the input and output wires of the sequential logic circuit considered.

The direction of these diodes is so chosen that their resistance is negligable when a current goes through them which, with reference to FIG. 7, moves from left to right and then reaches, through the connector, the appropriate wire of the standardized interconnection channel.

Each of these wires is connected to the reference potential which is itself carried on one of the wires (705) reserved for this purpose by a resistor or through the input resistors of logic circuits belonging to other cards or panels.

All of the diodes in the different sequential logic circuits, which are, through the corresponding connectors, joined to the same wire in the standardized interconnection channel, as for example the diodes leading from the elements 706 of the circuit 701 in FIG. 7 and the elements 707 of the circuit 703 in FIG. 7 form with respect to the coding and direction of diode connection of logic "OR" circuit. The logic signal born by the wire 708 will be one (true) as soon as any one of the amplifier elements which are connected to it contains such a signal.

Each of the sequential logic circuits is fitted with an assembly of input wires, corresponding the most often to the inputs of logic circuits or flip-flops. These inputs are connected to the standardized interconnection channel through the individual connector of each card or panel in 709, 710 and 711 of FIG. 7. The signal born by each wire in the channel is then accessible to all the sequential logic circuits. It will be shown later that all of the sequential logic circuits in the computer device satisfying the present invention is arranged so that at any instant all the outputs of the said circuits carry the logic signal 0 (zero) except possibly one only of them.

Due to this, the signal resulting from the combination of all the signals present in each of the standardized interconnection channel wires is a signal which, if it is 1 (logic 1), is produced in fact by only one of the sequential logic circuits and a signal which also, if required, can only trigger one other sequential logic circuit. As a result, the signal in the general sense of the term, which regroups the signals proper to each of the standardized interconnection channel's wires, can never be anything but the sum in the logic sense (the binary boolean union) of the signals emitted by the sequential logic circuits only one of which is not void.

The external impedance conditions of the circuits connected to the channel and the characteristics of the link diodes are determined one with respect to another and with respect to the channel conducting wires' electrical characteristics in conformity with the communication speeds desired and with the normal rules of electronic techniques.

The input-output circuit (103 of FIG. 1), reference E/S, is the important means whose main purpose as third means is to allow the recording of expressions in the channel memory, more precisely in the evaluation channel and, when these expressions have been evaluated and converted either into constants or into error messages, to ensure their being printed out. In the present non-limiting description, it will be supposed that a transmitter-receiver electrical typewriter (104 of FIG. 1) forms the means of communication between the user and the computer device which is the subject of the present invention.

Figure 8:
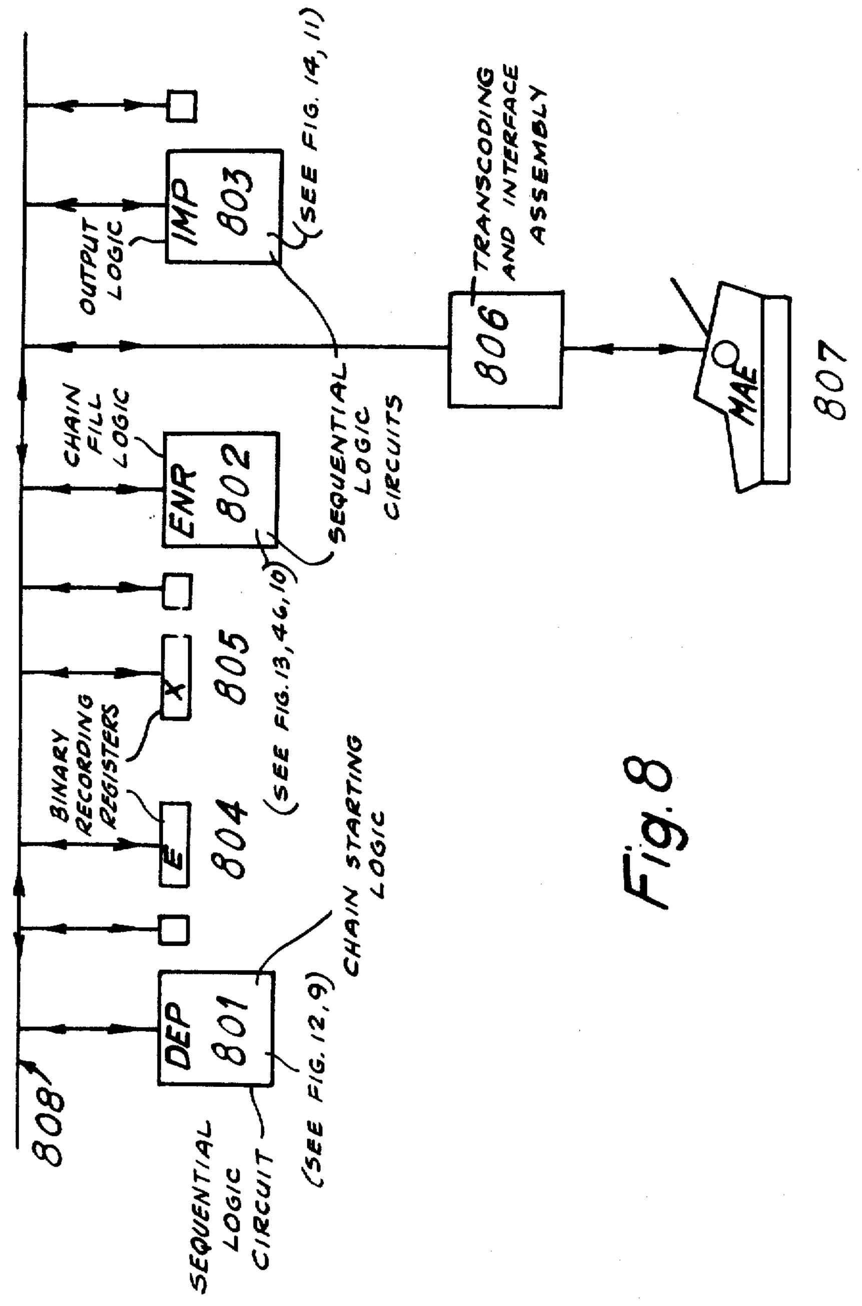
Figure 9:
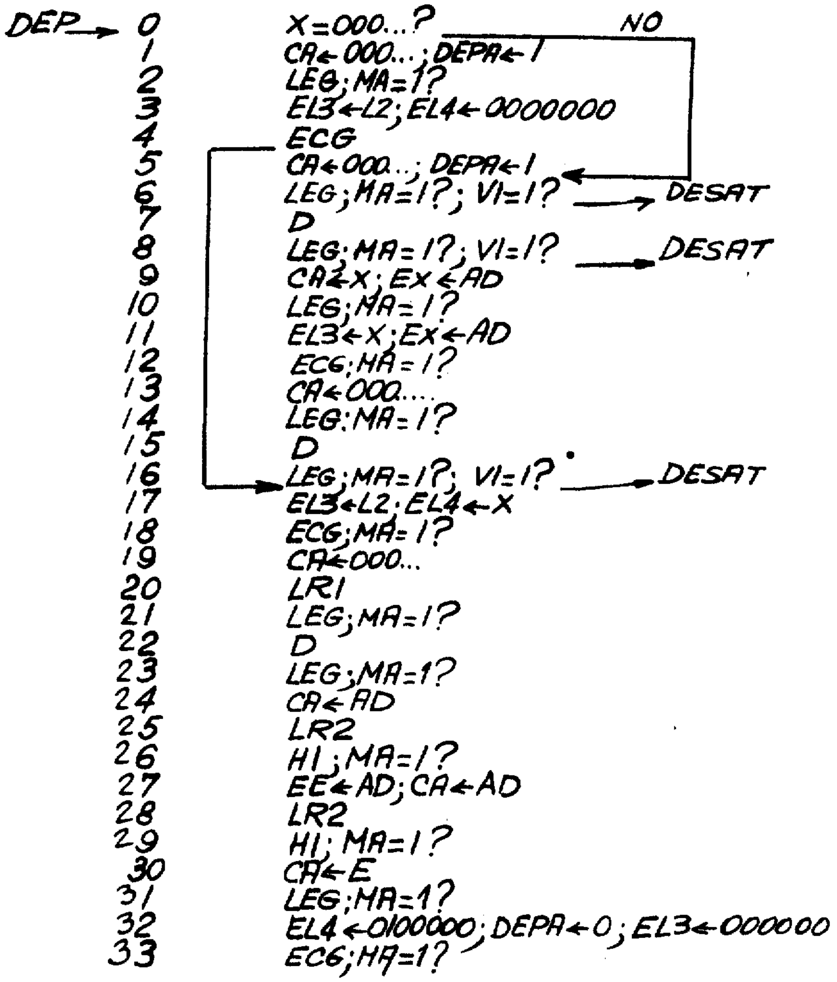
Figures 10, 11:
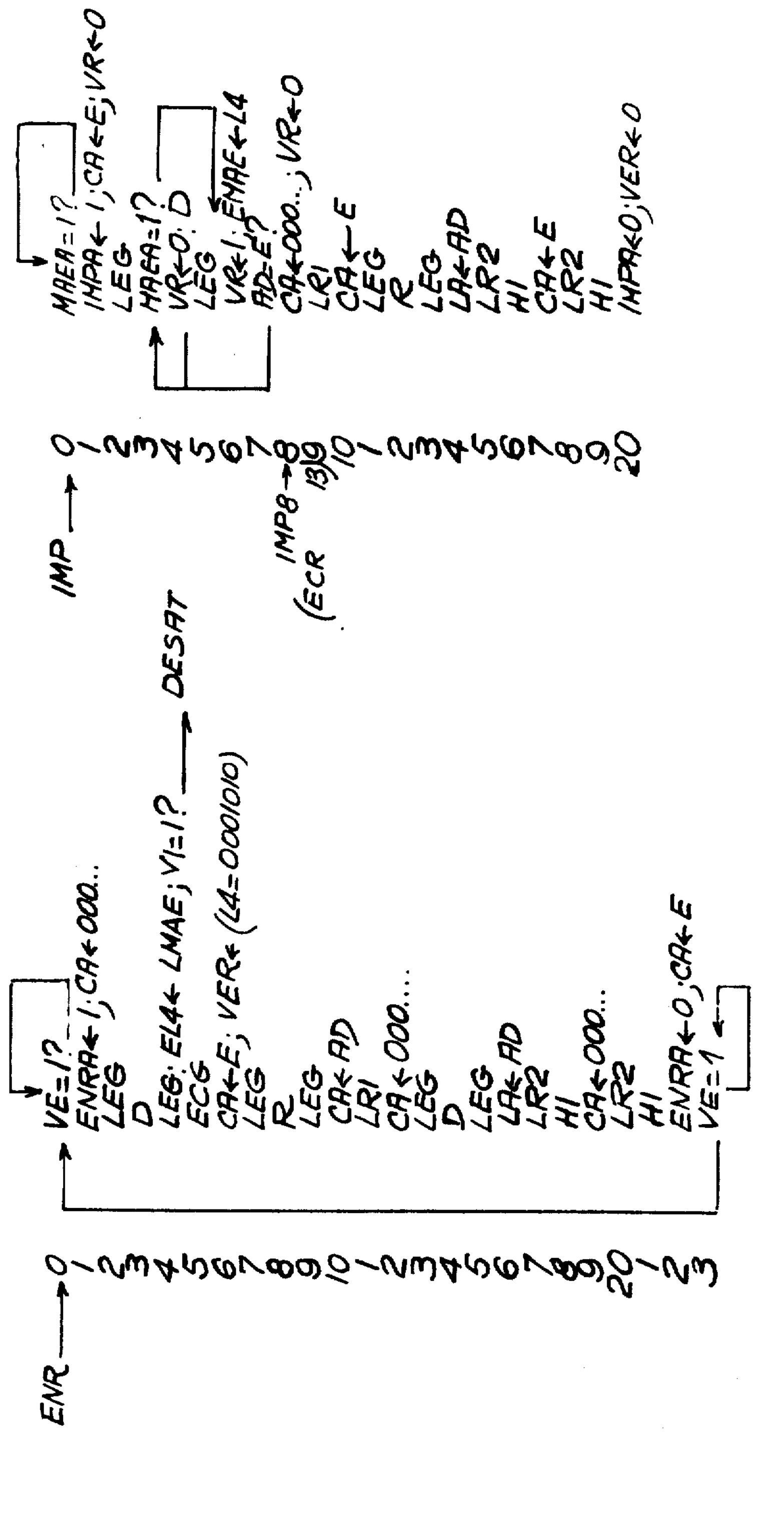

The sequential logic circuit (103 of FIG. 1) emits instructions and receives signals whose effect will be understood by reference to the schematic of FIG. 8 and to the tables in FIGS. 9, 10 and 11. These tables are formed of a series of lines numbered from 0 as for example the 34 lines of FIG. 9, numbered 0 to 33. Each of these lines corresponds to a "state" of the sequential logic circuit during which take place specific transfer operations between registers with or without intermediate logic networks. As an example, the line numbered 9 CA ← X; EX ← AD signifies that, during the sequential state 9, the contents of register X are transferred to the register CA and, simultaneously, the contents of register AD are transferred to register X while, except in the case of CA, every input of an X of any kind is designated by EX. It is the former contents of X and AD which are transferred to CA and X and thus define the new contents of CA and X.

It will be noted that, in accordance with this convention, the order in which simultaneous transfers are specified by the insertion of the semi-colon in no way influences the result because CA← X; X←AD is strictly equivalent to X←AD; Certain lines, in particular the line O taken as an example, do not define any transfer specifically; the expression X = 000 . . . ? signifies that the contents of the register X are compared to the binary vectorial quantity 000 . . . , the number of whose zeros is equal to that of the elements of X, which is a function of the number of cells in the memory (8 for 256 cells, 10 for 1024, 12 for 4096, etc.). If this comparison gives a positive result, the following state of the sequential logic circuit will correspond to the following line, i.e., line 1. In the opposite case, the following state corresponds to line 5 which is shown by the arrowed line going from line 0 to line 5 and marked by the negative word "NO."

In certain cases, in order not to overload the table, the switches are not drawn, especially as they are a frequently recurring situation. This is the case in line 2 which shows LEG; MA = 1? which indicates on the one hand a logic 1 on the control wire LEG and, simultaneously, the comparison with 1 of the signal MA. The positive result of this comparison, signifying that the memory is active, does not allow the change to the following state defined by line 3. This change can only be carried out when the signal MA "drops again" to the logic zero, which means that the memory work cycle is ended.

It will also be noted that the commands ECG, LEG, H1 and IN make the state which emitted them last all the time required for their correct execution, which is not the case with the instructions D, R, LR1 and LR2, these latter being converted into simple transfers from register to register R1←CA and R2←CA, of length equal to that of the elementary times of the synchronizing clock delivering periodic validation pulses to the sequential devices' state registers.

Later and for all the other tables, the expression MA = 1? will be omitted even though it is understood as far as ECG, LEG, H1 and IN are concerned.

Certain lines are accompanied by the expression VI = 1? followed by an arrowed line ending in DESAT. This means that when VI = 1 is positive, in other words that the signalling wire (413 of FIG. 4) of the emptiness of a chain bears a logic 1, the chain being read is empty and as a result a command DESAT is sent to a specialized sequential logic circuit (110 of FIG. 1) whose object is to enable the user to produce a chain which is not empty in particular with respect to the reserve chain.

To trigger the sequence of states defined by FIG. 9 the corresponding sequential circuit, which without that, cycles indefinitely on itself through the initial state corresponding to the line 0, must receive a command signal DEP (start) indicated conventionally by an arrowed line following the word DEP. The operations of the computer device, which is the subject of the present invention, begin necessarily by the equipment being switched on; this is followed by the typing of a mathematical expression on the key-board of the typewriter; if it can be computed, the constant which is the result of the evaluation will be printed out or memorized depending on the text of the expression and if it cannot be computed special symbols, messengers and error indicators, will be printed out at the required places.

Therefore the expression must be recorded in the memory and, when the calculations are ended, in must be printed out, the whole through the transmitter-receiver electric typewriter. The corresponding tasks are carried out by the input-output sequential logic circuit (103 of FIG. 1), referenced E/S, connected on the one hand to the typewriter (104 of FIG. 1); referenced MAE, and on the other hand to the standardized interconnection channel (102 of FIG. 1), referenced CH.

The manner of operation of the circuit 103 will be better understood by referring to FIGS. 8–13.

Figure 12:
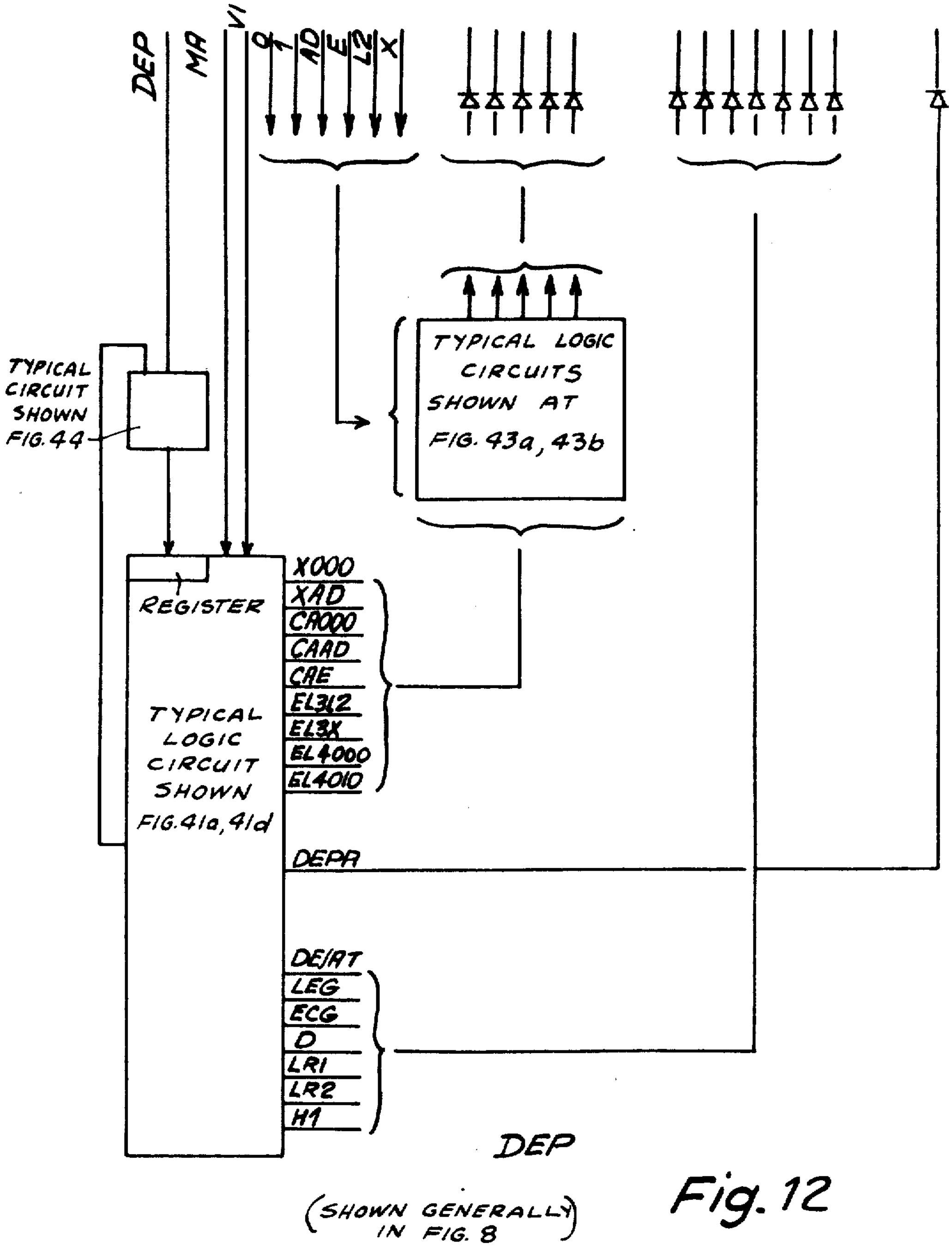
Figure 13:
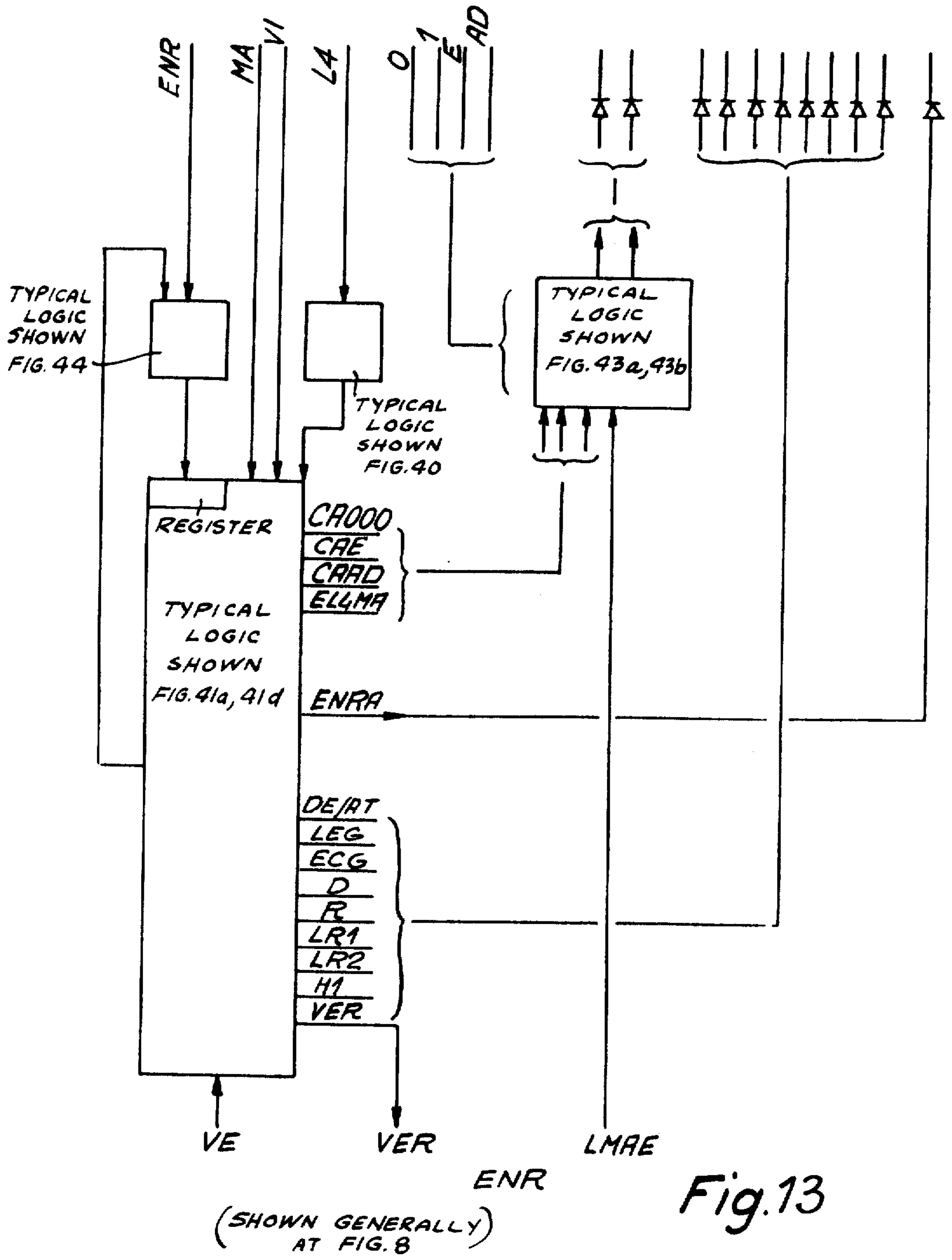
Figure 14:
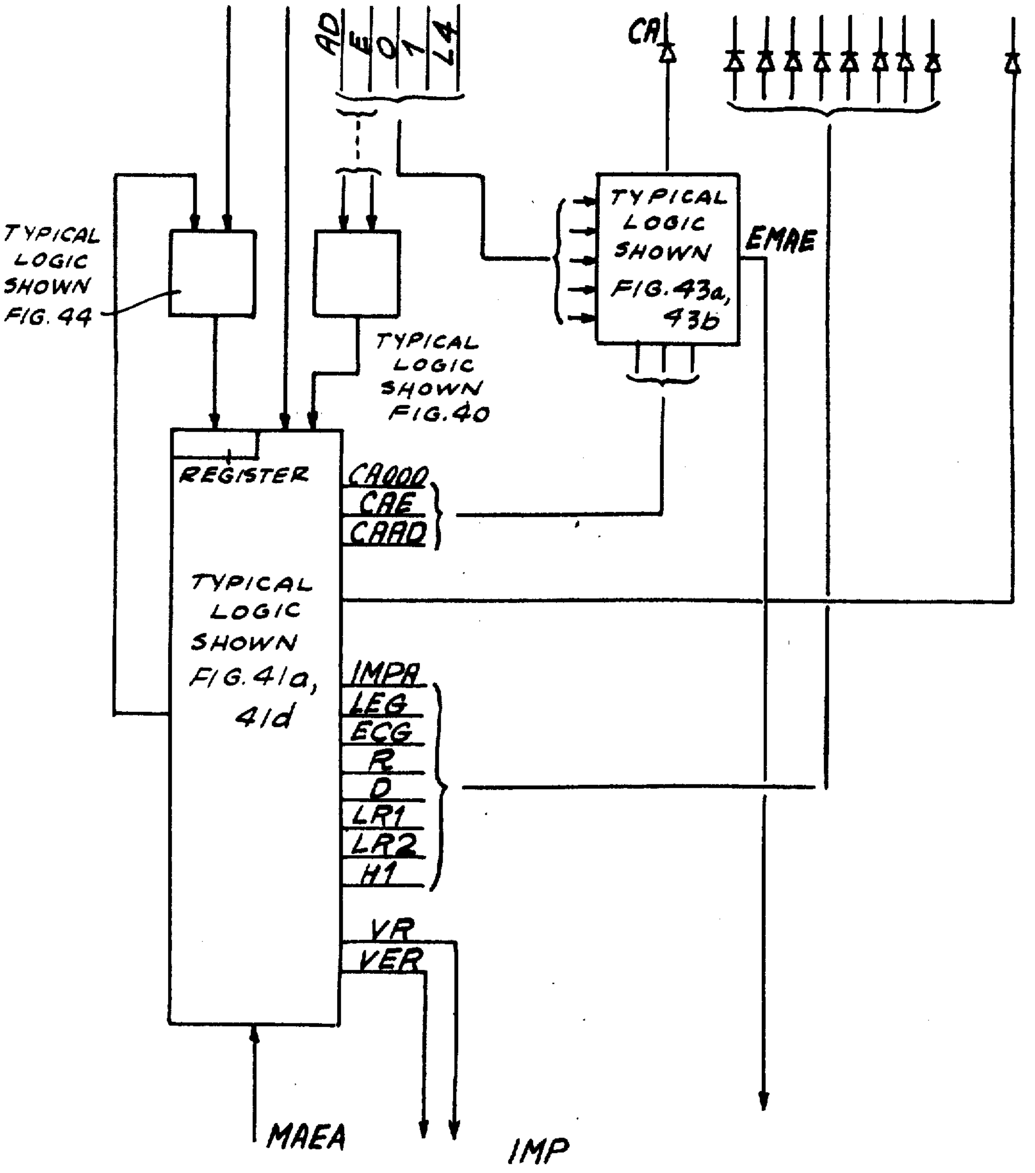

The input-output sequential logic circuit consists mainly of three sub-assemblies 801, 802 and 803 in FIG. 8 shown in more detail at FIGS. 12, 13 and 14 respectively which are themselves sequential logic circuits, binary recording registers 804 and 805 (FIG. 8) together with a transcoding and interface assembly 806 linking with the typewriter 807.

The standardized interconnection channel is shown as 808, this schematic being however limited to that of the conducting wires whose presence is necessary for the operation of the input-output circuit.

Circuit 801 shown in more detail at FIG. 12 has as object to produce structures identical to that of FIG. 2a, called starting structures, and the said circuit, normally inoperative, can only be started up by the presence of a logic 1 on the channel wire labelled DEP (start).

Circuit 802 has an object to fill one of these starting structures, called a basic structure, with the expression being typed on the key-board of the electric typewriter acting as transmitter and, normally inoperative, can only be started by the presence of a logic 1 on the channel wire labelled ENR (recording).

Circuit 803 has an object to cause the contents of a chain to be printed out and in particular that of the evaluation chain; it is started up by a logic 1 on the channel wire IMP (pring out).

Registers 804 and 805, referenced E and X, contain the addresses of the links characteristic of the operations in hand.

Transcoding and interface sub-assembly 806 has as an object to adapt in code and electrical characteristics the signals and source impedances of the typewriter 807 to the signals and source impedances of the input-output sequential logic circuit.

The operating procedures of each of the circuits 801, 802 and 803 are explained by reference to FIG. 9, 10 and 11, respectively.

The sequential logic starting sub-circuit 801 operates differently as a function of the state of the register 805 which may be loaded beforehand by a command on the wire LRX of the interconnection channel.

If the content of the said register is a vector of logical zeros, the sub-circuit 801 acts so as to produce the structure shown in FIG. *2a*, structure consisting of a part of almost all the memory (except for two cells) linked as a reserve chain (221 of FIG. *2a*), the two cells in question forming two successor links in the address link 000 . . . , one being the initial link of the file and its successor the initial evaluation link.

The circuit 801 is sequential and can adopt 34 different states. It cannot be started unless it is in the state corresponding to the line 0 and must receive the signal DEP for that. The successor state of the line 0 state is the line 1 state unless the content of register X contains at least one logic 1 in which case the successor state will be that of line 5.

The states of lines 1 to 4 succeed each other in order and their object is to record in the third segment of the initial permanent link (222 of FIG. 2*a*) the address of the file's initial link (223 of FIG. 2*a*), which will thus become its successor. Referring to FIG. 9, the sequential logic start circuit line 1 state, which, as an abbreviation, will henceforth be called the DEP circuit, prepares the reading of the memory following the address 000 . . . and sets up a "logical 1" on the wire of the interconnection channel DEPA (see FIG. 12), signal which will be interpreted by the other sequential logic circuits of the computer device as a non-availability of the DEP circuit.

The state of line 2, the successor of the preceding one, then the state following of line 3 have as object to record in the third segment of the initial permanent link, the address of its successor, which is at present its direct brother. Furthermore, a symbol consisting of seven logic zeros is recorded in the segment reserved for the data, symbol corresponding to the NUL character of the ISO international data transmission alphabet. The state of line 4 causes these two symbols to be effectively recorded in the address link 000 . . . , and is followed by the state of line 15, which with the command D, enables the link at present recorded in the link register to reach the direct brother.

The effective reading of this direct brother, during the state of line 16, is accompanied by an empty chain check, which is inoperative in the present case but obligatory when it is desired to form a base structure during the operation which corresponds to X ≠ 000 . . . .

The state of line 17 prepares, from the direct brother of the link really present in the memory link register, the successor of the initial permanent link, the initial file link by the execution of commands similar to those of the state of line 3. To sum up, the commands sent to the memory during the states of lines 1, 2, 3, 4, 15, 16, 17, 18 have prepared the contents of the links 222 and 223 in FIG. 2*a*.

This having been done, the direct brother of the initial permanent link, which at the moment considered is still part of the reserve chain must be isolated to become effectively the file's initial link (223 of FIG. 2*a*), then, once the reserve chain is reclosed, the new direct brother must also be isolated so as to complete the conversion into the initial evaluation link (224 of FIG. 2a).

This result will be obtained by the sequential action of various commands caused by the succession of the states of lines 19 to 33 in FIG. 9.

In particular, the first parameter of the first link H1 corresponding to the state of line 26 is determined by the succession of the states of lines 19 and 20 loading the register R1 with the command LR1 (in accordance with the description given in a non-limiting way in the U.S. Pat. application No. 39038), while the second, address of the present first direct brother, is determined and loaded by the succession of the states of lines 21 to 25.

The command H1, whose origin is the state of line 26, extracts the direct brother of the initial permanent link (222 of FIG. 2*a*) from the reserve chain and, in accordance with the effects of a linking instruction, links it to itself, i.e., its link segments in the forward and reverse directions bear its own address. This link then becomes effectively the file initial link, while the new direct brother of the initial permanent link has become the future initial evaluation link.

Also, the new direct brother of the initial permanent link has its address recorded in the memory address register AD in accordance with the description of the link mechanism used in particular in the invention which is the subject of the U.S. Pat. application No. 39038 and is detailed more precisely on pages 15 and 16 of the present application.

This address is that of the link actually belonging to the reserve chain which later will become the initial evaluation link (224 of FIG. 2*a*). Recorded in the register E, it defines the second parameter of the second linkage during the states of lines 27 and 28, linkage become effective by execution of the command H1 of the state of line 29.

The four states of lines 30 to 33 cause a symbol SP (space) of the ISO code 0100000 to be recorded in the fourth segment of the initial evaluation link and indicate the freeing of the DEP mechanism by the cancellation of the signal DEPA.

An initial base structure satisfying the schematic of FIG. 2*a* thus being formed, the input-output sequential logic circuit E/S (103 of FIG. 1) is ready to receive any expression typed later on the key-board of the electric typewriter MAE (104 of FIG. 1).

This expression will be recorded in the evaluation channel (206 of FIG. 2) which will get larger as symbols are typed, starting with the single link (224 of FIG. 2*a*) of the said channel, link bearing the symbol SP (space).

This recording function is ensured by the sequential logic sub-circuit (802 of FIG. 8) referenced ENR. In the time scale proper to the operation of the computer device which is the subject of the present invention, the input of a symbol by its being struck on the key-board is a rare occurrence, a trained specialist user only exceeding with difficulty a maximum typing speed of the order of four symbols per second.

The sequential sub-circuit ENR can then without any disadvantage operate in priority with respect to the others and not take account of the active or inactive state of these other devices. In fact, the latters' evolution is interrupted each time a symbol coming from the key-board enters.

The assembly of the typewriter MAE and transcoder-interface (807 and 806 of FIG. 8) can be likened from the operational point of view to a group of wires connected to the standardized interconnection channel, more precisely in the layer EL4, layer of input wires bearing data symbols in the fourth segment of the memory link register and containing also a wire referenced VE bearing a possible emission validity signal.

In accordance with the normal operational processes of the channel, the signal coming from the transcoder 806, later born by the layer EL4, is an assembly of logic zeros unless there really is a transfer of a symbol. As the various voltage levels are not set up simultaneously in this layer, the validity of the corresponding data must be confined by the appearance of a level corresponding to a logic 1 on the wire VE for emission validity.

Contrary to the sub-assembly (801 of FIG. 8) referenced DEP, which is explicitly activated by a command of the same name, the sub-assembly ENR is activated as soon as the wire VE bears a "logic 1." It is the transmission validation signal which triggers the sequential evolution from the line 1 state to the line 23 state of table FIG. 10. In particular, the line 1 state in the sequential sub-assembly ENR is a "logic 1," the signal on the ENRA wire (active recording). This ENRA signal stops the evolution of any circuit which for any reason is active at the instant of validation.

If this property is not used, it is because of the non-limiting character of the present description which, to improve its intelligibility, gives only the essentials of the present invention. On the other hand, the interconnection channel can easily be connected to other organs than the sequential logic interpretation and evaluation circuits, such as additional input/output devices, classical memory organs and also computing and processing units; in this case, the operation of the said devices, organs and units must be interrupted by the energizing of the input/output system now being described.

During the line 5 state, the content of the EL4 group, which is necessarily significant because VE ≠ 1, is recorded with the address of the initial permanent link's direct brother. The role of the sequential sub-assembly ENR (FIG. 13) then consists in inserting this link, borrowed from the reserve chain, in the evaluation chain and in the reverse cut-off close to the initial evaluation link (205 FIG. 2 and 224 FIG. **2*a*) whose address is given by the register E. Repetition of this procedure for each symbol typed on the key-board will enable the normal series of symbols for the expression to be obtained finally when the evaluation chain is read in the forward direction. The states of lines 6 to 9 enable the address of the initial evaluation link's retrograde brother to be obtained, this being the first parameter of a later link (states of lines 10 and 11 in FIG. 10). The states of lines 12 to 17 supply the address of the link in which the symbol flowing in the register R2 of the memory control device has just been recorded (see application N· 39038), thus defining the second link parameter controlled by the line 18 state which carries out the operation defined on page 21** of the present application and given by :

H1 { link E retrograde brother, initial permanent link direct brother }.

The second linkage controlled by the line 21 state corresponds to : H1 { link E retrograde brother, initial permanent link }.

The resultant effect is to put the initial permanent link's direct brother in a near retrograde position with respect to the address link specified by the register E.

A check of the emptiness of the chain occurs during the line 21 state, which, being positive, leads to the energizing of the sequential logic circuit DESAT already mentioned.

In the opposite case, the level of the signal ENRA drops again to the logic zero and the sub-circuit ENR returns to the availability state provided that, between times, the transmission validation signal VE shows that the typewriter has ceased to transmit, a check carried out during the line 29 state.

The third mechanism of the input-output sequential logic circuit, the sequential sub-circuit 802 of FIG. 8 referenced IMP, has as its purpose to cause the contents of the evaluation chain to be printed when, to do this, it receives the IMP signal circulating on a special wire in the standardized interconnection channel and emitted by the arithmetical analyzer circuit (105 of FIG. 1) referenced AA.

The evaluation chain is passed through in the forward direction and the contents of the fourth segments of each of its links are printed out as they arrive by the typewriter MAE operating as a receiver.

The link between L4, the group of the channel permanently connected to the fourth segment of the memory link register, on the one hand and the corresponding group of the transcoder and interface circuit (806 of FIG. 8) on the other carries a significant signal if, and only if, the signal level carried by MA is a logic zero; this rejoins the convention already described in connection with the connection determined by MA = 1 which accompanies the instruction LEG.

Meanwhile the sub-circuit IMP emits on a wire of the channel, referenced VR, a specialized reception validation signal, which is effectively a print-out command when it is a correspondence or logic signal.

That is why, as soon as the sub-circuit IMP is energized and a logic 1 is emitted on the wire IMPA of the channel which signals this energizing to the rest of the computer device, the signal VR is immediately confirmed to the logic zero; the object of this is to prevent any uncontrolled print-out (line 0 state of table FIG. 11). As a result, the content of the link of the chain evaluating the address specified by the register E is not printed out during the line 2 state.

During the line 3 state, as during the line 0 state, there is a check of the typewriter availability by MAEA = 1?, MAEA being the wire coming from the transcoder bearing the logic level as long as the said machine is operating and consequently not available. As soon as this condition ceases, after the following link is read, a validation signal VR is emitted that the machine interprets as a read command and, having done this, restores the logic 1 on the wire MAEA (states of lines 4, 5 and 6 of table FIG. 11).

An address check by the line 7 state has as purpose to stop the reading when the initial evaluation link has been reached. Before this, the retrograde brother link containing an NL symbol, the interpretation of this symbol by the transcoder and typewriter have replaced the type roller on the left-hand margin one line below. Reading of the initial evaluation link during the last cycle of the states of lines 3 to 7 corresponds to the sending of the command for a space, which means that the expressions to be calculated typed by the user are displaced one space with respect to the calculation results printed out. Mingling of the commands on MAEA with the emission of VR signals thus enables the evaluation chain reading speed to be adapted to that of the typewriter.

The states of lines 8 to 19 restore the segment defined by the whole of the evaluation chain, except for the address link specified by the register E (804 of FIG. 8), in the reserve chain in the direct position close to the initial permanent link; the states of lines 10 to 13 determine the address of the initial evaluation link's retrograde brother which will be the second parameter of the link H1 { permanent initial link, retrograde brother E } called for during the line 16 state. The line 19 state controls the link H1 { initial permanent link, link E } which completes and ends the print-out operations, end confirmed by the signal IMPA dropping back to the logic zero level.

The transcoder-interface equipment, produced according to normal practice and shown schematically as a remainder in 806 of FIG. 8, is not part of the present invention.

In order to make understanding of the computer device's operation easier, it was considered useful to regroup at the end of the text of the present application the descriptions of non-limiting assemblies of all the sequential logic circuits claimed in the present application as that of a standardized interconnection channel.

The expressions typed on the key-board can therefore be recorded in the evaluation chain, the results of the evaluation of these expressions can be printed out; the main object of the computer device described in the present application is to evaluate, i.e., compute, algebraical formulas which may contain names of variables, always within the non-limiting framework given to the present description for the sole purpose of avoiding any non-essential complexity.

This evaluation is ensured by all the sequential logic circuits connected to the channel except the memory and its control device and the input-output sequential logic circuit 101, 103 and 104 of FIG. 1), except also any interface, memory or calculation device which, due to the design of the assembly, may be connected to the said channel.

The sub-assembly 105 of FIG. 1, a sequential logic circuit for arithmetical analysis, referenced AA, is an important means of the present invention. It analyzes the expression contained in the evaluation chain (206 of FIG. 2), emits appropriate commands for the sub-assembly 106 of FIG. 1, an arithmetical unit referenced UA, and also emits all the instructions necessary for reading, recording and linking in the chain memory 101 of FIG. 1) in order to replace any binomial, defined in this text as a symbol of an arithmetical operation enclosed on the left and right hand sides by two algebraic constants, by the constant which is the result of the corresponding arithmetical-algebraical operation and gets closer and closer while passing through the evaluation chain in the forward direction (and the expression from left to right) until the whole content of the evaluation chain has been reduced to a constant. The symbol NL (new line) previously typed by the user during the writing of the expression to be evaluated and ending the said expression makes the arithmetical analyzer interpret the presence of a constant followed by the said symbol as a print-out instruction to be sent to the sequential logic circuit 103 of FIG. 1 and the sub-assembly E/S, the sequential subcircuit 803 of FIG. 8.

In the non-limiting example of an assembly described in the present application, the main mechanism of the arithmetical analyzer is implemented by a twelve state, sequential circuit, each state being characterized by the sending of command and the controls of signals specific of it. Except for the practical difference in the sequential devices already described (see FIGS. 9, 10 and 11) the passage from one state to one of the others is always conditioned by the "syntaxical" nature of the symbol read at that instant in the evaluation chain. In the description which follows, the priority nature of the operation of the recording sub-circuit (802 of FIG. 8) ENR with respect to that of the other circuits, in particular that of the interface, memory or calculation circuits which are not shown will not be considered and it will be supposed, in a non-limiting way and to simplify the present text, that the constants appearing in the expressions are positive or negative integers and that for the same ends four arithmetical operation symbols only are used, i.e., "+" the addition symbol, "−" the subtraction, "ₓ" the multiplication symbol and "/" the division symbol.

Always in a non-limiting way, the expressions may contain for example : "SP" space symbol, "NL" new line symbol, the symbol "&" for recording in the memory, left and right-hand brackets and finally letters of the alphabet.

The arithmetical-algebraical analysis sequential logic circuit (105 of FIG. 1), referenced AA, may be defined so as to its behavior in the form of a table (FIG. 15) whose ordinates correspond to various states of the circuit and the abscissae to the various symbols of the set previously defined. This table is one of the possible formal definitions of a language, which is effectively the machine language, as a non-limiting example, of a computer device which is the subject of the present invention.

However, the effect of analyzing the ten figures being the same, there is only one abscissa for the set of these ten figures, set designated by the letter D underlined.

The symbol D or the meta-symbol D represents then any one of the ten decimal figures 0 to 9.

It is the same for the metasymbol L which represents any one of the letters of the alphabet. The two symbols × and / are regrouped in the same abscissa, the effect of their analysis being the same.

A four binary element memory register is able to define at a given instant one of the twelve states of the analyzer AA; each of these states corresponds to an ordinate of the table in FIG. 15. To make it easier to understand the operation of this sequential circuit, in a non-limiting way, names will be given to each code, taking into account the arbitrary choice that the expert can make for the codes characteristic of the states. Also, these code names, which correspond to the detection of arithmetical-algebraical categories definable by metasymbols, are underlined.

The table defines the names of the successor states when, in a given state specified by an ordinate, a given symbol is read, the symbol being specified by an abscissa, the ordinate and abscissa defining the name of the successor state if it exists.

If the state of the analyzer is defined by C for example and the symbol being analyzed is SP (corresponding to a space), the name of the successor state will be C.

If, in another example, the symbol + is read when the analyzer state is C, the successor state will be BP.

In a certain number of cases, there is no successor state but instead an instruction specified by a non-underlined name. For example, the reading of the left-hand bracket during the state BP causes the command DPAR to be emitted in the channel; the sequential logic circuit 108 of FIG. 1, referenced PAR, will reply to this. In the same way, the command DNOM is sent to the sequential logic circuit 107 of FIG. 1, referenced NOM, a circuit specialized in the control of names of variables, if the symbol being read is & when the sequential circuit AA finds itself in one of the states P, N, C.

Nonetheless, the state names have a certain mnemonic sense intended to make them easier to understand.

Thus, the state NEANT, (underlined as are all the state names), corresponds to the latent state, i.e. a sequential logic circuit AA not being used. It is a state of permanent cycling on itself, characterized by the absence of any other action.

The first symbol subjected to analysis is necessarily an SP (space) because the analysis begins at the address specified by the register E, which, at the start, contains that of the initial evaluation link. Also, as the typing of the symbol NL has the effect of triggering the analysis by the effect, explained further on, of the instruction AV, one being to put the sequential circuit AA in the state DEB, reading the first symbol contained in the evaluation chain will define SP as the state which is successor to the state DEB.

If the following symbol is that of the addition operation, the state pP (prefix of a positive number) will follow the state SP, and, in the case of the symbol -, it is the state pN (prefix of a negative number).

A left-hand bracket does not cause any change of state but the emission of a signal logic 1 on the channel wire referenced DPAR and will start the sequential logic circuit 108 of FIG. 1, referenced PAR (parenthesis), which at the end of its evolution will determine itself the name of the state succeeding the present state of the circuit AA in the case in which the latter corresponds to DEB, SP, BP while, in other cases, it corresponds to an error in typing an expression such as + ( . . . , ( . . . , 246 ( . . . , − 68 ( . . . , 144 ( . . . , 25 x − 12 ( . . . , etc., thus triggering the circuit shown by dotted lines 109 of FIG. 1, referenced ERR. In the same way, if during a state BP, the symbol to be read is a letter, the sequential circuit AA will emit on the channel wire referenced NOM the starting signal for the sequential logic circuit 107 of FIG. 1 referenced NOM. The state P (or the state of recognition of a positive number), itself the successor for example of a state SP (space state) in the analysis of a figure, can then have as successors either C (state of recognition of a constant followed by spaces) or P (state of recognition of a positive number or BP (recognition of a partial binomial) or can emit the commands ERR, FPAR, IMP, DNOM depending on the character of the symbol to be analyzed.

The state N characterizes the recognition of a negative number, the state pB that of a partly positive partial binomial, an incomplete binomial whose second operand to the right of the operation symbol has a positive sign; a negative sign in the same position is recognized under the state name nB (e.g. 314 / −). Finally B is the state in which any binomial is recognized, a state which succeeds itself each time that the new symbol to be read is again a figure; apart from this case, any other symbol to the exclusion of the symbols "(", L triggers the operation of the sub-assembly 106 of FIG. 1, an arithmetical unit referenced UA, by the emission of a logic 1 on the interconnection channel wire referenced UA.

All the instructions to the circuit ERR correspond to expressions which cannot be calculated in the non-limiting conditions of the example chosen as a description of the machine language. They may correspond to the printing of error messages for example of a single type or of various types; they may be chosen as is convenient, used according to the normal rules and deduced from elaboration and construction rules analogous to those of the present application and their effects do not enter into the essential utility of the present description. In any case, the analysis is cut off and will not be continued unless by various means, which come under the facility chosen, the user is made able to correct the expression either entirely or starting with the incorrect symbol.

Within the framework thus defined, the sequential logic circuit 109 of FIG. 1, for example, referenced ERR, can be produced so that its operation is converted into the printing out of a symbol "?" just below the first wrong symbol and then placing the type roller one line further down, just below the interrogation symbol, and the return of the whole computer device to the position of waiting for the user to operate it in accordance with the appropriate tables and schematics, which are not explained because of secondary character of the device adopted for notifying and correcting so-called "syntax" errors.

Figure 16:
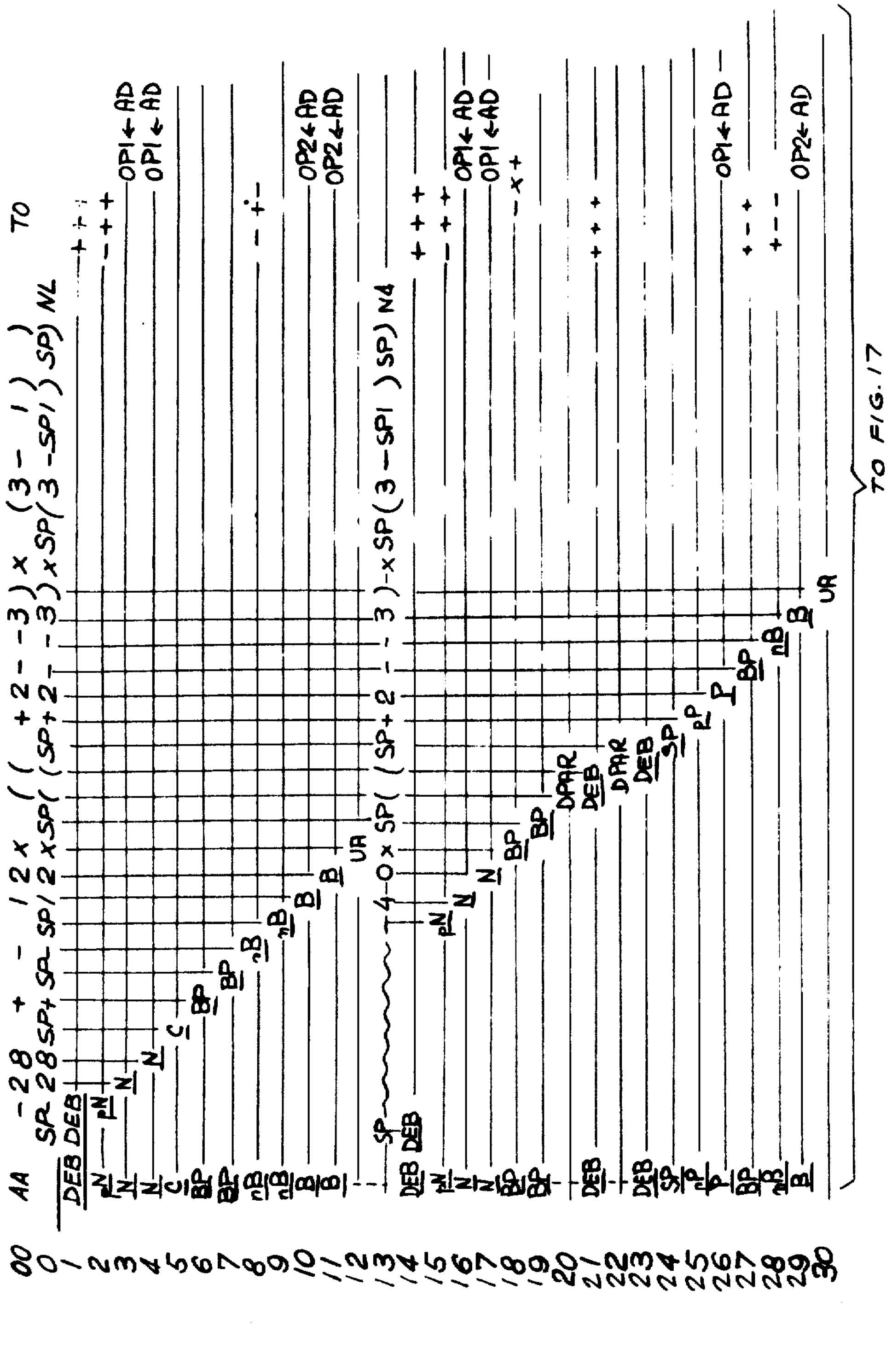
Figure 17:
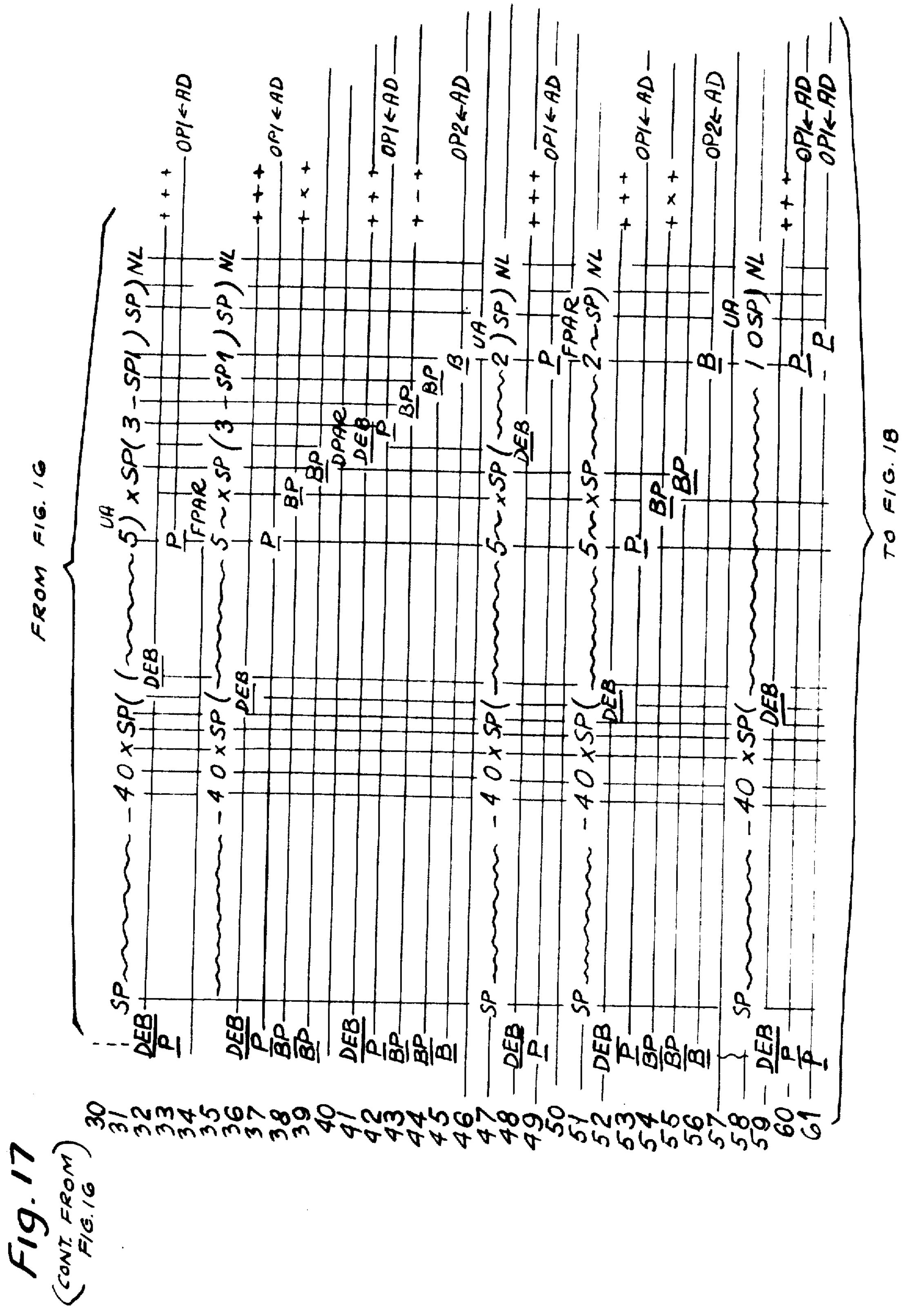
Figure 18:
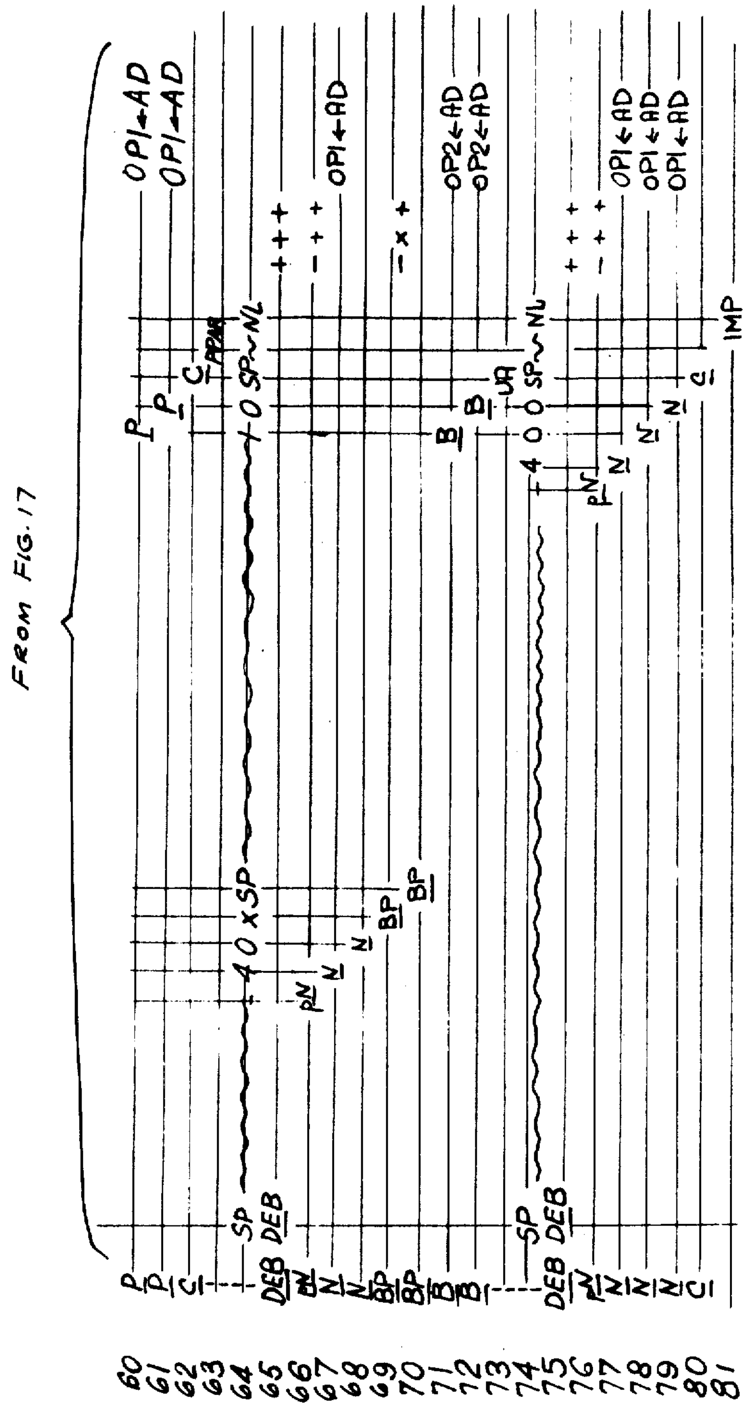

Referring to FIGS. 16, 17 and 18, a precise example of the analysis of a relatively complicated expression enables the arithmetical analyzer's operating principle to be understood more easily.

The line numbered 00 in the said figures represents an expression filled with optional intervals but respecting the calculability conventions adopted in the present description such as they result from FIG. 15 as a non-limiting example.

The line 0 represents the same expression such as it appears in the evaluation chain, which will then be composed in this example of 34 links, the first of them being the initial evaluation link, whose address is recorded at the start by the register E of the sub-assembly 103 of FIG. 1, shown also in 804 of FIG. 8.

When the user has typed the last symbol of the expression, which is necessarily a symbol NL and is an evaluation command, an instruction to place the typewriter type roller on the left-hand margin one line lower down, a recording of the symbol NL and an instruction to cut off the typewriter key-board all at once, he then allows the triggering of the whole sequence of states appearing in the column AA, which is the contents of the register RAA of the arithmetical analyzer (1906 of FIG. 19).

In the same way, a column referenced TO shows the sequence of the contents of a register TO, associated both with the arithmetical analyzer and the arithmetical unit, contents which effectively determine the type of operations which are to be carried out by the arithmetical unit.

The initial contents of the register 1906 of FIG. 19, referenced RAA, has the symbolic name NEANT. The user typing NL with the key of the typewriter causes the code corresponding to the state DEB (line 1, FIG. 16) to be recorded in this name register.

During this state of the sequential analyzer circuit, the register TO receives the code corresponding to +++, code 0000 in the example of the computer device assembly, chosen as a non-limiting example of course.

Each state of the same circuit is accompanied by an instruction to read the evaluation chain which, preceded by a forward direction instruction D, causes the contents of the evaluation chain to be read in the forward direction. In these conditions, the combination of the state DEB with reading of the symbol "—" changes the code of the register RAA into that of the state pN (line 2 FIG. 16), in accordance with the first line in the columns of FIG. 15.

In the same way, the reading of the following symbol "2,"combined with the state pN, causes the code contained in RAA to be changed and it then becomes that of N-(line 3 FIGS. 16–18) in accordance with the fourth line, second column of FIG. 15. Also, the state pN causes a logic 1 to be recorded in to [1], first elements of the register TO.

The process continues thus, characterized by the fact that during the state P or N and provided that an operation symbol is read, the said symbol's code is recorded in TO [2, 3], second and third elements of the register TO with the correspondences 01 for "—", 10 for "₋" and 11 for "/".

It is the same for the state B which causes a possible negative sign in the second operand to be recorded in the form of a logic 1 in the 4th element of TO.

The combination of the state B and the symbol "₋ in line 11 does not lead to a switch of state and as a result to the reading of the next symbol but to the emission on the standardized interconnection channel wire UA of a logic 1 level which is interpreted by the arithmetical unit 106 of FIG. 1 as an instruction to carry out the operation defined by the register TO, "—+—" in the present case, the addition of two negative constants. Also, the state N or P emits the instructions OP1 AD, the state B causes the instruction OP2 AD to be emitted and due to this the addresses of the low weights of the two operands are contained in two registers OP1 and OP2 (2009 of FIG. 20) provided for the purpose.

This evaluation ended, the result "—40" is substituted for the initial partial expression "—28 + — 12" (line 13) by link command and the arithmetical unit 106 of FIG. 1, by adequate commands, causes the code of the state DEB to be recorded in the register RAA (1906 of FIG. 19). The analysis continues and is applied to a new expression in which the first binomial detected has been replaced by a constant. The wavy line in line 13 (and 31, 35, 47, etc.) shows the closeness in the evaluation chain of the bearing symbols appearing at the two ends of the said line.

In line 19 for example, the symbol read is a left hand bracket, the state of AA being indicated by BP; the resulting combination causes the command DPAR (start of bracket control) to be emitted; the command is carried out by the sequential circuit 108 of FIG. 1 referenced PAR. This circuit causes the circuit PAR to carry out a sequence corresponding to bracket control tasks, described in detail in the part of the present application concerned with the circuit PAR, and ends its task by again recording the code of DEB in the register RAA but with an initial address in the register E (804 FIG. 8) which is that of the left hand bracket which has just been read. (line 20 and 21).

When the register RAA contains the code of the state P, meeting with a right hand bracket causes a command FPAR (end of bracket control) to be emitted in accordance with FIG. 15 (5th line 7th column), the command also being carried out by the sequential logic circuit 108 of FIG. 1 and the result being shown by the disappearance of the pair of left and right brackets surrounding a constant (see lines 35, 51 and 64 preceded by lines 34, 50 and 63 in which the command FPAR appear).

Line 81 corresponds to the combination of the state C with the symbol NL. An command IMP is then emitted and, in accordance with table FIG. 11, this command triggers the reading of the contents of the evaluation chain "SP —4 00 NL", the printing out of this by the typewriter as it is read, the typewriter acting as receiver, and, the last symbol being NL, the return of the type roller to the left hand margin one line down, the whole being then again available and the register RAA again containing also the code of the state NEANT.

The rules and an example of the operation having thus been described, by referring to FIGS. 15–18 and using the theoretical diagram of FIG. 19, it is possible to describe a non-limiting, detailed method of assembly, one example of which is given at the end of the present application regrouped with the examples of assemblies dealing with the other sequential logic circuits.

Referring to this schematic, the arithmetical analysis sequential logic circuit, or more simply the circuit AA, is permanently connected to the group 1901 representing certain conducting wires of the standardized interconnection channel and, in particular, the group of wires coming from the 4th segment of the chain memory link register (101 of FIG. 1), carrier of the symbols contained in the links.

These symbols are coded in parallel and, in a non-limiting way, the code used may be, for example, a code with six, seven or eight standard moments in accordance with international usage. One of these codes is shown as a reminder in the left hand part of FIG. 21 and, opposite, the corresponding symbols are from the set of letters, figures and various indicators also chosen as a non-limiting example.

A group of logic circuits 1904, referenced COD, converts these codes so as to obtain a code called a position code, each of the positions corresponding to the symbols and metasymbols of the abscissae of FIG. 15.

If the binary variables B7, B6, B5, B4, B3, B2 and B1 each represent one of the moments of the seven moment code represented in FIG. 21, it is easy for the expert to check that the symbol SP (space) corresponds to the real value (in the logic sense) of the Boolean form, form in which $\wedge$ and—have the usual signification of Boolean intersection (binary logic product) and Boolean negative. In order to lighten the drafting, it will be agreed to write this form and all those which follow in short as $\overline{7654321}$. The symbols NUL, SP, NL, +, —, ₋, /, (, ) and & are represented in accordance with this convention by $\overline{7}\overline{6}\overline{5}\overline{4}\overline{3}\overline{2}\overline{1}$, $\overline{7654321}$, etc (3rd column FIG. 21).

Thus the expert will recognize that $\overline{7}\,6\,5\,\acute{4} \vee \overline{7}\,6\,5\,\overline{3}\,\overline{2}$ is the Boolean form representing collectively the assembly or any one of the FIGS. 0 to 9 considered as digits, $\vee$ having the usual signification of Boolean union (or binary logic sum).

In the same way, the 26 letters of the alphabet are represented by the form $7\bar{6}\bar{5}1 \vee 7\bar{6}\bar{5}2 \vee 7\bar{6}\bar{5}3 \vee 7\bar{6}\bar{5}4 \vee 765\bar{4} \vee 7\bar{6}532 \vee 7\bar{6}5\bar{3}\bar{1}$.

The logic circuit 1904, which is not part of the inventive activity claimed, produces with the aid of appropriate elements the 12 forms listed, coded in position by the layer 1905 which has 12 wires.

The register 1906, referenced RAA, contains at any instant one of the codes corresponding to the states listed in the left hand column of FIG. 15.

The choice of the correspondence between codes and the names of the states is arbitrary but its result does not fall outside the claims concerning the assembly of an analysis sequential logic circuit satisfying the invention in any way at all.

In the framework of a non-limiting example of an assembly, in order to obtain a certain mnemonic effect, the code 0000 has been chosen to correspond to the state NEANT.

In an assembly called "asynchronous synchronizing" with the usual logic and memory elements in the present state of the technique, a synchronizing pulse, generated by a clock, either electronic or not, enables the successor state to be recorded in the register RAA, the code being generally produced by the logic circuits of the network 1907, as a function of the code actually recorded in the register A and of the twelve moment position code produced by the circuit COD and as a function of the class of symbol being read, which is read from the group of conducting wires in the standardized interconnection channel corresponding to 14 of the chain memory link register 101 of FIG. 1, it being understood that the said segment bears the symbols of the mathematical expression being analyzed, coded in accordance with the two left hand columns of the FIG. 21.

The arithmetical analysis sequential logic circuit can only be triggered by the replacement from outside itself of the code 0000 (see FIG. 21) of the NEANT state by the code 0001 of the state DEB. This replacement is obtained by and only by the presence of the code 0001010 of the symbol NL on the layer (1903) EL4 of the standardized interconnection group; detection of this presence is carried out by the logic circuit 1909. It should be noted that this detection only applies during the recording, while that of the same symbol on the layer L4 (1902 FIG. 19) acts as an end of expression detector and in fact, in accordance with FIG. 15 and the example in FIG. 18 line 81, triggers the printing out sequence; it also starts a small sequence (FIG. 22) whose purpose is to read the direct brother links of the initial evaluation link and to keep control of the reading in the forward direction for each combination of state and symbol read that does not lead directly or indirectly to the emission of one of the commands UA, DPAR, FPAR, FNOM, NOM, DNOM, ERR and DESAT or more exactly leads to a simple change of state (lines 12, 13 and conditional D instructions).

It should be noted that the duration of a state is always a function of that of various instructions emitted during the state. It is that of the memory reading cycle during simple changes but apart from this case it depends indirectly either on the binomial to be calculated or on the text to be printed or on the user's reactions in particular when the instructions ERR and DESAT are emitted.

The description of the arithmetical analysis sequential logic circuit's operation can then be precisely understood by referring to FIGS. **22*a* and 22*b*; the drafting of this table which is more complicated because of the subjection of the changes to numerous external logic signals uses nonetheless the same writing conventions as that of FIGS. 9, 10 and 11, given that the Boolean form corresponding to the symbol SP is indicated by a logic 1 appearing on the wire FL of the wire group 1905 in FIG. 19, that the Boolean form of the FIG. symbols (D) will be indicated in the same way by F10, the letters by F11, etc., in accordance with the last column on the right of FIG. 21**.

In order to make the interpretation easier, it will be useful to refer to FIG. 23, which is similar to FIG. 15 and in which the classes SP, D, +, − etc. taken as abscissae are indicated by the corresponding position codes F1, F10, F3, etc., while the codes of states in ordinates are directly represented in accordance with the non-limiting choice made at the bottom of FIG. 21.

The state of line 0 corresponds to the state NEANT, state in which the sequential circuit AA does not emit any instruction. It remains in this state unless the group of wires EL4 of the standardized interconnection channel (1903 of FIG. 19) bears the signal corresponding to the symbol NL which arrives precisely at the instant at which the user strikes the corresponding key on the key-board. It can also leave this state by receiving command DEB (emission of a logic 1 on the wire DEB by one of the circuits 106, 107, 108 and 109 of FIG. 1).

The boolean expression to the right of the symbol of assignment to the register RAA signifies as a result that the said register receives 0000, unless EL4 = 0001010 or DEB is equal to logic 1, 000 10 10 being the international code (ISO) corresponding to the symbol NL.

At the output of the state NEANT (code 0000), there is a switch towards one or another of the eleven significant states of the FIG. 23, as a function of the content of the register RAA, which is explained by the line 13 which does not correspond to a state.

In the state of code 1111 (line 11 in FIGS. 22a - 22b) to which nothing corresponds in FIG. 23 because it only starts off the analysis, the content of register E is recorded by the address channel in the memory address register and this enables the contents of the initial evaluation link to be read in line 12. Simultaneously, the code 0001 corresponding to the state DEB is recorded in the register RAA. There is a reading cycle with line 12 and because of the contents 0001 of RAA, the following state is described by line 1. The symbol SP, present in L4 (the initial evaluation link bears a symbol SP), causes 0010 to be recorded in the register RAA because F1 is the only wire of the group 1905 to have a logic 1 and simultaneously a logic 1 is emitted on the forward reading direction control wire D.

Reading in the memory follows in line 12 and concerns the direct brother of the initial link; again the instructions of the state DEB are carried out by line 1 but the recording in the register RAA and the type of commands emitted depend on the symbol read in the first direct brother.

If this symbol is SP or a figure or a sign + or a sign − or even NL, 0010 or 0101 or 0011 or 0100 or even 0000 is recorded in RAA, these five cases corresponding respectively to F1 not nul, F10 not nul, F3 not nul, F4 not nul or finally F2 not nul. Simultaneously, the forward direction command D is emitted (except for a symbol NL). In all other cases, the register RAA receives the code 0000 while the command emitted depends on the symbol being read : ERR (error) if this symbol is * or / or coded in position by F5, F6 and F8, DPAR if it is the symbol (coded in position by F7, NOM (name processing) if it is a letter coded by F11, FNOM if it is & coded by F9. The sequential logic circuit AA returns to the state NEANT and passes control the sequential logic circuits ERR, PAR or NOM (109, 108, and 107 of FIG. 1) or to the user in the case of the symbol NL. The sequential circuit waits for either an command DEB or a new command NL through the starting of the transfers in line 0.

In this way, if for some reason or other the contents of the evaluation chain are equivalent to void, nothing is printed out on the line reserved for the result and then the roller returns to the left hand margin one line down.

Thus, for each symbol of the evaluation chain read step by step in the forward direction there is a reading cycle in line 12, followed as a function of the contents of the register RAA by the execution of one of the lines 1 to 10, this execution being able to include sometimes the emission of instructions to this or that specialized sequential logic circuit with the return to the state NEANT for the whole of the operation of the sequential circuit put into operation.

This operation being finished, the said circuit emits if required the instruction DEB which retriggers the analysis sequential logic circuit (see lines 14, 21, 23, 32, 36, 41, 48, 52, 59, 65 and 75 of FIGS. 16-18).

The expression $((0001)\wedge\overline{DEPA}\wedge\overline{ENRA}$ . . . (line 11) is redundant because the instruction DEB is normally emitted by the specialized sequential logic circuits at the end of their respective operations and as a result DEPA, ENRA, etc., have the logic value zero. In case one of them is lacking, the register RAA receives 0000, one at least of the signals $\overline{DEPA}$, $\overline{ENRA}$ being nul (in the logic sense) and the retention of this value in RAA can be used as a signal of the incorrect operation of the system.

Figure 22A:
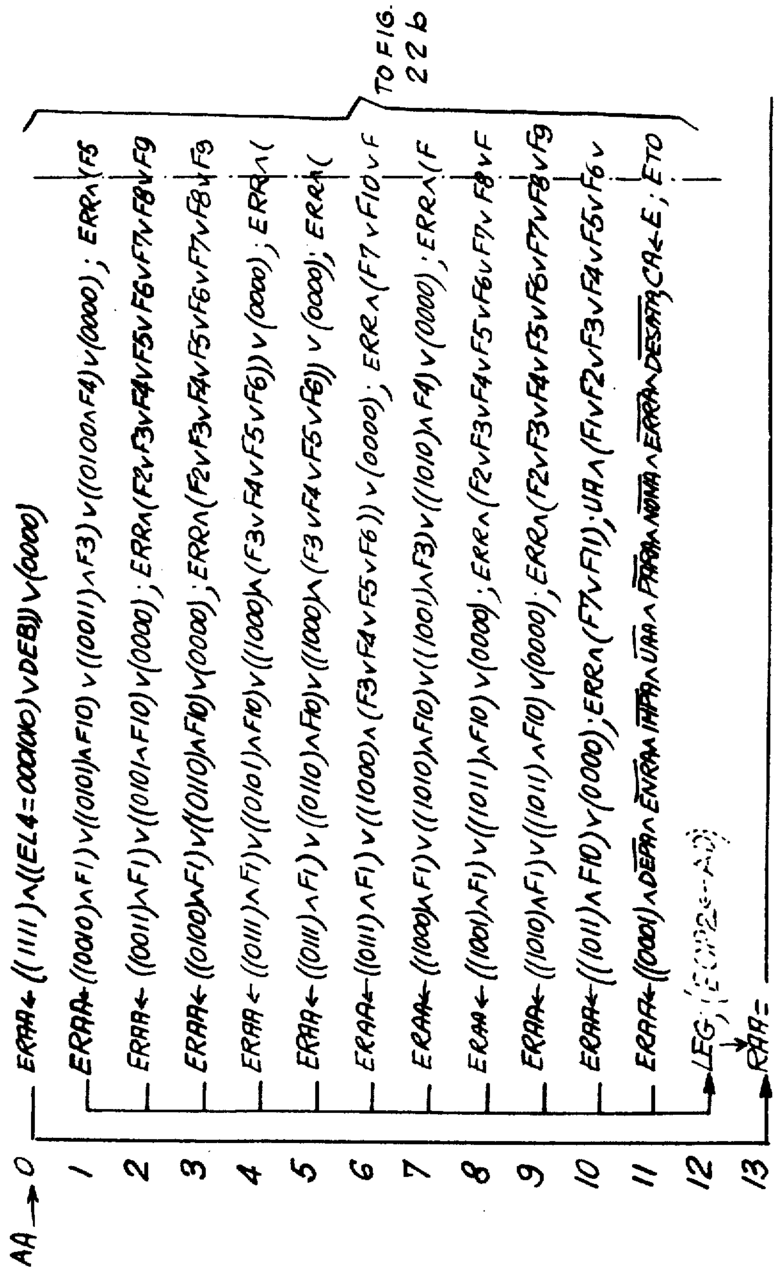
Figure 22B:
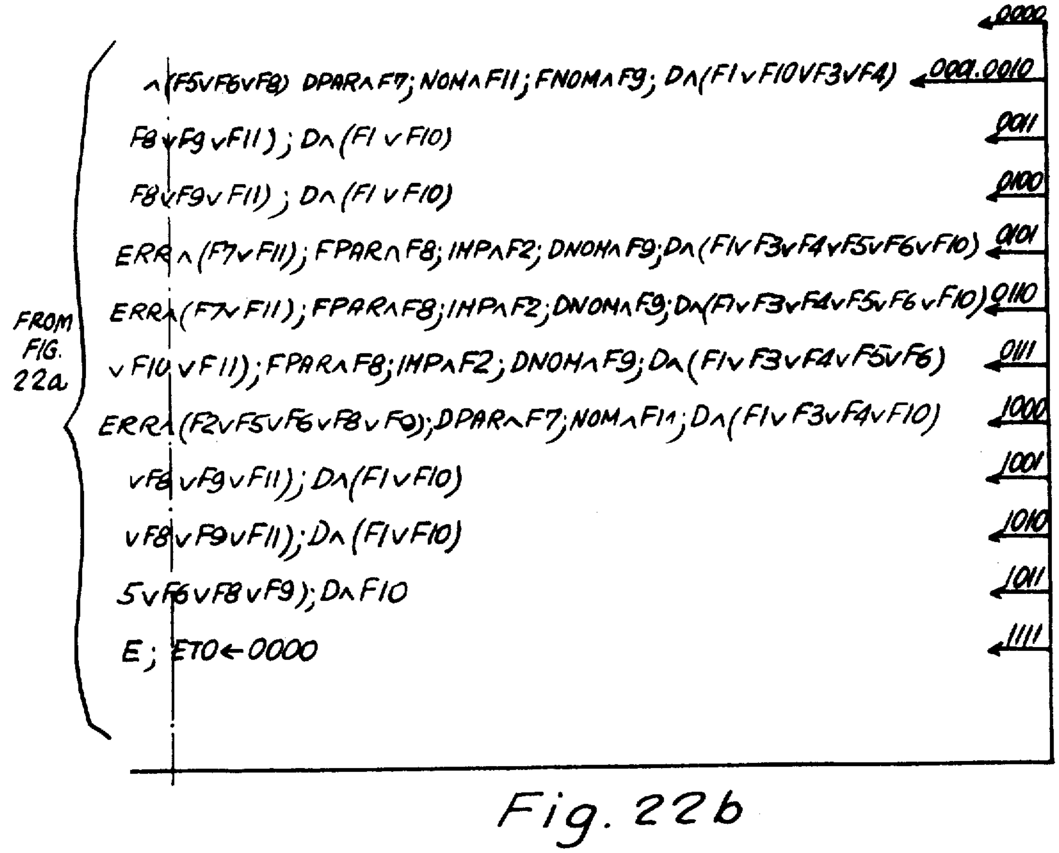
Figure 22C:
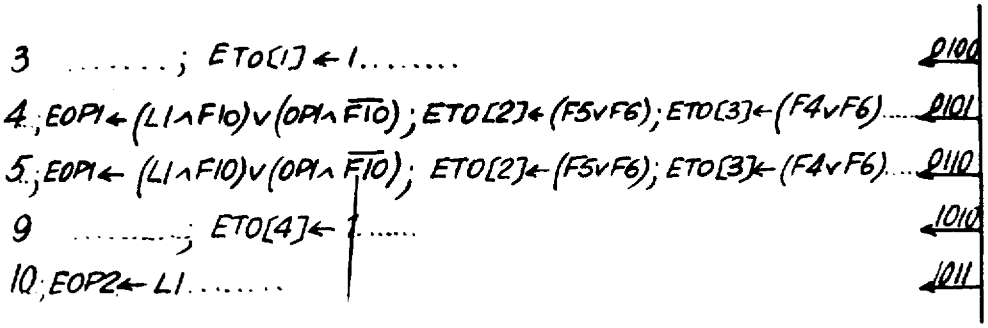

In order not to complicate the interpretation of FIGS. 22*a* - 22*b*, the transfers concerned with the registers TO (operation type), OP1 and OP2 (addresses of the low weights of binomial's two operands) are shown in the FIG. 22*c*.

Lines 3, 4, 5, 9 and 10 of FIGS. 22*a* – 22*b* must therefore be interpreted taking into account the transfers indicated by the lines with the same numbers in FIGS. 22*c*, the simultaneousness of said transfers with the transfers indicated in FIGS. 22*a* – 22*b* being recalled by the presence of the semi-colon at the beginning of these lines.

It must also be noted that the register TO is originally filled, in the state of the register RAA of code 1111 unconditionally linked to the state DEB of code 0001, with the code 0000 which corresponds to the sum of two positive constants. This register is later changed during the states pN and nB (of codes 0100 and 1010) (see FIGS. 16-18) as far as the two operands are concerned and during the states N or P (of codes 0101 and 0110) as far as the arithmetic operation symbol is concerned (lines 4 and 5 FIG. 22*c*). In accordance with these line, TO [2,3], i.e. the second and third elements of the register TO, receive 01, a code appropriate to subtraction if the content of L4 is equal to 0101101 (ISO code for the symbol "–"), 10 a multiplication code for L4 = 0101010 (ISO code for the symbol "*") and finally 11 for L4 = 0101111 (ISO code for the symbol "/").

The registers TO, OP1 and OP2 belong to the logic circuit (106 FIG. 1) for arithmetical calculation referenced UA, and their respective roles will be understood from the detailed description of the arithmetical unit's operation. The latter evaluates binomials, i.e. in calculation the equivalent constant, by computing the sums, differences, products and divisions from the symbols of decimal figures coded in "binary coded decimal."

In a non-limiting example of assembly, it operates figure by figure and converts the multiplications and divisions into a series of additions and subtractions.

However, if an arithmetical unit operating by groups of figures (two, three, four, etc.) is used and carries out directly the operations of multiplication and division, although the circuits properly speaking which are necessary for the arithmetical operations do not form part of the claims in the present application, this does not come outside the general framework of the invention.

The partial and final results are temporarily recorded in the reserve chain, in inscriptions in the reverse direction (beginning with the figures called low weights) when it is a question of addition, subtraction or multiplication and in inscriptions in the forward direction in the case of division. When the arithmetical operation properly speaking is ended, by appropriate linking commands, there is an exchange of segments, one from the reserve chain containing the result and the other belonging to the evaluation chain containing the binomial (see lines 13, 31, 47, 58 and 74 of FIGS. 16–18). Line 13 for example corresponds to the evaluation chain after exchange of the segments containing the result – 40 and the binomial – 28 + 12.

The four parameters of the exchange, obtained by the action of two consecutive linkages, are directly or indirectly accessible. As far as the reserve chain is concerned, one of them is the address 000 of the initial permanent link (of its retrograde brother in the case of a division), the other is the address of the sign of the result (or that of the retrograde brother of the figure with the lowest weight in a division). As far as the evaluation chain is concerned, one of the parameters is specified by the contents of the register OP2 (2009 FIG. 20), the other by the contents of the register E (804 FIG. 8). This latter register usually contains the address of the initial evaluation link and, if there are brackets, that of the bracket to the left of the binomial which is taken temporarily as that of the initial link (see line 29 FIGS. 16–18).

Because of the role played by the brackets, it is therefore preferable to describe beforehand the operation of the sequential logic circuit 108 of FIG. 1, reference PAR.

This circuit, normally inoperative, is triggered by a logic 1 transmitted on the wire DPAR of the interconnection channel by the arithmetical analyzer AA (105 FIG. 1).

Such a signal is transmitted each time that there is a combination of one of the states DEB, SP or BP (partial binomial) with the symbol "(", in accordance with the FIG. 15 and 23.

The operation of circuit 108 PAR, triggered by the command DPAR is a sequence of transfers described by the lines of FIG. 24, each line corresponding to a state of the sequential logic circuit 108 FIG. 1.

The symbol "(" is left in place; the address of the evaluation initial (which is not to be confused with that of the initial evaluation link except in the case in which there are or are no longer any brackets), contained in register E is recorded in the 3rd segment of the link being analyzed, that contains the said symbol "(", whose address is then recorded in the register E and a logic 1 on the wire reference PARA of the interconnection channel indicating the activity of the circuit PAR, such are the operations carried out simultaneously during the states of lines 0 and 1 of table FIG. 24. The instruction DEB is sent on the channel, is received and carried out by the circuit (105) AA starting with the address of the left hand bracket detected, that was recorded in the register E, during the state of line 2, simultaneously with the resetting to logic zero of the triggering signal PARA.

Concerning for example an expression such as SP 2 ₌ (3 + (4 – (5/ ( . . . , examined at the instant at which the analysis is at the last of the left hand brackets, the four brackets will be erased while the links which contained them will be the successors one of another starting from the link on the extreme right whose address will be recorded in the register E. Thus, to the normal direct and retrograde linking of the links in the evaluation chain is added a retrograde linkage in the direction shown by the curved arrows, unidirectional and specified by the contents of the third segments of the links having contained left hand brackets.

By this means and by that which will be described a few lines further on, it is possible :

- to replace any binomial surrounded by a pair of left and right hand brackets by a constant surrounded by two spaces, equivalent to the same constant unenclosed as in FIG. 15,
- to continue the evaluation of the formula starting with the address link specified by the register E.

The complement of this work is the fact of the execution of the instruction FPAR (end of bracket) by the circuit PAR. This instruction is emitted as soon as a right hand bracket is read by the analyzer if the state of the latter is P, N or C (constants with two signs followed or not followed by spaces).

The reception of the instruction FPAR (a logic 1 on the wire of the same name in the interconnection channel) causes a space to be recorded in the place of a right hand bracket in the link being analsyed (states of lines 3 and 4 in FIG. 24), then the address of the former left hand bracket, taken as evaluation initial ending in the constant previously detected enables the corresponding link to be read and a space to be recorded in it, (lines 5 and 6) then to reach the preceding evaluation initial through the action of the state of line 7. Checking of this link's address is carried out during the same sequence; the segment L4 bears the symbol NUL, it is therefore the initial evaluation link itself because it was characterized thus by the execution of the state of line 32 in FIG. 9. Therefore, there is at least one right hand bracket too many and this causes the command ERR to be emitted.

If there are not enough right hand brackets, the evaluation and print out occur normally; this leads to the printing of a partial result with the part of the expression unevaluated whose left hand brackets still exist. The behavior of the computer device can be resumed for example in the following three cases :

User : 2 × (3 + ( 4 – ( 2 / 1 ) ) )
Computer : 10
User : 2 × ( 3 + ( 4 – ( 2 / 1 ) ) ) ) )
Computer : ?
User : 2 × ( 3 + ( 4 – ( 2 / 1 )
Computer : 2 × ( 3 + ( 2

With or without brackets, the functions of the arithmetical unit are then defined precisely and completely by the contents of the registers OP1, OP2 and TO. A register OP3 and two elements of memorization Q1 and Q2 included in the arithmetical unit (106 FIG. 1 and the assembly FIG. 20) are new means enabling sums, differences, products and divisions of operands of any length to be evaluated, new means whose necessity and convenience have as their origin the use of a link memory. These new means as well as other new or usual means enter into the makeup of the arithmetical unit whose operation will be better understood by referring to FIGS. 25–32.

This operation rests essentially on the properties of the addition and subtraction circuits since, in a non-limiting way, multiplications and divisions will be obtained, as already explained, by the repetition of adding and subtracting operations. In these non-limiting conditions, the arithmetical unit can be considered as resulting from the association of the sequential logic circuit proper to the said unit and of an addition-subtraction logic circuit. This circuit (FIG. 26) suitably triggered by the arithmetical sequential circuit (FIG. 29) will have as its object the addition or subtraction of constants of any length and sign and, in a more precise way, the summing of two positive whole numbers A and B of any length or the finding of the difference between A and B, this choice between sum and difference depending on the combination of the logic values of TO [1], TO [3] and TO[4] since the logic value of TO [2] is zero in the two cases of addition and subtraction.

Within the same framework of a non-limiting description, it is supposed that each link only contains one data symbol, that the said symbol is coded in accordance with the international code (ISO) and that as a result, in accordance with FIG. 21, only the elements B4, B3, B2 and B1 of the figure codes with the classical correspondence 0000 to zero, 0001 to one, 0010 to two, . . . 1001 to nine, are taken into account. This numerical coding, commonly called binary coded decimal, will be called BCD by abbreviation for the rest of the present document.

The BCD adder used is not a new means and descriptions exist in the literature in particular "Arithmetic Operations in Digital Computers" by R.K. Richards. It is given as a reminder (FIG. 25) that such an adder is an assembly of logic circuits so arranged that, when it receives at any instant the BCD codes of two decimal figures on two groups of four conducting wires as well as the possible carry-over coming from the result of a preceding addition (or a simultaneous addition by a second adder) or from any logic combination chosen by the manufacturer, a layer of four other conducting wires bears under the same coding the module 10 decimal sum of the two figures and the possible "-preceding" carry-over while a possible "actual" carry-over may appear on a fifth wire.

A second known means, assembled in the form of logic circuits inverting, under the effect of a logic signal MIN, the logic values of the four BCD coded elements of the decimal figure, which has not subtracted a difference, and those of the four elements of the result coming from the output wires of the BCD adder, enables the difference, called the positive difference, (e.g.: 5–9 has as normal difference –4 and as positive difference 6) to be obtained with the generation of a carry-over if the said positive difference is in fact negative, which would be the case of the example cited in brackets.

Descriptions of different variations of this second known means will easily be found in the literature, the most recent being "Subtraction by Minuend Complementation," an article by Glen. L. Langdon, IEEE Transactions on Computers, January 1969, Vol. C – 18, No. 1, p. 74 (elements 2602 and 2603 in FIG. 26).

The new means now described intend to allow the addition of constants of any length, for example 999999 + 1. It is in fact certain that in the majority of known equipments the length of the two operands is the same. The second operand of the above example must be "changed into" 000001 usually by specific programming or by force (in particular in the current programming languages).

For this purpose, a "filtering" logic circuit 2606 inserted between the layer of conducting wires leading to the group L4 of the interconnection channel on the one hand and the four wires bearing the BCD code entering the inverter 2602 referenced MIN is "transparent," i.e. it transmits without modification the ten code combinations which effectively represent a figure while for any other combination the four wires leaving the circuit 2606 to go to the circuit 2602 bear four logic zeros. In conjunction with the method for reading the two operands described further on, this device will enable the length restrictions to be effectively eliminated.

Figures 25, 27:
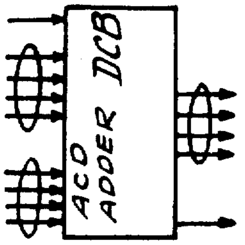

When, in accordance with FIG. 27, the contents of the register TO being 0000, 0011, 1001 and 1010, the operation to be carried out is a sum, the inversion instruction MIN is inactive.

The assembly then functions as a BCD adder of the classical type operating figure by figure and it suffices to feed correctly the parts L4 and EL4 of the standardized interconnection channel to read the two operands from right to left (i.e. read alternatively the corresponding links of the evaluation chain in the reverse direction) and record progressively the successive figures of the result in the reserve chain in the reverse direction also, starting with the initial permanent link.

Figure 29:
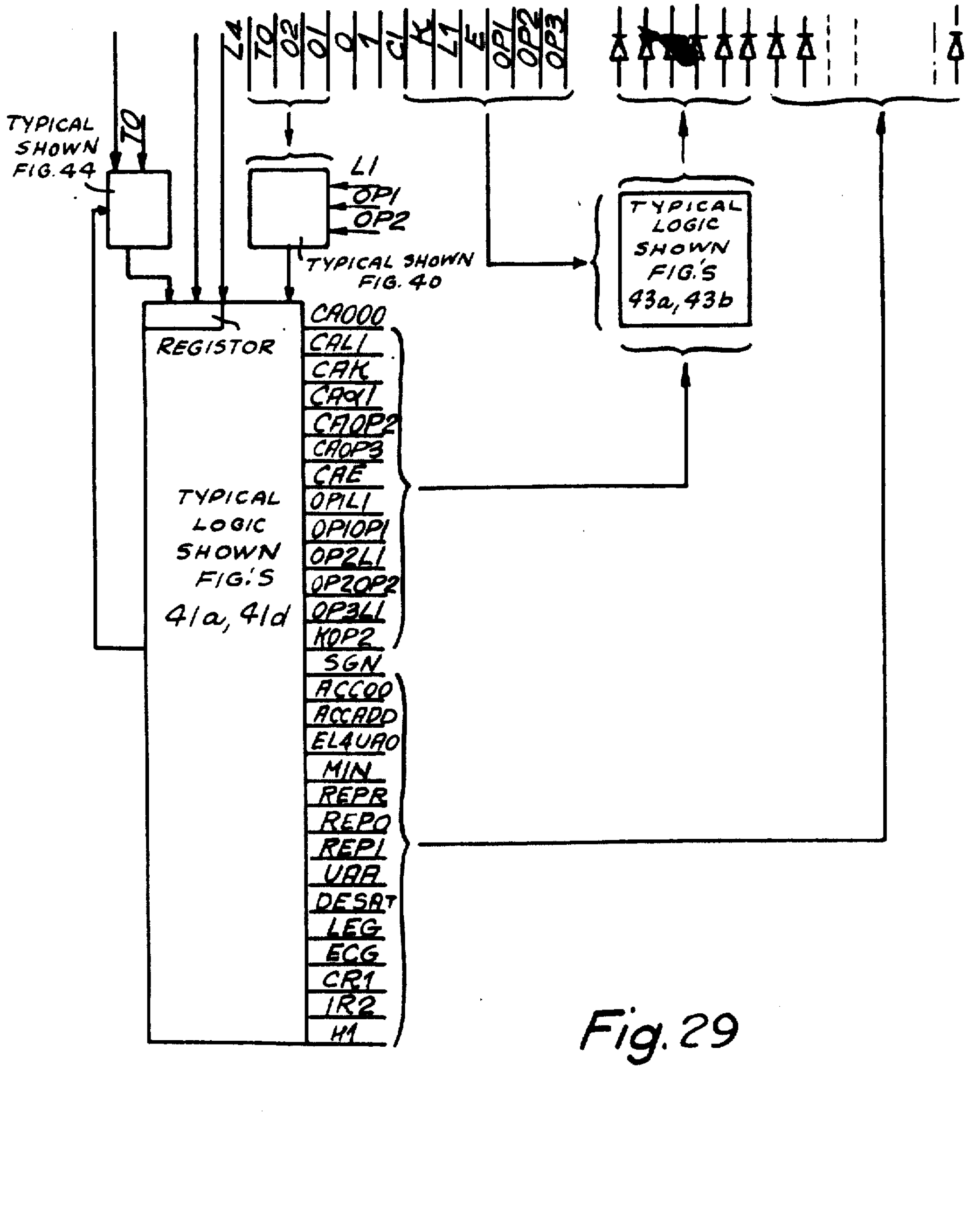

The series of commands for this effect and used by the circuit shown in FIG. 29 is described by the FIGS. **28*a* and 28*b***.

It is understood that the BCD adder is arranged internally as a hexadecimal adder to whose result is added the binary quantity 0110 (i.e. the binary coded decimal code for 6) as soon as the intermediate hexadecimal result is greater than 9 when it is effectively a sum (1001).

The intermediate hexadecimal result corresponding to BCD 1000 + 0010 for example is 1010 to which is added 0110, which give 0000 and a carry-over (already in BCD).

In the same way, when any hexadecimal quantity is fed in at the input, its operation remains the same. Thus 1111 + 0010 must give 0001 and a carry-over to which is added 0110 to give finally 0111 and the carry-over. It is this important property which will enable negative results to be obtained in the form of positive differences and in particular the decimal complements of the said differences.

The sequence of FIGS. **28*a* and 28*b*** is triggered by the command $\overline{\text{UA TO[2]}}$; it corresponds in fact to the addition or subtraction operations for which TO [2] = 0.

Figure 20:
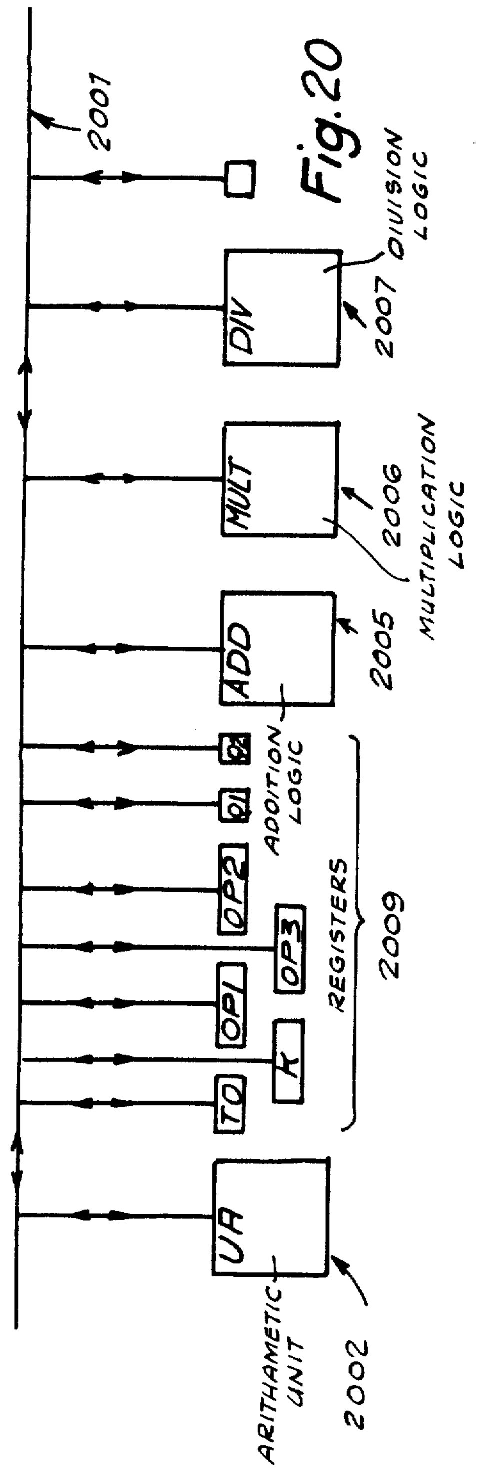

The two registers OP1 and OP2 are going to be used as operand pointers and it should be noted that they contain at the beginning of the execution of an command to the arithmetical unit the address of the links containing the low weights of the corresponding constants (2009 in FIG. 20).

The reserve chain will contain the temporary result and a third pointer; the register OP3 (2009 in FIG. 20) will enable the address of the heaviest weight of the partial result whose lowest weight is recorded in the retrograde brother of the initial permanent link to be known at any instant.

Figure 30:
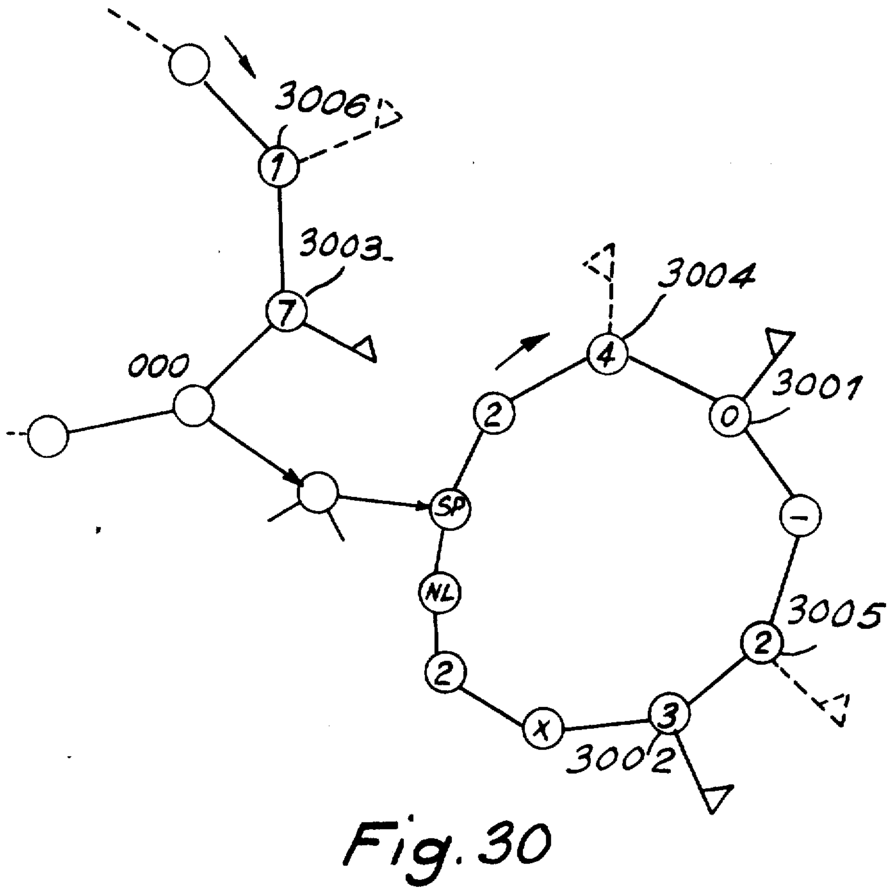

By referring for example to FIG. 30, the evaluation chain contains the expression 240 – 23 ₋ 2 NL and it may be supposed that the analysis has reached the symbol ₋. In accordance with the actions defined by FIG. **22*c* a, the register TO contains 0010 and the registers OP1 and OP2 contain the addresses of the links indicated in 3002**.

The first subtraction of the low weights recorded under OP1 and OP2 should give the partial result, a low weight of the complete result but temporarily a high weight of the partial result, i.e. the FIG. 7, whose address is recorded by the register OP3.

The three pointers are then moved in accordance with the indications of the retrograde linkage segments and in FIG. 30 will occupy the dotted positions 3004, 3005 and 3006 and so on for each figure.

The two states of lines 0 and 1 of FIGS. **28*a* and 28*b* prepare the initial permanent link's retrograde brother's pointer, the accumulation register and the BCD adder report, the operand length indicators Q1 and Q2 which are at logic 1** level as long as there is a figure to add in the first and second operand. The address contained in OP2 is placed in reserve for later linking. For each reading in the reserve chain, there is naturally a check the eventually emptiness of the current chain.

The corresponding reading in line 3 follows the state of line 2, in which the address link indicated by OP1 is read and the reserve link pointer is validated.

The command MIN is triggered if there is a difference to be found, i.e. subtraction of the second operand from the first, which is indicated by TO = 0010 or 0001 and by the operating mode indicated in the works cited.

The result is recorded in the accumulation and carry-over action under the state of line 4 and, at this stage, it is a question of the addition or subtraction of the preceding carry-over from the current figure of the first operand.

The pointer OP1 is updated by reading and recording in OP1 of the address indicated by the segment L1, i.e. the address of the retrograde brother of the link which has just been read. However, if this link contains a symbol different from a figure, it is then the content of OP1 which is rerecorded. In the case of FIG. 30, the pointer OP1 will be stopped permanently at the link containing the symbol SP and, simultaneously, the length indicator Q1 will be set to logic zero. That is the signification of $OP1 \leftarrow (L1 \wedge (Q1 \leftarrow L4 = D)) \vee (OP1 \wedge (\overline{Q1} \leftarrow \overline{L4 = D}))$ expression in which $L4 = D$ is worth 1 if the symbol being read is a figure D, or zero in the opposite case. If $Q1 = 0$, then $\overline{Q1}$ is worth 1 and it is the contents of OP1 which are transferred to OP1.

The addition-subtraction of the corresponding figure of the second operand is done during the state of line 6 and the register OP2 is updated in the same way. In the process, the instruction MIN is triggered during the state of line 5 if it is a question of subtracting the first operand from the second (operation for which TO is 1000 or 1011). It may be noted that the sign = is used here as a symbol of operator logic and TO [3] = TO [4] is worth 1 if TO [3] and TO [4] are equal, while TO [3] = TO [4] is worth 1 in the opposite case.

The partial result, limited on the left by 011 (the three moments B7, B6 and B5 common to all the figures) is transferred on EL4 and then recorded at the address indicated by OP3 and the addition cycle figure by figure begins again at the state of line 2. When one of the two pointers is stopped on a symbol which is not a figure, the logic circuit 2606 of FIG. 26 arranges that the adder receives as corresponding operand an arithmetical zero.

When the two pointers are stopped, which is indicated by $Q1 \vee Q2 = 0$ and in the case in which it is a question of the effective sum of two operands, which is characterized by MIN =0, there is execution of the states of lines 12 to 19. The pointer OP3 is "retrograded"by one link which is recorded the possible carry-over which may be zero or one in the ISO form (with 011 as prefix) then, after another retrograding, the sign of the result of the real sum is recorded as a function of the content of TO [1], TO [3] and TO [4] in accordance with the first, fourth, sixth and seventh lines of FIG. 27. In the case in which MIN and REP are both not, nuls it is then a difference in positive form. For example, in line 11, the result of the evaluation of the binomial 9-16 would be 93 with a carry-over not nul and 93 is the difference in positive form whose complement to 100; i.e. 7, is the absolute form corresponding to − 7, the states 20 to 27 enabling this decimal complementation to be obtained by subtraction of the number recorded in the reserve memory (bounded by the two links, one of address 000 and the other by the address inscribed in OP3) from the number 000000 . . . , containing as many zeros as there are figures in the number to be complemented. When the address link OP3 is reached, which is detected by the state of line 27, a symbol "—" (of code 0101101) is recorded in the link which is retrograde brother to that of the address OP3. Then, by the states of lines 33 to 43, two linkages defined by H1 { retrograde brother of the first link of the result, link specified by E } H1 { retrograde brother of the initial permanent link, link specified by E }, the result is inserted instead of the binomial in the expression to be evaluated.

The principle of the evaluation of a product, for which TO [2] = 1 and TO [3] = 0, can be understood by referring to an example of the application, recalled here as a reminder and not being part of the claims in the present application.

Take a binomial, e.g. 87 ˍ 65; the registers E, OP1 and OP2 contain respectively the address of the retrograde brother of the link containing the figure 8, the address of the link bearing the figure 7 and the address of the link bearing the figure 5.

Figure 31A:
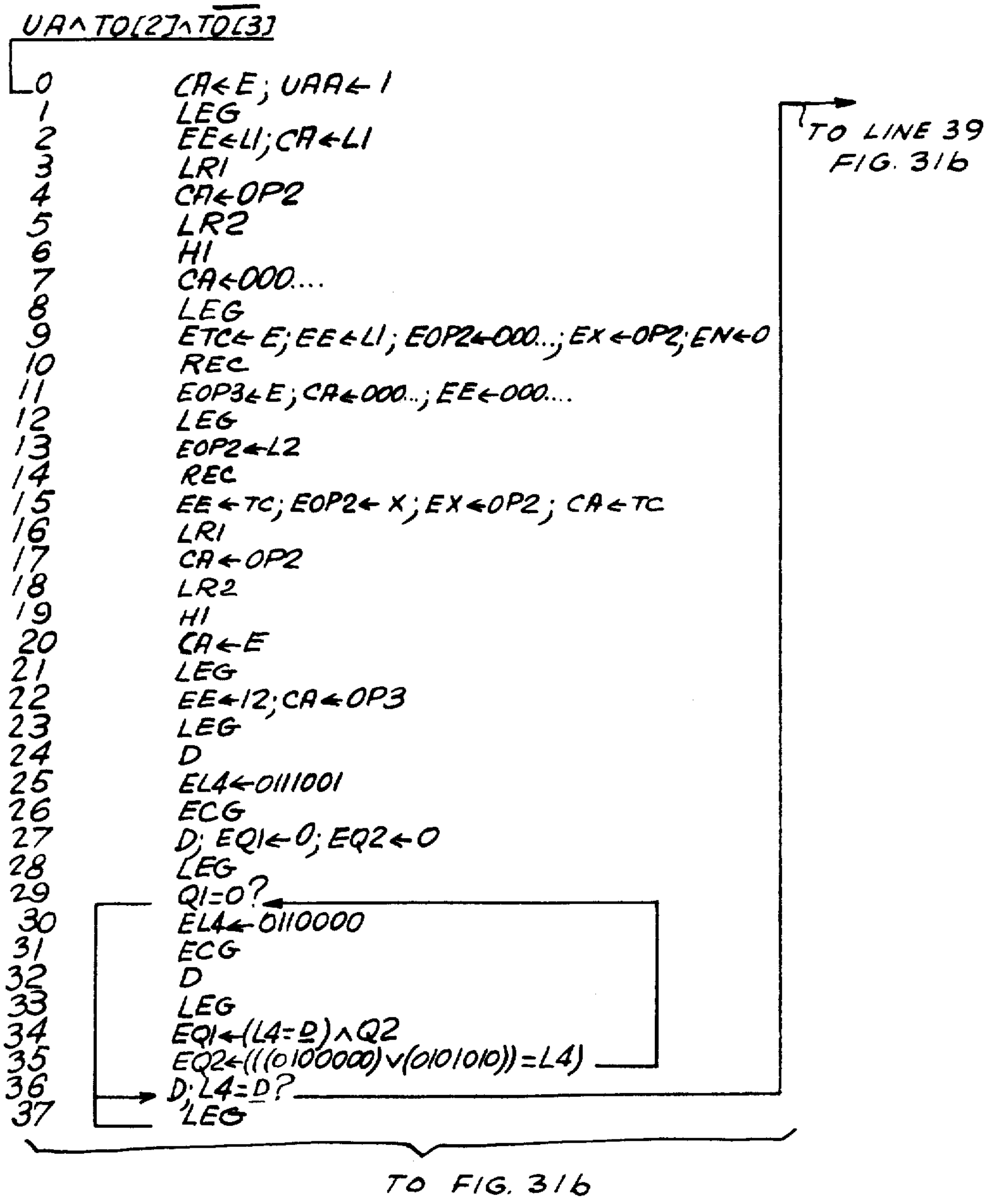
Figure 31B:
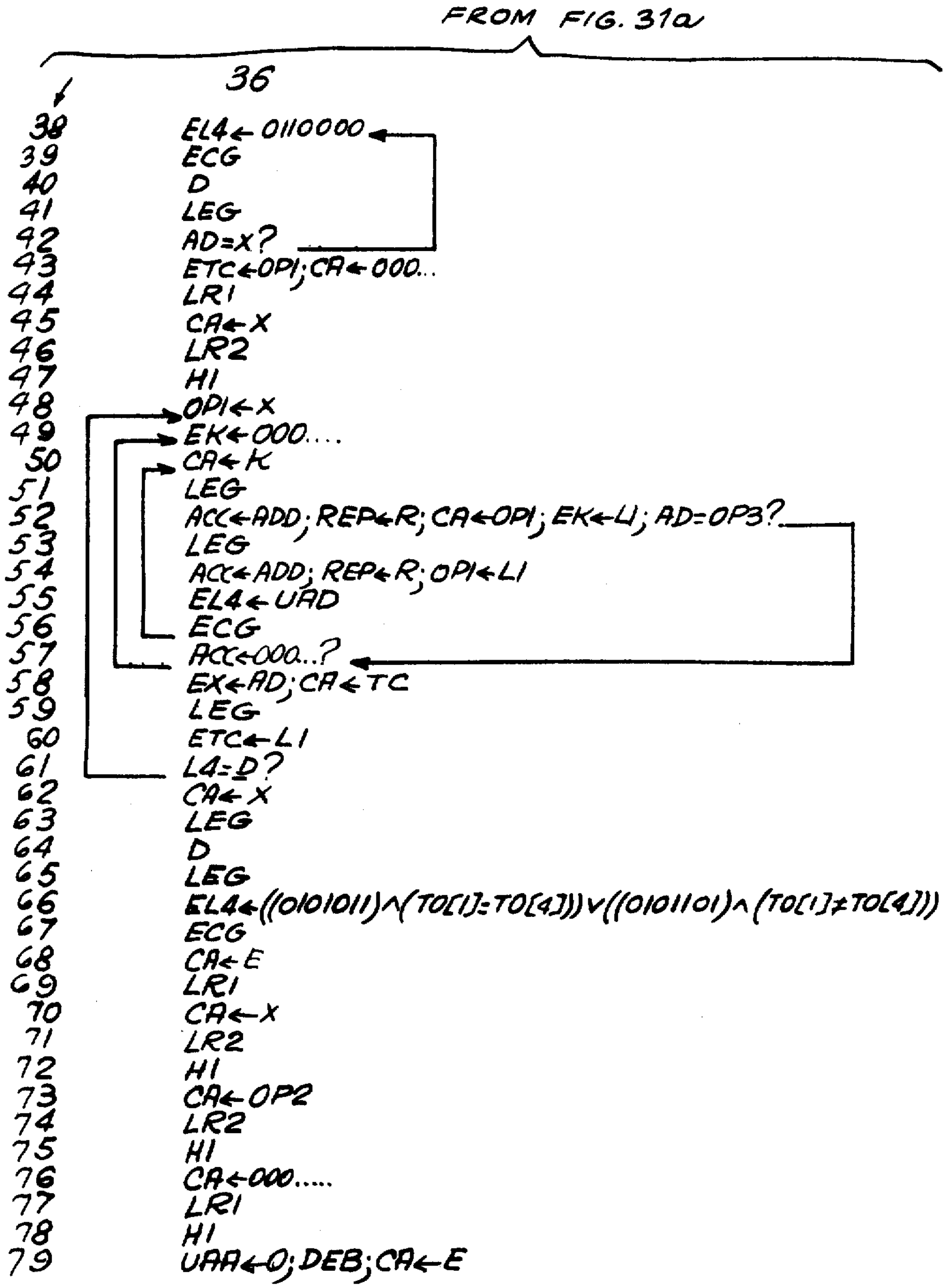

The procedure applied by the sequences defined in FIGS. 31*a* and 31*b* can be resumed as follows :

this binomial is recopied with a modification in the reserve chain, the operation symbol and the figures on its right being replaced by zeros, which in the example cited gives 87000;

this last constant is isolated linkage, the same binomial is recopied with a modification once more in the reserve chain but the first figure is a 9, the following figures zeros up to and including the recopy with a modification of the symbol ˍ while the figures after this symbol are really recopied; the number 90065 is therefore recorded in the reserve chain;

an iterated sum without final carry-over of 87000 to 90065 with accumulation in the closed chain that initially contained 87000 takes place and is stopped at the instant when the first figure on the left of the accumulation chain is zero, in accordance with the continuation below of the same example.

87000 + 90065 77065

77065 + 90065 67130

27390 + 90065 17455

17455 + 90065 07520 the left hand pointer of the expression 87 ˍ 65 which is the address contained in the register E, allows the erasure of the figure with the heaviest weight and a check of the existence of the following figure. If this exists, the result contained in the accumulation chain is displaced one unit to the left and a new iterated summation is started which, continuing with the same example, gives :

75200 + 90065 65525

65525 + 90065 55330

15585 + 90065 05655

If, on the other hand, the check of the existence of a figure is negative, it means that the product is completely evaluated, which is the case in the present example when the erasure of the second figure has been carried out. An erasure is understood here as a replacement of the figure by the symbol SP.

The final result of the evaluation of 87 ‗ 65 is therefore 05655.

The principle of the evaluation of a division, for which TO [2] = 1 and TO [3] = 1 can be understood by referring to another simple example.

Figure 32A:
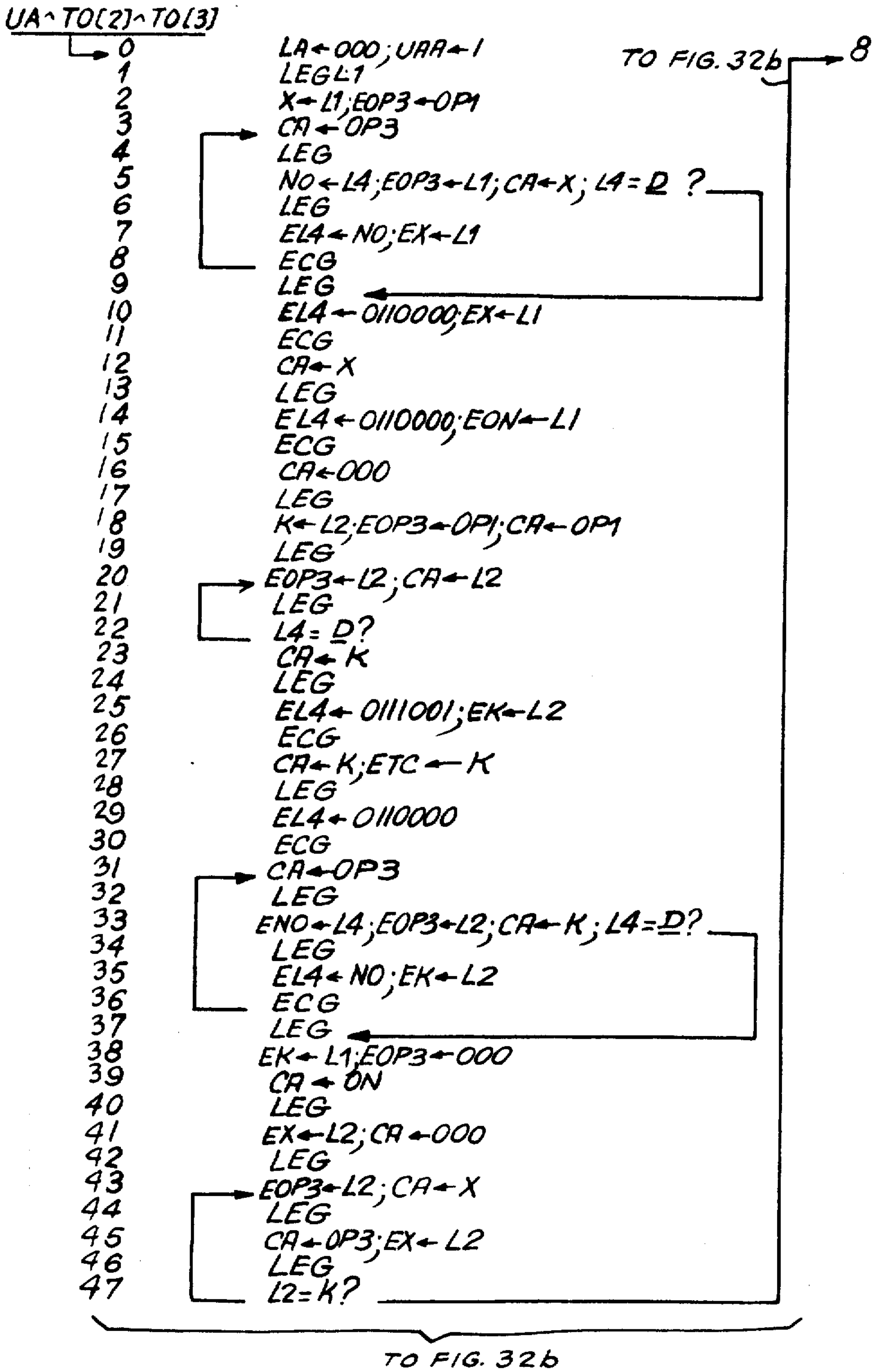
Figure 32B:
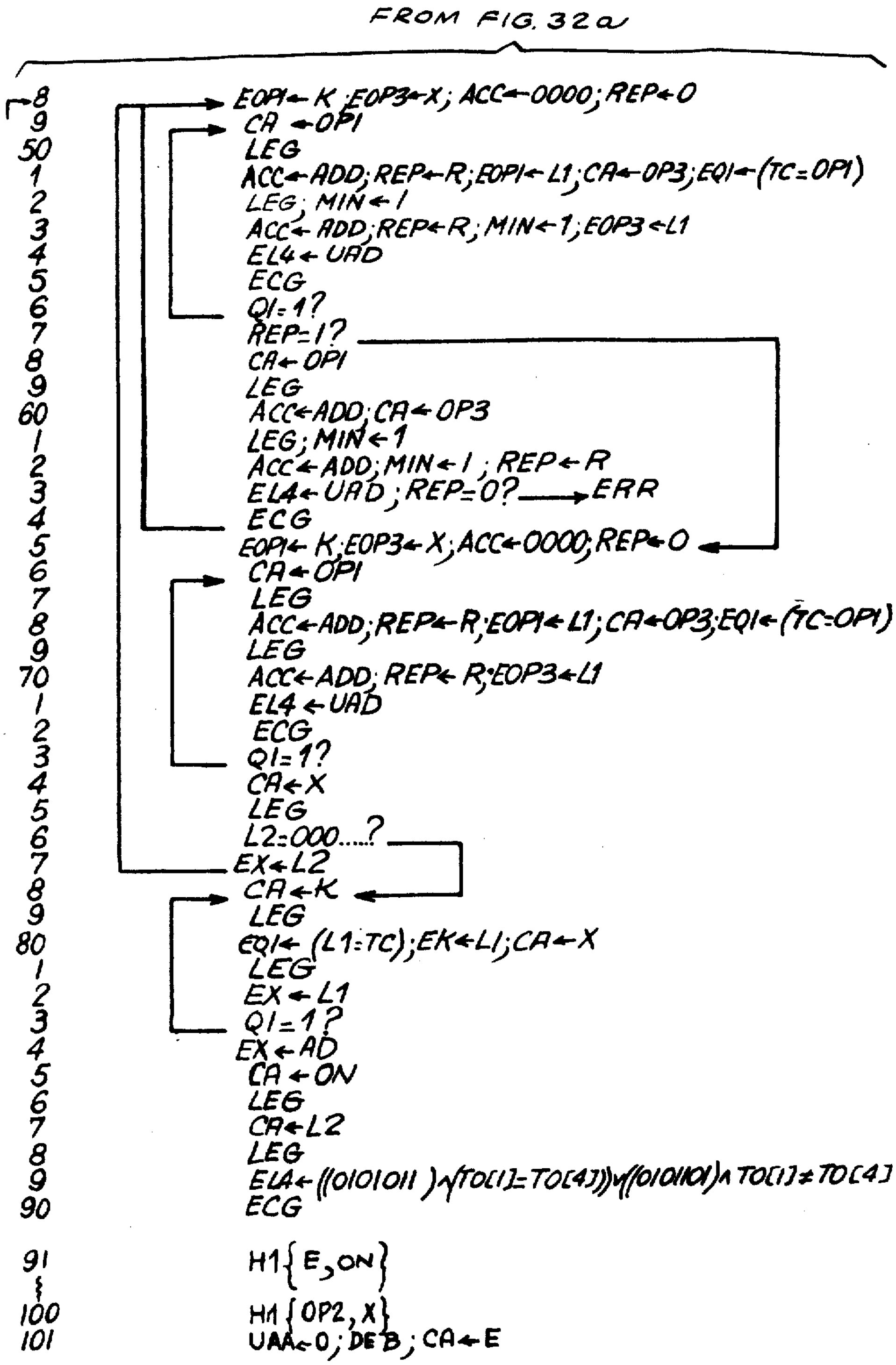

Take a binomial 5655 / 65; as previously the registers E, OP1 and OP2 contain the i.e. of the significant links of the binomial, i.e., containing the left hand limit and the two figures of the low weights in the two operands.

an operation of recopying on the first operand moves the copy of the said operand to the retrograde brother links of the reserve chain's initial permanent link (address 000 . . ) (states of lines 0 to 8 in FIGS. 32*a* and 32*b*).

two zeros are recorded consecutively in the reverse direction with respect to the said copy, which leads to 005655 and the register ON receives the address of the retrograde link of the first zero (states of lines 9 to 15).

the diviser is analyzed in the forward direction after the pointer specified by the register OP1; the forward passage of the binomial to be evaluated must therefore be made up to the instant when a figure which will be the first of the figures in the divisor is encountered (states of lines 16 to 23).

from this event, the two figures 9 and 0 and then the divisor itself (states of lines 23 to 37) should be recorded in the direct part with respect to the initial permanent link of the reserve chain; on one side and on the other of the initial permanent link, the reserve chain therefore bears 005655 whose retrograde limit is defined by the contents of the register K.

finally successive subtractions of 65 from 5655 should be carried out putting first of all the first figure of the divisor in correspondence with the first figure of the dividend (states of lines 37 to 47) on the one hand and in determining in the number 9065 the place of the figure 0 for which there is a check of the carry-over without transmission to the following figure on the other, the results of these operations being recorded in the registers X and TC.

the utility of the said operations will be better understood by referring to the following numerical examples; it is possible to consider for better understanding that the two numbers are placed relatively one with respect to the other as below.

0 ↓056 ↓55

−9 065

The right hand vertical arrow is defined by the registers K and X while that on the left hand is defined by the register TC, during the first subtraction, there is a carry-over to the left of the left hand arrow and after checking the state of line 57 an addition (states of lines 65 to 73) cancels the subtraction and then a movement in the forward direction of the number 9065 by modification of the register X results in beginning the operation again with the new relative position

00 ↓ 565 ↓ 5

−9 065 there is no carry-over and the result of the first subtraction is

01 ↓ 490 ↓ 5 from which is subtracted in the same conditions the same number 9065.

This subtraction is iterated as long as there is no carry-over in the position indicated by the left hand arrow and one of the intermediate result is

08 ↓ 045 ↓ 5

A later subtraction causes a carry-over to appear in the position of the left hand arrow and, as a result, an addition which erases the effects and rearranges the register X in such a way that the two marker arrows occupy the position indicated below.

080 ↓ 455 ↓

−9 065

The number 9065 is again available for a third series of subtractions or subtraction tests so that the final result is :

087000

The operation stops there because, in fact, the check of the state of line 75 determines that the link addressed by the register X is the last in the forward direction of the dividend, the direct brother of this last link being the initial permanent address link 000 . . .

the sign of the resultant is recorded by the states of lines 89 and 90.

two successive linkage, written in abbreviated form and triggered by the states of lines 91 to 100 replace in the expression to be evaluated the binomial 5655/65 with terminals defined by the registers E and OP2 by the result with sign + 87 with terminals defined by the registers ON and X.

One of the most important purpose of the means used in assembling the computer device described in the present application is to process in an expression to be evaluated any occurrence of variable names. This purpose is realized by the connection to the standardized interconnection channel of name processing sequential logic circuit, sub-assembly 107 of figure 1. The role of the names of variables was described succintly on p. 3 and the following pages of the present application. Within the framework of the rules for the assembly of the letters, figures, signs and various symbols chosen as a non-limiting example, any uninterrupted series of letters is acceptable as the name of a variable and can be included in an expression to be evaluated if the variable has been "declared." The operation of the name processing device can be broken down into three parts : the fist which makes or modifies the variables, the second which uses them and the third which erases them. Making the names of variables (or modifyig a variable already recorded) is obtained by typing an expression followed by the symbol &, this symbol being followed in its turn by the name itself.

As an example, the expression 12 ₌ 12 & C whose typing on the key-board of the typewriter is followed by that of the key NL triggers the series of activities appropriate to the recognition of the symbol NL, in particular the conversion of the binomial 12 ₋ 12 into an equivalent constant 144. It is the same for any other expression of attribution to a name, no matter how complicated it is and, as a result, it is advisable to limit the explanation to that of the attribution of a constant to a name of a variable either existing beforehand or not. In what follows, the collection of couples of constants and names will be called a file and at a given instant, a representation of the said file is similar to that of FIG. 2.

The processing of the names of variables would not be complete without a mechanism erasing one or all of the variables declared, the third part of the work assigned to the processing device.

That is why the real operation and the assembly of the sequential logic processing circuit are broken down into four subassemblies, each of them corresponding to an autonomous sequential sub-circuit.

Figure 34A:
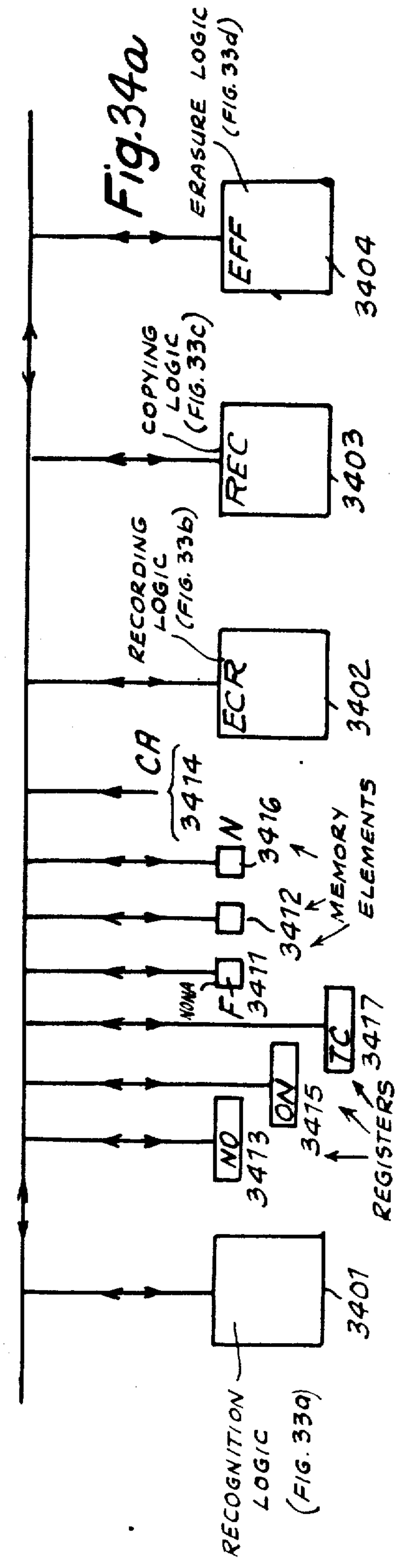
Figure 33A:
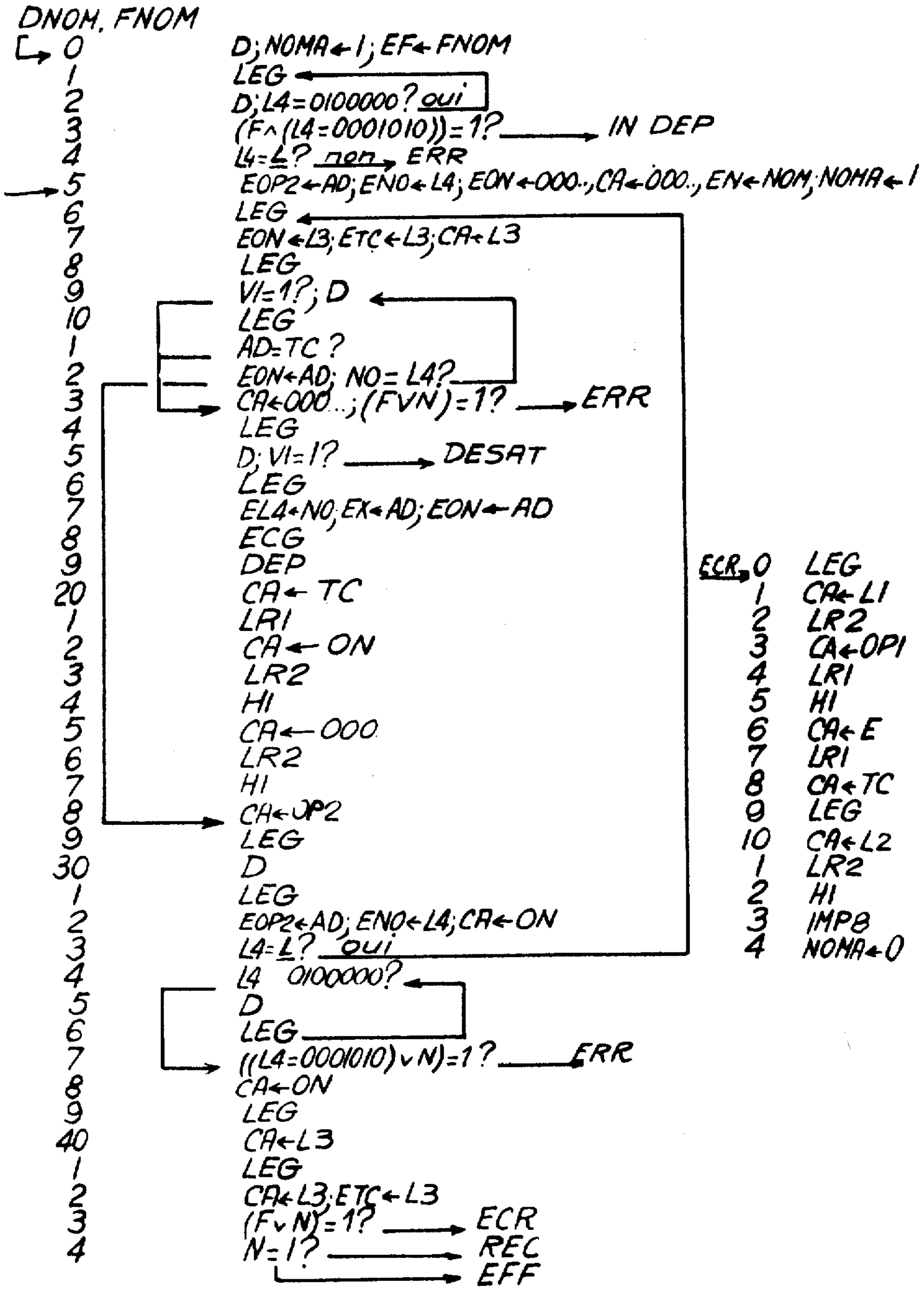
Figures 34B, 34C:
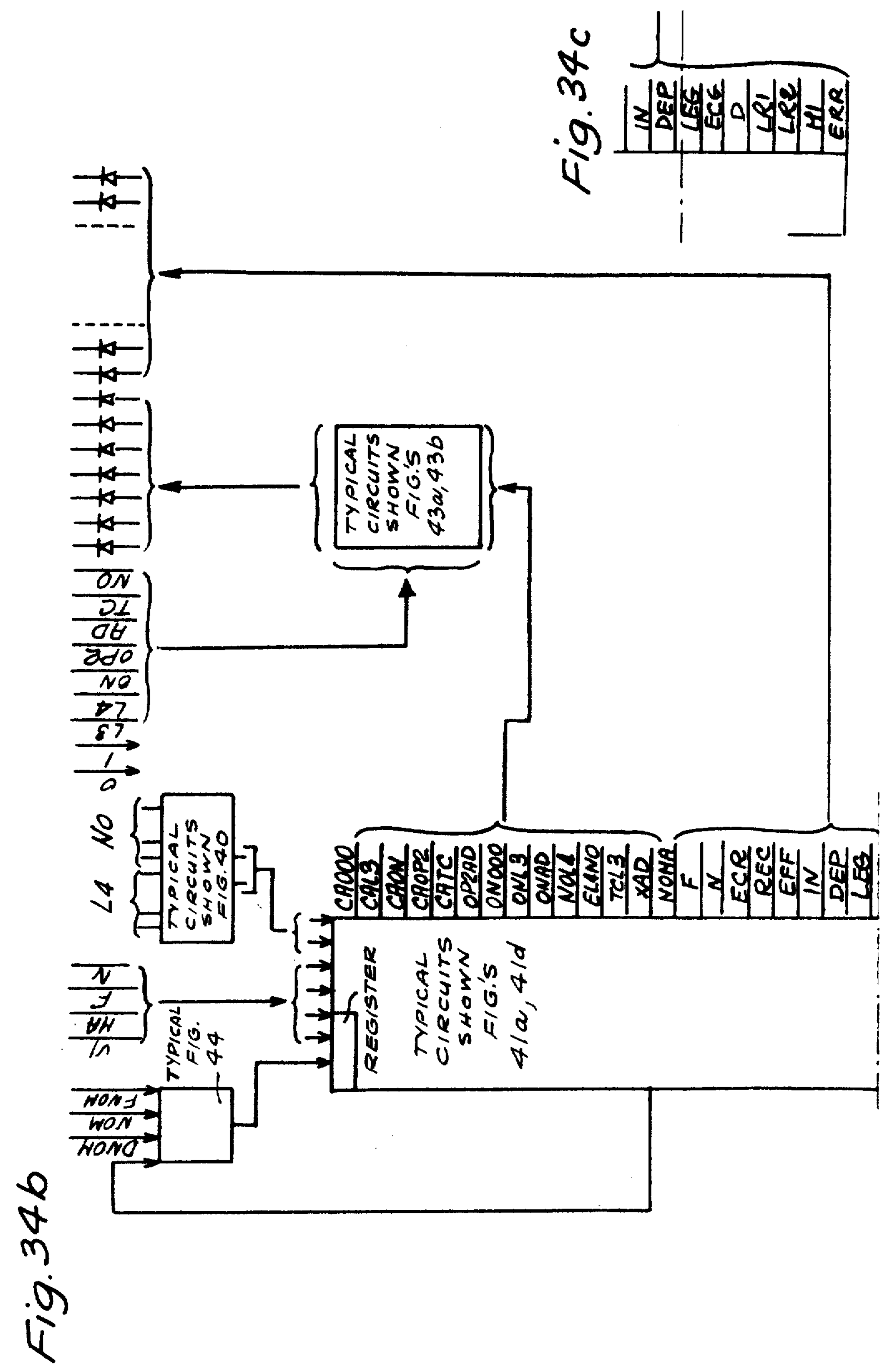
Figure 34D:
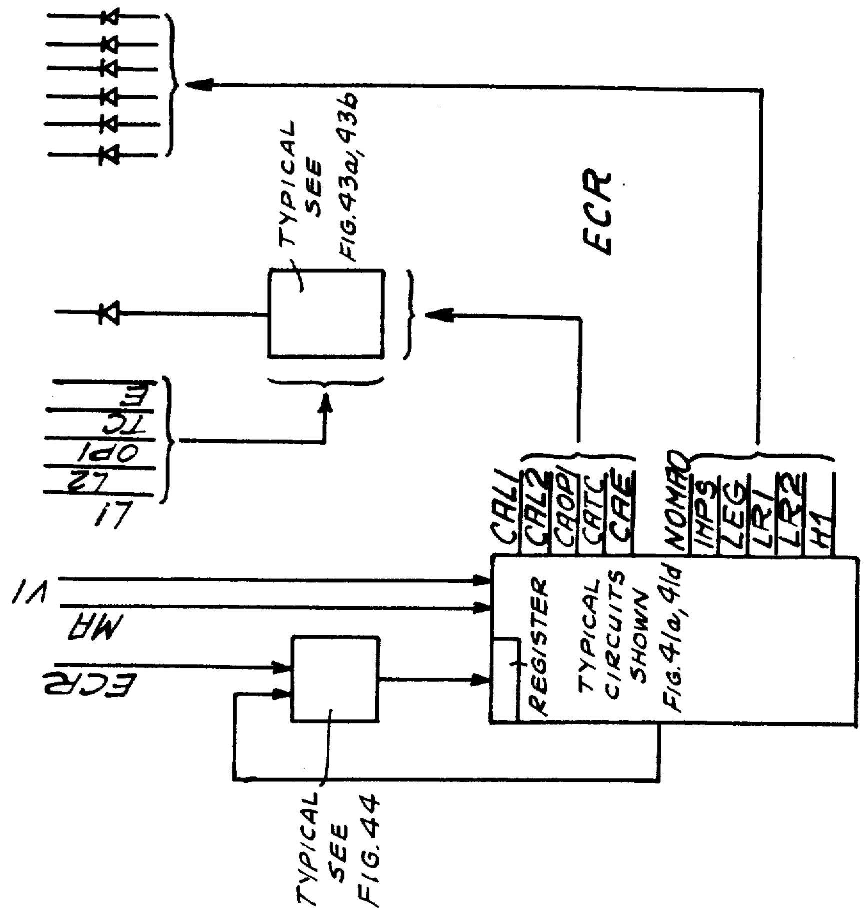
Figure 34E:
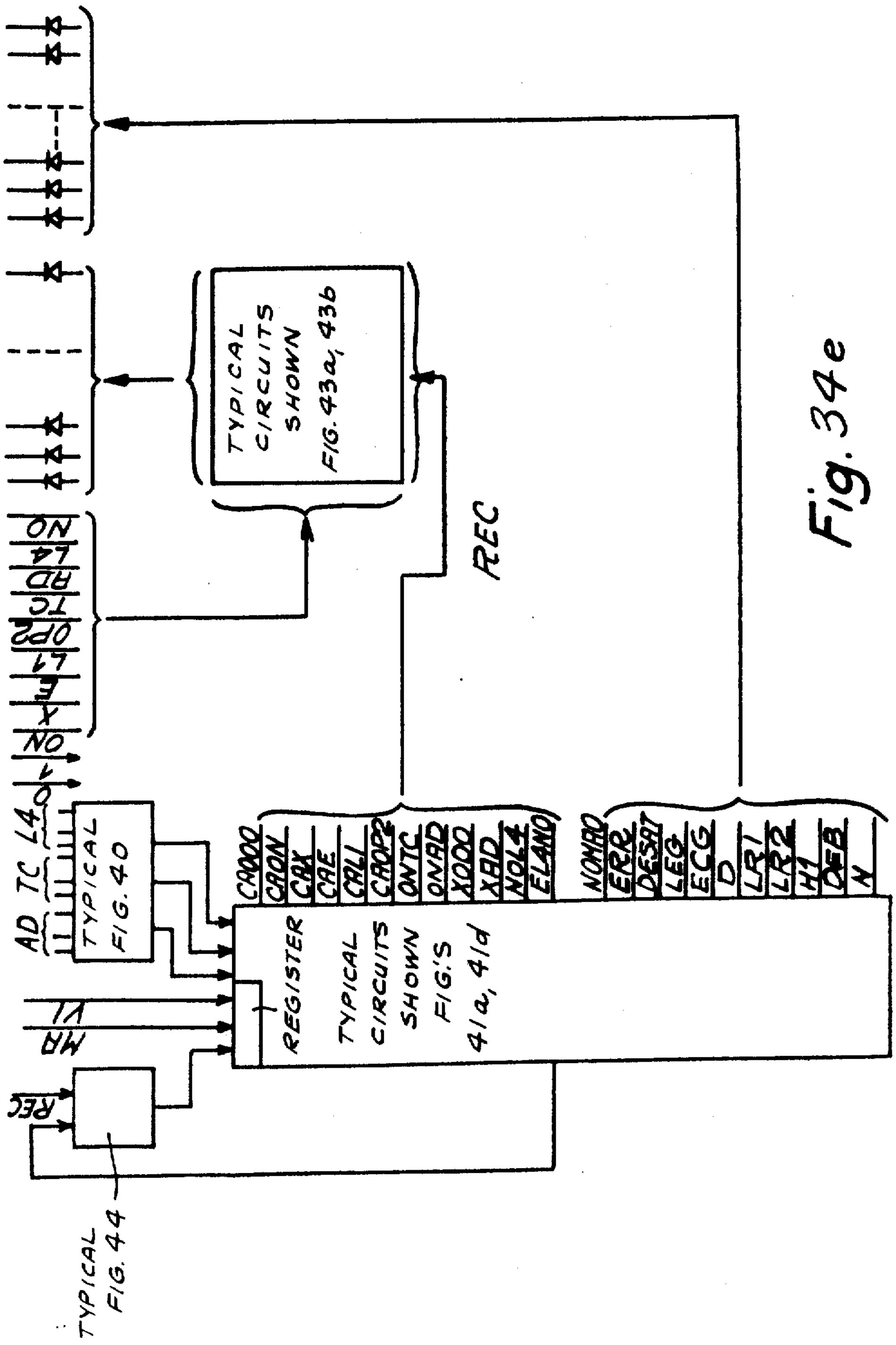
Figure 34F:
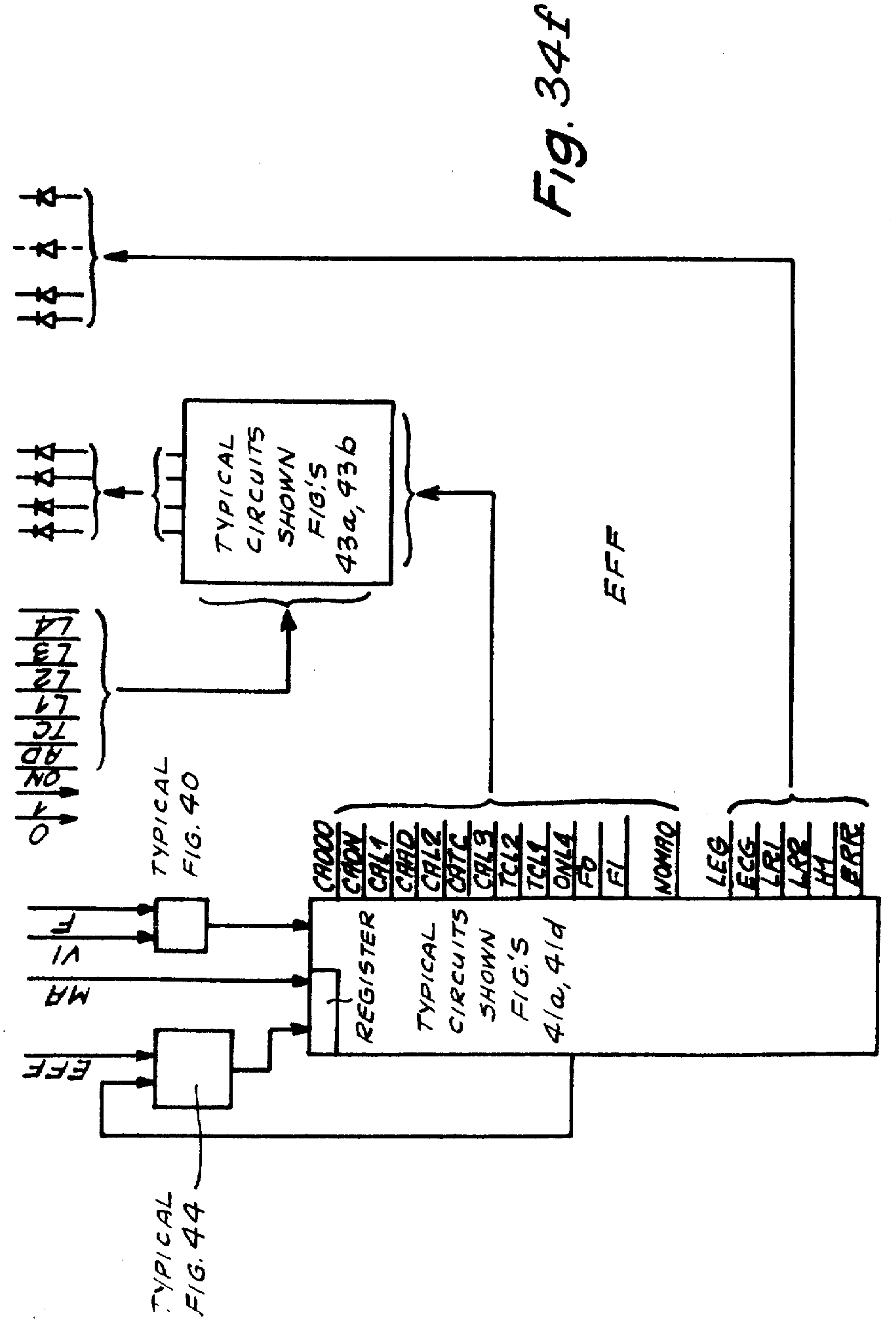

As far as the operation is concerned, FIGS. 33a and 33d enables all the details to be understood while FIGS. 34a and 34e shows the structure and the internal connections of the sequential logic processing circuit's four sub-assemblies.

Figure 33C:
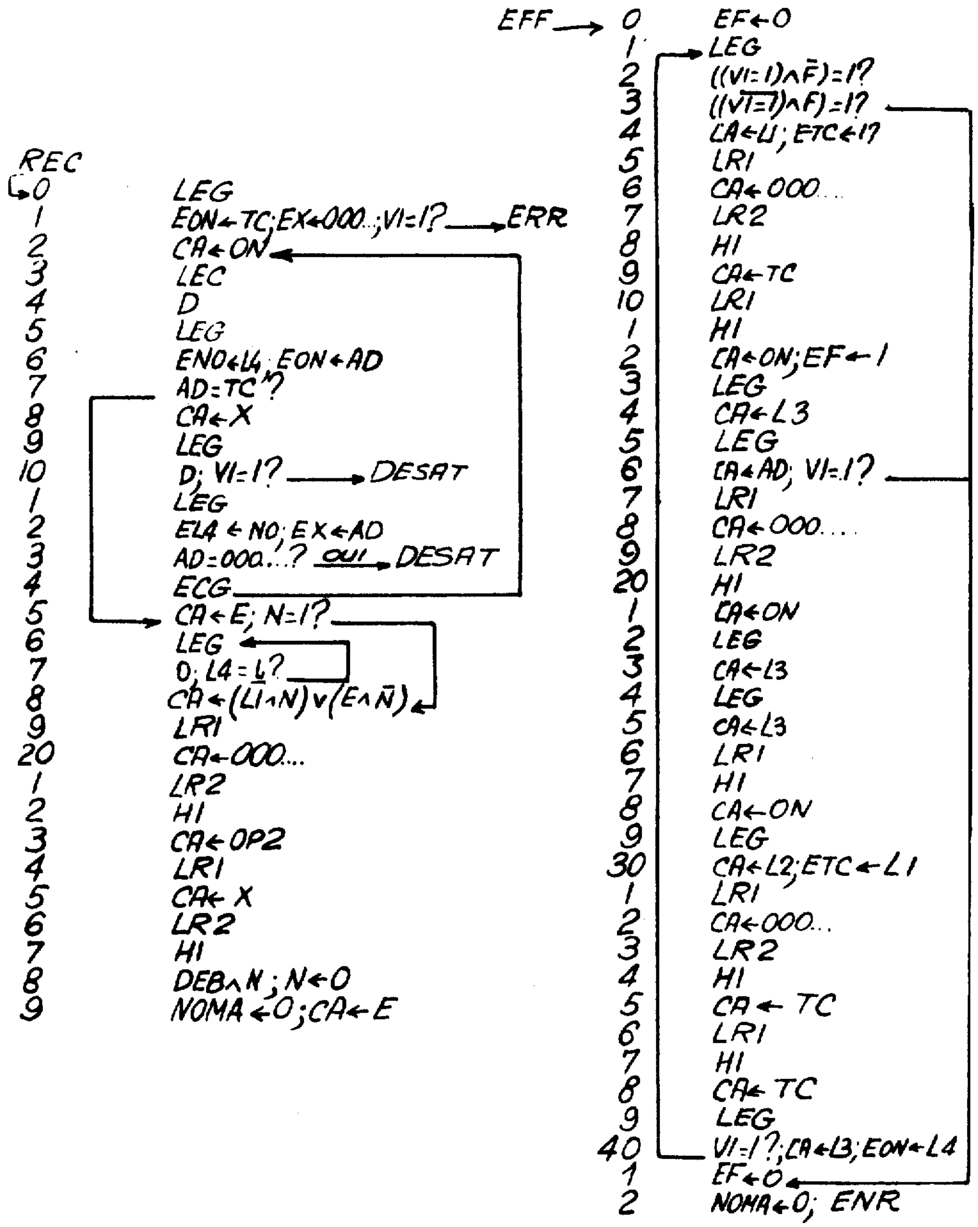

FIG. 33 comprises four sub-tables in FIGS. 33*a* and 33*d* corresponding respectively to the recognition of the names properly speaking (FIG. 33*a*), the inscription of a declared variable (FIG. 33*b*, referenced ECR), the recopying of a declared variable (FIG. 33*c*, referenced REC) and the erasure (FIG. 33*d*, referenced EFF).

The operation of the common circuit (FIG. 34*b*) whose phases are represented in the FIG. 33*a* is triggered by the commands DNOM (start of name), FNOM (end of name) and NOM (recopying of a variable) emitted by the circuit (105 FIG. 1) referenced AA in the form of logic "one" levels on the appropriate command wires of the same name which are part of the standardized interconnection channel.

If the command DNOM is emitted as soon as the circuit AA recognizes in the evaluation chain a constant followed by the symbol &, the command FNOM is emitted when the said chain contains the symbol & not preceded by any constant. Within the limited framework chosen as an example of machine language, the expression & ART for example signifies the erasure of the variable ART and the placing in reserve of the corresponding links.

Also, if the symbol & is only followed by the function symbol NL, the erasure of the whole file will result.

The state of line 0 causes a logic 1 to be recorded in the memorization element F (3411 in FIG. 34*a*) if the circuit is triggered by the command FNOM and, also, if the memorization element NOMA (3412) bearing the level 1 shows the state of activity of the name processing circuit.

The states of lines 1 and 2 are gone through and cycled on themselves as long as the symbols following the symbol & are spaces and in the case in which the symbol encountered afterwards is NL and if before that there was triggering by the instruction FNOM, the state of line 3 causes the command IN (initializing) to be emitted on the channel; this command is received by the memory (see 412 in FIG. 4 and the text on p. 8) which then links all the cells in the reserve chain; this corresponds to the complete erasure of any file and evaluation chain which might exist at that instant.

In all other cases, there is an error if the symbol & is followed by significant symbols other than letters (state of line 4).

The register OP2 is updated as soon as the first letter of the name of a variable is encountered, this same letter being recorded in the register 3413, referenced NO, provided for the purpose. A second register ON (3415) receives the address of the file link being retained while NO receives that of the evaluation chain link containing the letter being analyzed. The register ON and also the addressing channel CA (3414) of the standardized interconnection channel receive the address of the initial permanent link i.e. 000 . . . (see 201 FIG. 2). If the common processing circuit of names is triggered by the command NOM emitted by the analysis circuit 104 in accordance with FIGS. 15, 22*a*, 22*b* and 23, the memorization element (3416) referenced N is raised to the logic 1 level and of course it is the same for the element NOMA.

These transfers, requested during the state of line 5, are followed by a cycle of reading in the memory at the address indicated by CA and, during the state of line 7, there is access to an initial link (of the file during the first passage e.g. 203 in FIG. 2).

The register TC (3417) records the address of the initial link of any symmetrically closed chain and will be used later to detect any complete passage of a chain (FIG. 2, 204 or 206). The content of the register ON is updated and later contains the address of the file link being examined (or retained as already explained).

The states of lines 9 to 13 allow reading in the forward direction of the chain of letters up to the instant when the letter read is identical to the letter being analyzed and recorded in the register NO.

In the case in which the letter is recognized, the following state is that of line 28. If, for example, the name of the variable being analyzed is CA, the file being represented in FIG. 2, the letter C is recognized during the passage of the initial letter chain 204.

The states of lines 28 to 32 have as their purpose to read the symbol contained in the direct brother of the link being analyzed in the evaluation chain, symbol specified by its address recorded by the register OP2. There is therefore, during the state 32, an updating of the registers OP2, NO and ON, this latter containing the address of the file link bearing the letter C considered as initial letter. If the following symbol is still a letter, and it is the case considered here, the same cycle is begun again by the return to the state of line 6, the link 208 (of FIG. 2) then taking the role held previously by the link 203. The letter A is in fact encountered during the reading in the forward direction of the chain 207.

If the symbol successor of CA in the evaluation chain, apart from the case of one or more spaces SP (of code 0100000) considered as non-significant, is no particular one, while the circuit is in the state defined by N = 1 (state of name processing i.e. recopying of the variable) and previously set up by the circuit 104, referenced AA, the operation of the name processing circuit continues.

In fact, in accordance with the non-limiting convention adopted and applied during the example cited on p. 4 of the present application, any name of a variable may figure in an expression for the same reason as a constant and can therefore be followed by operation symbols, right hand bracket, spaces, etc. It is the same thing for the operation required by the instructions DNOM or FNOM provided that the name is followed with or without spaces by the symbol NL (return to the left hand margin).

On the other hand, in accordance with the non-limiting conventions taken as an example, expressions such as 25 & CA _ 4 or − 12 & CA) . . . or even 31416 & CA PB3, etc. are considered as errors and lead to the triggering of the sequential circuit ERR (109 FIG. 1). To sum up, when there is a recording or erasure of variables, the name of the latter can only be followed by the symbol NL.

The states of lines 36 to 42 have as their purpose access to the closed chain containing the constant in the case of commands NOM and FNOM. In the case of if it is a question of the DNOM, this closed chain may or may not contain a constant command , has in any case to be erased and then replaced by the new constant declared under the name recognized and existing beforehand in the file. It is in fact the allocation of a new value (constant) to an already existing variable.

In the other cases, the name of the variable does not exist in the file at the instant of the analysis of an assignation with a symbol &. However, in that of FIG. 2, the name CAB exists partially because of the presence of the prefix CA in the file while DAB, for example, does not exist because there is no initial D in the said file. In the first case, the mechanism of name production should cause a start structure (see FIG. 2a, FIG. 9) to be generated whose base will be a link containing the letter B inserted in the chain (209, FIG. 2). In the second case, there should be successive generation of three start structures, whose base links will contain respectively the letters D, A and B and, of course, will be linked in a suitable way so as to allow access to the name of the variable DAB.

It is however the same mechanism is used, formed essentially by the checks generated by the states of lines 9 and 11 as well as by the making and linking of the start structures required by the states of lines 13 to 27.

If it is a question of recording the name of the variable CAB, the first two letters, which exist in the file in accordance with FIG. 2, are recognized during two successive cycles each consisting of the sequence of the states of the lines 6 to 13 and 28 to 33. During the second pass, the register NO receives the letter B (3$^{rd}$ letter of the name CAB) while the register ON receives that of an initial link of a letter of corresponding rank — 3$^{rd}$ rank hence appearing under 209 in FIG. 2. Naturally, the passage of the states of lines 9 to 13 is interrupted as from the state of line 9 because the link 209 is unique and its reading causes the emission of the signal VI (see p. 28) noting the identity of the address of a link read and of the content of its segment addressing its direct brother which is itself. It may be noted that it would be the same if the chain 209 contained several links bearing letters all different from the letter B. In both cases the address updated during the state of line 12 is precisely that of the initial link of third rank, here indicated by 209.

The check of line 13 is only operative if the mechanism has been triggered by the command FNOM which has as its effect to indicate to the user that there is no need to erase a variable whose name does not exist in the file, or by the command NOM, which indicates the same inexistence. If F and N are both nul, the device is in the process of making a name of a variable and there is no need to stop the mechanism because of the inexistence of a letter because, in this case, it is to be "filed" by the effect of the instructions required by the states of lines 15 to 27.

The link immediately available in the reserve chain is read, the letter being inserted is recorded in it; its address (that of the link) is recorded in the register X to enable the mechanism DEP to make the file lexicographically (see FIGS. 9 and 12).

If the reserve chain is not empty, state which is checked by the state of line 15, the direct brother of the initial permanent link can be used (states of lines 17 and 18) and by the state 19 command in the appropriate form is sent on the wire DEP of the standardized interconnection channel to the sequential logic circuit 801 in FIG. 8 referenced under the same name which is part of the input-output circuit (103 and 806). By referring to FIG. 9, it may be noted that the emptiness of the reserve chain is signalled, if appropriate, during the states of lines 6 and 8 of circuit 801 referenced DEP when two other links will be used to make the base structure of the type satisfying FIG. 2a.

The states of lines 20 to 27, by two successive linkages H1 { contents of TC, contents of ON} and H1{ contents of TC, 000 . . } insert the start link containing the letter B of the example in hand in the chain 209 which will be increased by one link.

It is also necessary at this stage to explain the result of the actions due to the states of lines 6 to 16 of the mechanism DEP (801 and FIG. 9) which enable a start structure with a different address from 000 . . . to be produced, given that the explanations supplied on p. 13 of the present application only concern the start structure made beginning with the initial permanent link.

By referring temporarily to table FIG. 9, through the action of the states of lines 5 to 8 there is determination of the address of the link available which will be chosen as first successor of the arbitrary not nul address link X (recorded in the register X). By the states 9 and 10, the said starting link is reached while, as a temporary measure, the register X receives the first successor's address and the recording of the temporary contents of the register X in the third segment (by the states 11 and 12) forms the first stage of the starting structure. The register X recovers its initial content during the state of line 11.

During the states of lines 13 to 17, the mechanism records in the link chosen as first successor the address of the second successor and in the fourth segment the address contained in the register X. In this way, all the initial links of letters (208 and 210, FIG. 2) contain the two-directional linkage data of the letter chain to which they belong on the one hand and the linkage between chains of successive letters is also two-directional on the other hand; starting with a given closed letter chain this makes it possible to find the letter which is the initial.

From the chain 207 containing the letters B and A it is thus possible to "return" to the letter C of the chain 204 which is the common prefix. In all cases, the mechanism defined by FIG. 33a and schematic 34b ends its specific job by determining the address of the constant initial link whose chain of brothers may or may not contain a constant.

In the case in which the binary elements F and N are both at logic zero level, state which corresponds to the triggering of the mechanism whose operation has just been described, after the command DNOM, the recording sequential logic circuit 3402 (FIG. 34a), referenced ECR, whose operation is defined by FIG. 33b is in its turn triggered by the circuit 3401. Its purpose is to record effectively in the file the constant appearing at the left of the symbol & in the expression contained in the evaluation chain and, when this has been done, to replace in the reserve chain all the links of the evaluation chain.

From the FIGS. 16–18 and 22*c* (lines 4 and 5), the address of any figure being analyzed situated at the right of the compact group of figures, with or without a sign and hence analyzed as being a positive or negative constant (accompanied by the state P or N of the sequential arithmetical analyzer AA (105 in FIG. 1 and FIG. 19), is updated in the register OP1.

As a result, the constant assigned to the variable whose name follows the symbol &, for example DAB in the expression 365 & DAB, is defined by the registers E and OP1 which contain the link addresses of the said constant's terminals. If the retrograde brother link of the constant's initial link, whose address is TC (second successor of the address link ON, itself containing the last letter of the variable's name), is temporarily designated by L1, while the direct brother link is designated by L2, then the two successive linkages H1{ OP1, L1 } and H1 { E, L2 } exchange the segment E, OP1 containing the constant with the segment L2, L1 containing the preceding constant if L2 ≠ L1.

If L1 = L2, i.e. if, for example, this is a case of the formation of a new variable, the said constant is inserted in the chain formed of a single address link specified by the register TC.

The old constant, if required, is formed in the evaluation chain.

The triggering of the print-out sequential logic circuit IMP (5-1-3) from the state of line 8 in FIG. 11 causes all the links of the evaluation chain except for the initial link to return to the reserve chain and unlocks the typewriter keyboard (104) MAE.

The copying sequential logic circuit (3402), a subassembly of the processing circuit (107, FIG. 1) is triggered when the common recognition circuit 3401 reaches the state of line 44 in FIG. 33*a* after recognizing a name appearing in the expression contained in the evaluation chain. The copying consists in replacing the name of the variable recognized with the corresponding constant.

Figure 35:
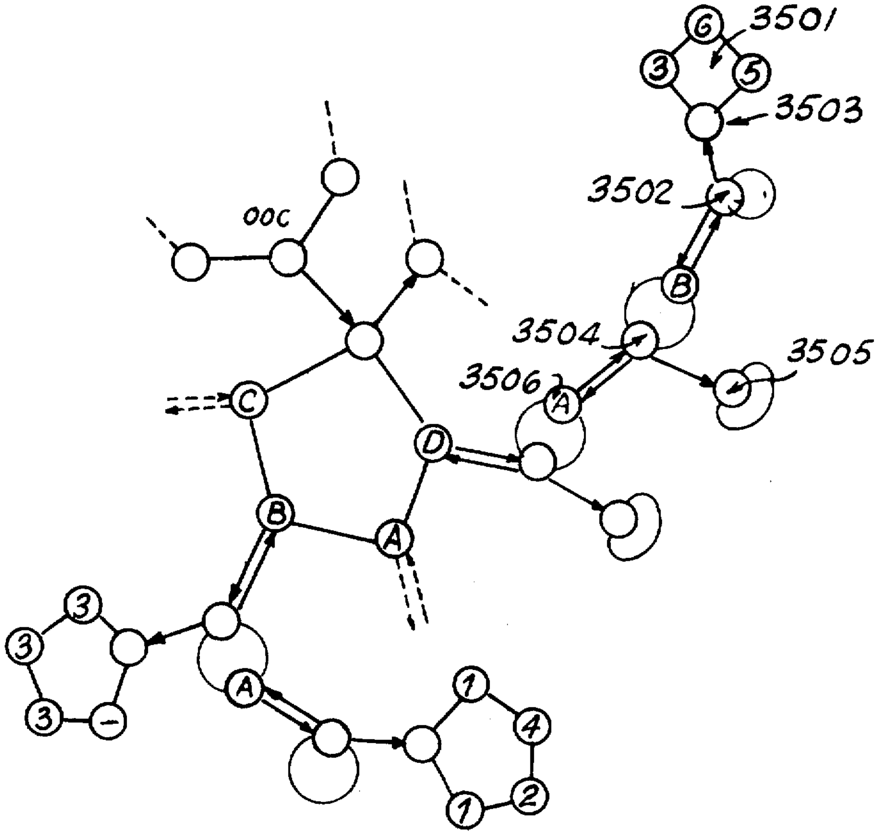

Thus, as an example, the recognition of the variable name BA must lead to the replacement of the evaluation chain segment containing BA by a segment containing 1421 if FIGS. 2 and 35 are consulted, this latter figure representing the file state after the recording of the variable DAB of value 365.

The register ON receives the constant initial link address contained in the register TC (state of line 1 in FIG. 33c). Register X is used as pointer for recording in the reserve chain.

The various copy phases are described precisely by the actions of the states of FIG. 33*c*, referenced REC (copy) to which reference is made below.

First of all, the constant concerned — 1421 — is copied in the reserve chain; both are passed through in the forward direction and the symbol read in the constant chain is "pointed" by the register ON (3415, FIG. 34*a*), while the copy of the said symbol is carried out in one of the reserve chain links pointed by the register X (805 of FIG. 8).

The register NO (9-2-1-3, FIG. 9-2) is used as intermediate memory during the copying operation (states of lines 2 to 6). The check started by line 7 confirms the complete copy of the constant chain since AD = TC signifies that the reading of the said chain has returned to the address link contained in the register TC (3417, FIG. 34*a*).

The register NO is copied, symbol after symbol during the states of lines 8 to 14. A check that the reserve chain is eventually empty is made during the state of line 10 and a check of eventually insufficient length in the reserve chain is made during the state of line 13.

From the state of line 14, the sequential writing device returns to the state of line 2.

When the whole of constant chain 212 has been passed through, the states of lines 15, 16 and 17 enable the address of the retrograde brother link of the evaluation chain link containing the first letter of the variable name being processed by the carrying out of the transfer CA ← L1 of the state of line 18 to be determined and recorded in the memory address register AD.

The states of lines 18 to 27 produce the exchange by two consecutive linkages of the segments 000, X (segments of the reserve chain holding the copy of the constant 1421) and L1, OP2 (terminals of the variable name BA in the evaluation chain, L1 containing the address of the retrograde brother of the link bearing B, OP2 the address of the link bearing A).

The state of line 28 starts up again, with a suitable command transmitted on the wire referenced DEB of the standardized interconnection channel, the arithmetical analysis sequential logic circuit which will function in the usual way starting with the address link specified by the register E (804, FIG. 8), the indicators NOMA and N being returned to the non-operating position.

Taking into account the mutual exclusion of the not nul logic values of F and N due to the arrangement of circuit 3401, whose action is described by table FIG. 33*a*, a nul value for N implies a non nul value for F and as a result the triggering of circuit 3404 whose operation is described by FIG. 33*d* referenced EFF (erasure).

Concerning the variable DAB whose value is 365, on examining FIG. 35, it may be noted that the start structures based on the file links containing the letters D and A only bear the evaluation chains reduced to a single link. A possible attempt to copy the variables D or DA would therefore be converted into a triggering of the error device (109) ERR (see state of line 1 in FIG. 33*c*).

If it is intended to erase the variable DAB by writing the expression & DAB and then evaluating it, in order not to overload the file unnecessarily, it is also appropriate to erase what corresponds to D and DA without having to write & D and & DA as this would lead to error messages because of the inexistence of the said variables. It is this necessity which complicates the operation of the erasure device described above with the aid of schematic in FIG. 34*f* and table in FIG. 33*d*.

The register TC (3417), at the start of the erasure device's operation, contains the address of the constant's initial link which is to be erased (3501), the one adjacent to the variable DAB for example, while the register ON contains the address of the link bearing the letter B of the variable name DAB.

If the constant chain is empty, which is not the case in the example considered, the error device ERR (109) is started during the state of line 2 of the table in FIG. 33*d* to which reference is made in what follows. As the binary element F (3411) is reset to the logic zero state to start with, the states of lines 4 to 11 are carried out and this returns the constant chain segment containing 365 to the reserve chain.

Then, through the action of the states of lines 12, 13, 14, 15 and 16, the emptiness of the file link (3502) providing the linkage between the link bearing the letter B and the constant initial link, which is still present although alone (3503), is checked. If it is not alone, this is because variable names prefixed DAB exist, although the case is not considered here and the erasure would then be limited to that of the constant – 365 – by passing from the state of line 16 to the state of line 41.

Alone, it is then replaced in the reserve chain by the action of the states of lines 16 to 20.

It is the same thing for the constant initial link (3503), affected by the reading of the addresses of successors of the link bearing the letter B and the address specified by the register ON (3415), replaced in the reserve chain by the action of the states of the lines 25, 26 and 27.

It is the same thing again for the link bearing the letter B which has no more successors and whose retention in the file is no longer justified, the action being caused by the succession of the states of lines 30 to 37.

As the state of line 38 addresses the link retrograde brother of the link bearing the letter B (address recorded in the register (3417) TC by the state of line 30), there are then two cases possible.

In the first case, the link bearing the letter B had no brother and, as a result, the address is that of the link shown in 3504 whose successor, adressed and read during the state of line 1 is an initial link of constant 3505. If this chain is not empty, the erasure process is completed (line 40).

If it is empty, the action of states 4 to 11 has no effect; everything remains in place since there are in fact two identical consecutive linkages. The link 3504 has no brothers but it has an address "father" specified by the register ON by the transfer of the segment 4 (state of line 40, state of line 17 of FIG. 9 and two-directional linkage of the letter bearing links, see p. 53, line 13).

During the state of line 12, the link read will then be the one bearing the letter A (3506). It may also be noted that, if a name DA had been declared, the successor of the link specified by the register TC (and at present the only in its chain) would be the initial link of the constant associated with the name of the variable DA and in this case the action of the device ends with the change from the state of line 3 to the state of line 41. If, on the other hand, there is no variable declared in the name of DA, then the link in question is empty and as stated lower down the resultant of the actions of the states of lines 4 to 11 is void.

As a result, the register ON really bears the address of the link 3506 containing the letter A. By definition VI = 1 (result of the branch coming from the state of line 40) and, consequently, the links successors of the link bearing the letter A are replaced in the reserve chain as well as the latter.

Closer and closer, the chain of letters DAB, from B towards D, is mounted with the erasure of the non significant structures which have no longer any reason to exist following the erasure of the variable DAB.

It may be noted that the erasure would not occur if variables existed declared D or of prefix D or declared DA or of prefix DA.

The error processing and presentation sequential logic circuit is shown dotted in FIG. 1 (109). Its mode of action, as already stated, is at the user's choice. As examples however, it is appropriate to cite three cases.

The first mode, the simplest, consists in replacing in the reserve chain the whole evaluation chain, in causing the series of instructions to be emitted to replace the typewriter print-out roller at the left hand margin position, one line below the text of the formula that an attempt (unsuccessful) is being made to evaluate, and the key-board to be unlocked.

The second mode, more elaborate, requires the placing in standby of the commands to return to the left hand margin one line below; these commands become effective when, by return to the NEANT state of the arithmetical analyzer the formula being evaluated does not contain an error and the print-out is normal. In the opposite case, the signal emitted by the sequential logic circuit 109 (FIG. 1), referenced ERR, may be arranged to emit an interline instruction (LF or "line feed" in the ISO/R terminology) then a series of reverse running commands (BS or "backspace" in the same terminology) in proportion to the number of links in the evaluation chain included between the initial evaluation link and the address link specified by the register OP2, which can be used as pointer for the symbol being read in the evaluation chain (see the transfer shown dotted in the state of line 12 in FIG. **22*a* and 22*b*). In almost all cases, the address contained in this pointer specifies the link after which the expression being evaluated is incorrect, in particular in all cases of syntax errors and inexistent variable names. In the case of a division by a nul divisor, the register OP2 indicates the low weight figure of the said diviser (see line 63 of FIG. 32a and 32**b). The number of links is determined by passing through the evaluation chain in the reverse direction and, once this count is finished, the print-out roller is placed just below the incorrect symbol. An instruction to print the symbol ? (question mark) is carried out, then, after a second "line feed" instruction LF is carried out, the key-board is unlocked while evaluation is interrupted.

From this instant, the user may at choice evaluate a new expression after having pressed the NL button ("-new line") or continue typing the expression starting from the point indicated by the question mark.

The third mode, still more complicated, includes the actions of the second mode described above and is arranged so as to allow also the printing-out of specialized messages depending on the type of error. These specialized messages, whose various consecutive symbols are recorded in a memory with additional linkage, of the same type except for the capacity as the memory used in the device described in the present application for example, are recorded in the form of a file in accordance also with the schematics given in FIG. 2 and 35 whose names are in direct concordance with the state of the register AA of the arithmetical analyzer or the identification of the sequential logic circuit which emitted the signal ERR.

Whatever may be the mode retained, the schematic of the corresponding sequential logic circuit is analogous to those of the circuits more explicitly described; it only requires for its study and construction the application of the rules of the profession without any other inventive activity different in its principles from the activity proper to the present application.

The sequential logic circuit 110 (FIG. 1) referenced DESAT is also shown dotted. Its mode of operation is also at the user's choice.

A simpler method consists in having the command IN emitted, instead of the instruction DESAT such as it appears in the various descriptive tables of the sequential logic circuit sequences described in the present application, command IN which erases all the content of the chain memory by returning all the links to the reserve chain. The user will be informed, by the printing of a special symbol, for example an exclamation !, printed at the beginning of a line by a series of appropriate instructions emitted by the sequential logic circuit DESAT (110, FIG. 1).

A more selective mode of action consists in arranging the mechanism triggered by the start sequential logic circuit (801, FIG. 8) so as to produce a second reserve chain with a finite, limited number of links. When a signal DESAT is emitted, and this may happen when the first symbol of an expression it is desired to evaluate is typed, the key-board is locked, the symbol ! is printed-out and the second reserve chain is made available; the latter is only available for this circumstance and can only receive expressions beginning with the symbol & followed by the name of a declared variable.

In these conditions the user can "reinflate" the normal reserve chain by restoring to it the links of one or several declared variables which, due to this, will disappear in accordance with his desires. Its study and construction are the subject of the same remarks as those concerning the sequential logic circuit 109, FIG. 1 referenced ERR.

The modular structure specific to the computer device which is the subject of the invention enables the processing speed to be increased by the substitution or addition of specialized sequential logic circuits. For that, it is sufficient to see that the connecting links between the substituted or auxiliary sequential logic circuits and the standardized interconnection channel respect the limits specified by the mutual positions of the channel's conducting wires or any other limits of electrical, temporal or logic origin.

Thus, as an example, the user may replace the two logic circuits in FIGS. 20 and 29 coordinating and executing algebraic addition and subtraction operations with two other circuits.

The first of them, for example, would be an extension called "parallel" of the addition-subtraction unit in order to allow the addition-subtraction in parallel of the figures following numerical constants containing n decimal figures (with $n > 1$).

The second would be arranged so that, starting with the contents of the registers E, OP1 and OP2 (2009, FIG. 20), the successive figures of the constants whose low weights are specified by OP1 and OP2 would be conveniently loaded into the accumulators of the addition and subtraction circuit provided for this purpose and containing n decimal positions.

The increase in speed thus acquired would be repercuted not only on the addition and subtraction but also on the multiplication and division.

It may be noted that this increase in speed, obtained by the use of new circuits, is only effective if use is made of logic elements with characteristics at least equal to those of the elements used in the circuits replaced.

In compensation, the quantity of these elements required is greater, but this is the just counterpart of the speed increase.

Any improvement in quality and particularly in speed including that which might affect the chain memory processing device remains within the invention as long as it does not contradict the general rules imposed by the use of a chain memory on the one hand and of the standardized interconnection channel on the other which satisfy the descriptions of the present application.

It is the same thing for any addition of specialized sequential logic circuits destined to extend the vocabulary of the language described in a non-limiting way in the present application.

Thus, as a simple example, it is possible to arrange for an additional output for the device 1904, FIG. 19, which would be referenced F 12 and would bear, if required, a logic "one" (or "true") signal as soon as a decimal point was recognized during the analysis of an expression.

If provided with two registers analogous to the registers OP1 and OP2 and an additional sequential logic circuit connected to the standardized interconnection channel, studied and assembled so as to react to a suitable instruction emitted by the circuit 1907, FIG. 19 in the arithmetical analyzer, the computer device, which is the subject of the present invention, can easily be modified so that it evaluates the expressions in which decimal constants of arbitrary length may or may not appear.

The only condition to be observed is to define, study and assemble the interconnection channel and the connectors so as to provide spare conducting wires in sufficient quantity even though in limited quantity since the number of graphical symbols available within the framework of the standardization of typewriter keyboards and ISO/R coding does not exceed twenty-four at the outside and, in these conditions, if new registers and specialized sequential logic circuits analogous to those described in the present application are added, the user may, at this choice, limit, modify or increase the vocabulary, syntax and semantics of the language be proposes to use.

This evolution is quite certain since the manufacturers of semiconductor material logic elements are able to produce and sell in the form of circuits called "-highly integrated" all complex logic circuits adequately specified by the user.

A more detailed theoretical schematic diagram of the computer device which is the subject of the present application results from the known regrouping, mentioned on p. 31, of the various part schematics. In particular, FIGS. 36a and 36b results from the regrouping of the schematics in FIGS. 8, 20 and 34a and of those which would correspond to the circuits shown dotted referenced 109 (ERR) and 110 (DESAT) in FIG. 1.

From FIGS. 36a and 36b, the computer device contains the channel 3601 represented by the horizontal line, the chain memory with its associated sequential logic circuit 3602 and the other various circuits all referenced by the prefix 36.

Figure 26:
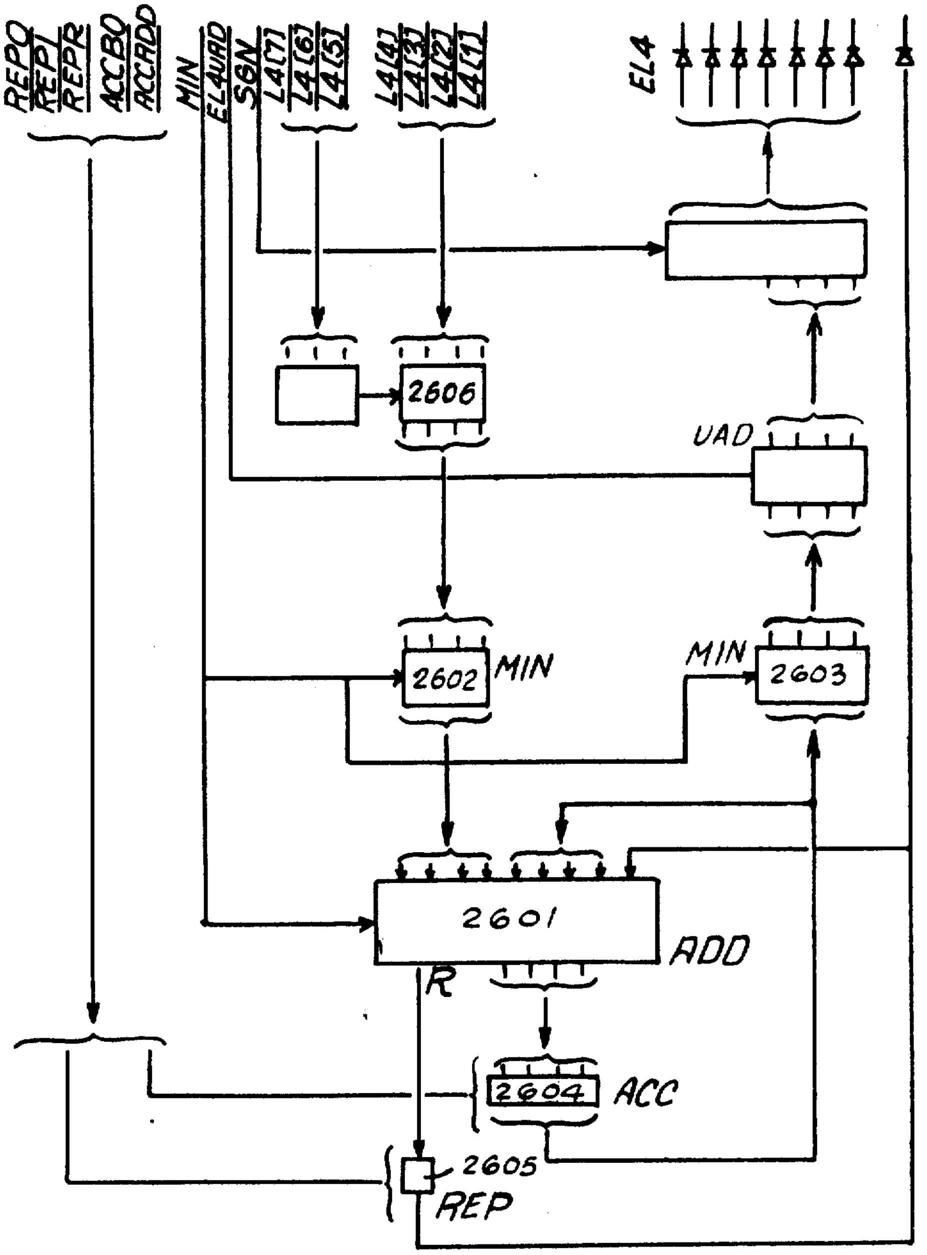
Figure 28A:
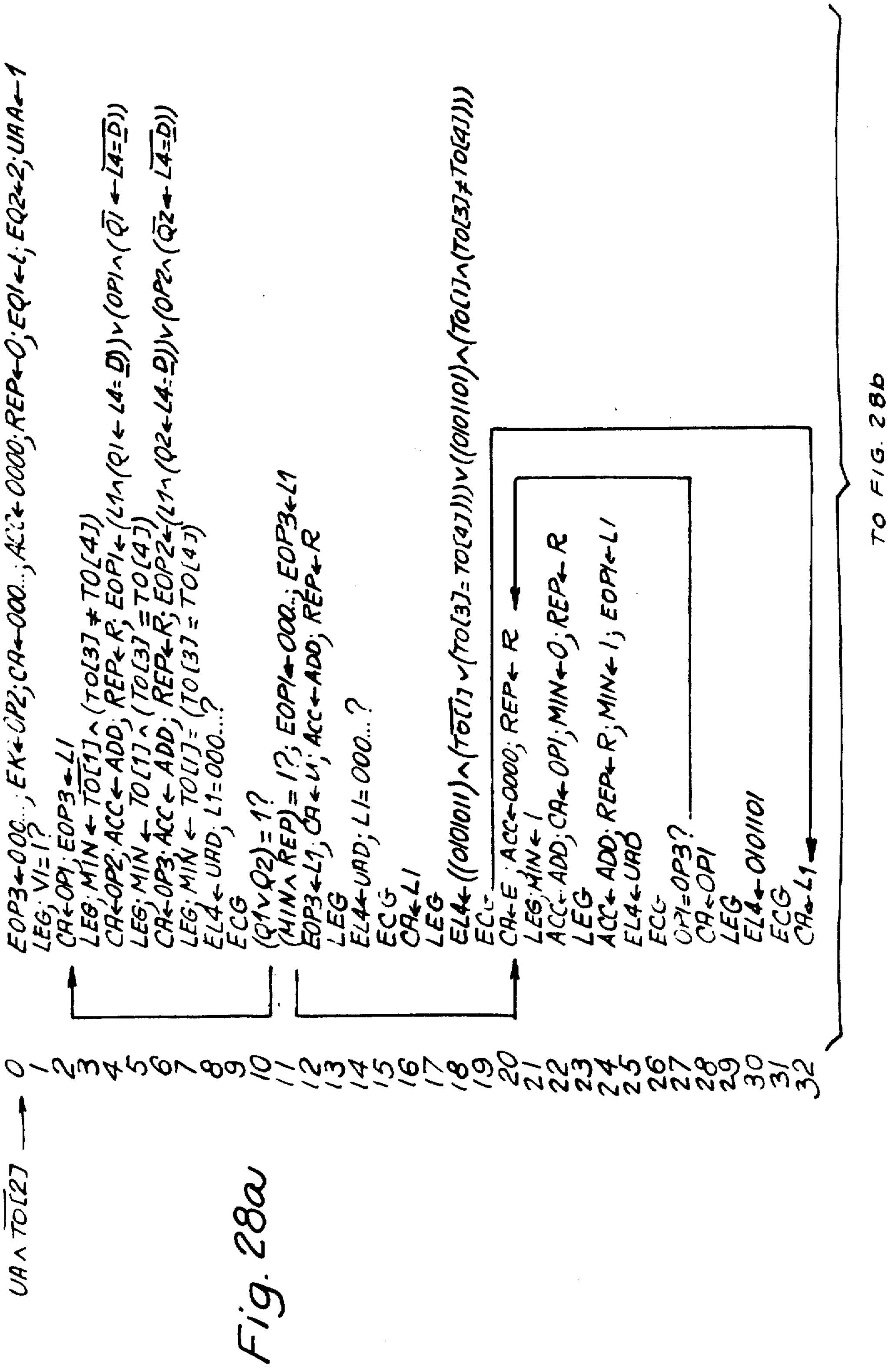

These circuits can be considered as belonging to four classes:

- the first class corresponds to the interface between the typewriter 3657, referenced MAE, and the standardized interconnection channel, does not correspond to any inventive activity, is not part of any of the claims specific to the present application and is not described in the present document.
- it is the same for the arithmetical circuit shown in 3672 whose more detailed description is given by the schematic in FIG. 26, the said circuit, which corresponds to a second class, is not a part of these claims.
- a third class is formed of flip-flops and registers as for example the registers 3654, 3655 referenced E and X, 3679 concerning the collection of registers and flip-flops referenced TO, K, OP1, OP2, OP3, Q1 and Q2, 3693 referenced NO, 3695 referenced ON, 3697 referenced TC, etc. and of any register or flip-flop which might be added at the choice of the user.

The electronic semiconductor flip-flops currently used in the present state of the art as for example the flip-flops called the JK type can record a binary information bit provided that the latter is born by two input wires. A frequent convention and an appropriate arrangement cause the absence of any information to correspond to the presence of the same potential on the two wires and the state of the flip-flop does not change as long as this condition exists. The same convention assigns the logic zero value to the presence of a potential close to that of the reference potential on one of the wires combined with that of a potential close to the positive (or negative) potential chosen as corresponding to the logic one value on the other wire and, under these conditions, if there is a suitable application of the synchronizing pulse CP, which is available to all the flip-flops, the flip-flop records the logic zero value, which can be found at its output Q. The recording of a logic one value corresponds to a reversal of the potentials on the two wires.

In a non-limiting metho of assembly based on this type of flip-flop, two input wires per flip-flop should be provided, which are part of the interconnection channel and generally referenced by the name of the flip-flop prefixed by the letter E and an output wire in the said channel, referenced by the name of the flip-flop itself which is connected through the coupling diode in accordance with the schematic of FIG. 37 to which reference is to be made for the explanation of the use of the two flip-flops as an example.

The conducting wires of the channel necessary for understanding are shown in 3701. They include in particular the wire referenced CP (3702) carrying the synchronizing pulse signal, whose specification complies with the normal use of the flip-flops taken as an example. Two flip-flops 3703 and 3704, which may or may not be part of the registers, are shown under the references X and Y as well as the double input conductor wires EX and EY (3705 and 3706) and the output conductor 3707 and 3708, which are part of the channel 3701 and are assigned to them. The two flip-flops are connected to the channel by one (or several) connectors and, in particular, the connection of the outputs Q of the flip-flops X and Y is made through diodes wired to transmit the current when the said outputs bear a positive potential corresponding in the example to the logic one value.

The flip-flops also have the usual reset to zero or one means which are not shown.

The possible transmission of data from the flip-flop Y to the flip-flop X shown conventionally in the present text by XE ← Y may be provided by one or several switching circuits included in the fourth class.

In the case shown in FIG. 37, the signal born by the wire 3708, referenced Y, is connected effectively to the output Q of the flip-flop Y to appear in the form of a pair of potentials conjugated on the wires 3705 thanks to the logic switching circuit 3709, which is part of a sequential logic circuit, if it is triggered by a transfer instruction EXY whose name, by convention, is obtained through the linking of the names of the flip-flops, registers or register elements concerned, preceded by the letter E.

- the fourth and last class is formed by the sequential logic circuits properly speaking whose assembly forms one of the means of the invention, in particular the circuits 3602, 3651 referenced DEP, 3652 referenced ENR, 3653 referenced IMP, 3663 referenced AA, 3672 referenced UA, 3675 referenced ADD, 3676 referenced MULT, 3677 referenced DIV, 3682 referenced PAR, 3691 referenced NOM, 3692 referenced ECR, 3693 referenced REC, 3694 referenced EFF, the circuits carrying out the error and saturation signalling procedures designated by ERR and DESAT as well as all the sequential logic circuits resulting from the convenience of the addition in the present invention.

In the present application, a non-limiting description of the memory and its processing device (3602 and 3601), which can be found is a non-limiting way in the U.S. application No. 39038 , will not be repeated in the present application.

In order to explain in detail the operation of one of the sequential logic circuits, for example the arithmetical analysis circuit shown at 105 in FIG. 1, in FIG. 19 or at 3672 of FIG. 36a a description of whose sequences in the form of an organigram is shown in the tables of FIGS. 22*a* and 22*c* , it is appropriate first of all to recall certain of the conventions used for all the tables and figures in the present application.

1. Consider the expression OP2 ← AD

This expression signifies that the content of register AD is transferred to register OP2 element by element.

Thus OP2 ← AD is strictly equivalent to OP2 [1] ← AD [1] ; OP2 [2] ← AD [2] ; OP2 [3] ← AD [3] ; etc..

The common number of register elements concerned in a transfer depends on the name of the said registers. In the present case, as it concerns in particular the addressing register AD of the chain memory, this number is equal to the logarithm to the base 2 of the number of cells in the memory, assuming that the latter is a positive whole power of the number 2, and, in a non-limiting way, all the examples cited in the present application concern a memory with 256 cells and hence addressable by a register with 8 elements.

It is to be understood however that the use of memories with 512, 1024, 2048, 4096, . . . , 65536, . . . 1048576 . . . etc. cells is not outside the claims of the present invention, if these cells require for their complete addressing registers AD of 9, 10, 11, 12, . . . 16 . . . 24 . . . etc. elements. These dimensions of the register AD are common to all the registers that the reading of the sequence tables shows to be in transfer relationship at one instant or another with the said register, in particular the registers E, X, OP1, OP2, OP3, K, ON, Tc, as well as the register segments L1, L2, L3 and L4 although this last only holds most of the time the symbol being processed, the latter only containing seven significant binary elements.

A register or a flip-flop has an input which is normally marked by means of the prefix E. However, the expressions OP2 ← AD or EOP2 ← AD are synonymous, given that it is evident that a binary information bit can only be recorded in a register element if it passes through the input. However, the input of register AD plays an essential role, that of the addressing channel and it was throught useful to give it a name CA without the prefix E.

In particular, the expression CA ← 000 . . . frequently encountered signifies CA [1] ← 0; CA [2]← 0; . . . CA [8] ← 0; . . . ; in proportion to the common number of elements in the registers of the list cited above.

Certain transfers are "conditional." It is the case in particular in line 4 of the table in FIG. 22*a* a of the transfer expression EOP1 ← $(L1 \wedge F10) \vee (OP1 \wedge \overline{F10})$.

In this expression, F10 is worth 1 or 0 (logic) depending on whether the symbol of the expression being analyzed is or is not a figure (see FIG. 21). In the first case, the effective transfer is EOP1 ← L1, while in the second, it will be EOP1 ← OP1, which means that the register OP1 retains its previous content.

Another more complicated example corresponds to line 0 in FIG. 22*a*. ERAA ← ((1111)∧((EL4 = 0001010)∨DEB))∨(0000).

The expression EL4 = 0001010 is a logic expression (and not an equivalence in the usual sense). It signifies that its logic value is one if, and only if, the content of register EL4 is equal to 0001010. Even more explicitly, the value of this expression is (logic) one if simultaneously EL4 [1] = 0 and EL4 [2] = 0 and EL4 [3] = 0 and EL4 [4] = 1 and EL4 [5] = 0 and EL4 [6] = 1 and EL4 [7] = 0

The expression (EL4 = 0001010)∧DEB has logic 1 as value if (EL4 = 0001010) or DEB has this value.

In the same way, ERAA ← ((1111)∧((EL4 = 0001010)∧DEB)) signifies that ERAA (four element input of the register RAA) receives 1111. If (EL4 = 0001010) or if DEB is worth 1 and in order to confirm that in all other cases the register RAA must receive 0000, the whole expression becomes that which appears in line 0.

To speak in functional terms, the register RAA of the arithmetical analyzer contains 0000, code chosen for the state NEANT. It will have the code 1111 if one or the other of the following two events happens :

either a symbol NL, of code 0001010, appearing on the input layer to the register L4, layer named EL4 precisely, the result of the user pressing the "new line" key signifying in accordance with the conventions that the evaluation of the expression which has just been recorded and printed by the user out should be started, or a signal DEB emitted by one of the sequential logic circuits.

This being so, the expression examined can be expanded element by element :

ERAA [1] ← (1∧((EL4 = 0001010)∨DEB))∨0

ERAA [2] ← (1∧((EL4 = 0001010)∨DEB))∨0 etc;

Since the example chosen as a non-limiting case uses type D flip-flops, the logic zero which ends the preceding expression is superfluous, as well as the 1 which precedes it and the first line, completely expanded, will correspond to :

ERAA [1] ← (EL4 = 0001010)∨DEB;

ERAA [2] ← (EL4 = 0001010)∨DEB;

ERAA [3] ← (EL4 = 0001010)∨DEB;

ERAA [4] ← (EL4 = 0001010)∨DEB;

the semi-colons signifying the simumtaneity of the four transfers specified above.

As a general rule, valid for all the tables of the sequence which is part of the present description, a line specifying transfers corresponds to a state and the state following is defined by the line following unless otherwise indicated.

These contrary indications are shown by arrowed dashes.

On the other hand, line 13 of FIG. 22*a* does not correspond to a transfer. It is a logic indication without any physical counterpart and is intended solely to afford a better understanding.

During the state of line 12, there really is a reading order for the memory LEG and the next state depends on the real content of the register RAA.

If this is 0000 for example, the next state is defined by the line 0, and this is indicated by following the arrowed line under the indication 0000.

If the content of the register RAA is 0110 for example, it is the state specified by line 5 which will be the successor. It is equivalent to saying that the sequential device is so arranged as to carry out the transfers specified in a given line if the content of the register RAA is equal to the code of the state corresponding to this line.

Thus the transfers specified in line 0 (corresponding to the state NEANT cannot be carried out unless the content of RAA is 0000.

In the same way, the transfers specified in line 1 (corresponding to the states DEB or SP) can only be carried out if the content of the register RAA is 0001 or 0010.

It must be understood then that all the expressions appearing in a given line are conditioned by the code contained in the register RAA, indicated by the arrowed line on the right ending at this line.

As far as the preceding example is concerned, the full logic expression becomes $\mathrm{ERAA}\,[1] \leftarrow \overline{\mathrm{RAA}}\,[1] \wedge \overline{\mathrm{RAA}}\,[2] \wedge \overline{\mathrm{RAA}}\,[3] \wedge \overline{\mathrm{RAA}}\,[4] \wedge ((\mathrm{EL4} = 0001010) \vee \mathrm{DEB})$ $\mathrm{ERAA}\,[2] \leftarrow \overline{\mathrm{RAA}}\,[1] \wedge \overline{\mathrm{RAA}}\,[2] \wedge \overline{\mathrm{RAA}}\,[3] \wedge \mathrm{RAA}\,[4] \wedge ((\mathrm{EL4} = 0001010) \vee \mathrm{DEB})$ etc., It would be useless to give thus in detail the mechanism for the working out of all the formulas in FIGS. **22*a* and 22*c*. However, the compiling of the table in FIG. 38** will be given for each of the four inputs in the register RAA as well as for each of the instructions D, DPAR, FPAR, DNOM, FNOM, IMP, ERR, UA and LEG and transfer instructions CA ← E, ETO [1] ← 1, EOP1—. . . , EOP2 — . . . , etc.

It should be noted that, taking into account the type of flip-flop chosen as coming within the non-limiting example of the arithmetical analyzer, it is only necessary to specify the logic signals which are not nul.

Thus the compiling relative to ERAA [1] and to line 1 conditioned by $\overline{\mathrm{RAA}}\,[1] \wedge \overline{\mathrm{RAA}}\,[2] \wedge \overline{\mathrm{RAA}}\,[3] \wedge \overline{\mathrm{RAA}}\,[4] \wedge$ or $\overline{\mathrm{RAA}}\,[1] \wedge \overline{\mathrm{RAA}}\,[2] \wedge \overline{\mathrm{RAA}}\,[3] \wedge \overline{\mathrm{RAA}}\,[4]$ (corresponding to the codes 0001 and 0010) gives an inexistent term since there is nothing which tends to cause a logic 1 to be recorded in this element.

It should be noted also that the choice of codes with four moments is arbitrary, provided that a given code corresponds to a given sequential state and conversely.

In order to reduce the writing to a minimum, $\overline{\mathrm{RAA}}\,[1] \wedge \overline{\mathrm{RAA}}\,[2] \wedge (\overline{\mathrm{RAA}}\,[3] \wedge \overline{\mathrm{RAA}}\,[4] \wedge \overline{\mathrm{RAA}}\,[3] \wedge \mathrm{RAA}\,[4]$ for example will be noted as $\bar{1}\,\bar{2}\,(3\,\bar{4} \vee \bar{3}\,4)$, the names of the elements of RAA being shown by their indices in the form of isolated figures while the intersection operators are unders tood when two figures are consecutive.

Sequential logic circuits are shown succintly in the schematics of figures 12, 13, 14, 26, 39, **34*b*, 34*c*, 34*d* and 34*e***.

They have the same configuration in common. Thus, taking for example FIG. 19, which shows the theoretical schematic of the arithmetical analyzer, a sequence register RAA (1906), a group of logic circuits 1907 preparing the instructions, transfer instructions and new state codes as a function of the contents of the register RAA, a group of circuits 1904, referenced COD, preparing various logic functions from the signals on the wires referenced 1902 which are in the sequential circuit, a group of switching circuits 1910 each of them analogous one to another in its operation to the circuit described with respect to the flip-flops and registers under the reference 3709, a circuit 1909 which prevents any access to the circuit as long as the latter's register bears active data corresponding to the execution of anything following sequences are all to be found there. However, the analyzer circuit AA differs from other sequential logic circuits by the fact that the durations off all its states are identical while those of the states of other circuits may vary with the circumstances. It differs also by the conditional nature of all the changes of state contrary to the relatively long successions of unconditional sequences which characterize the other sequential logic circuits.

The sequence register RAA can be made using flip-flops of the type currently used in the technique, in particular JK. However, because of the particular aspect of its operation which is the synchronous character of the changes in its contents when the latter differ from 0000, it is possible, as a non-limiting example, to use to produce this register flip-flops of type D, which are simpler to produce and enable a reduced quantity of associated logic circuits to be used.

Figure 40:
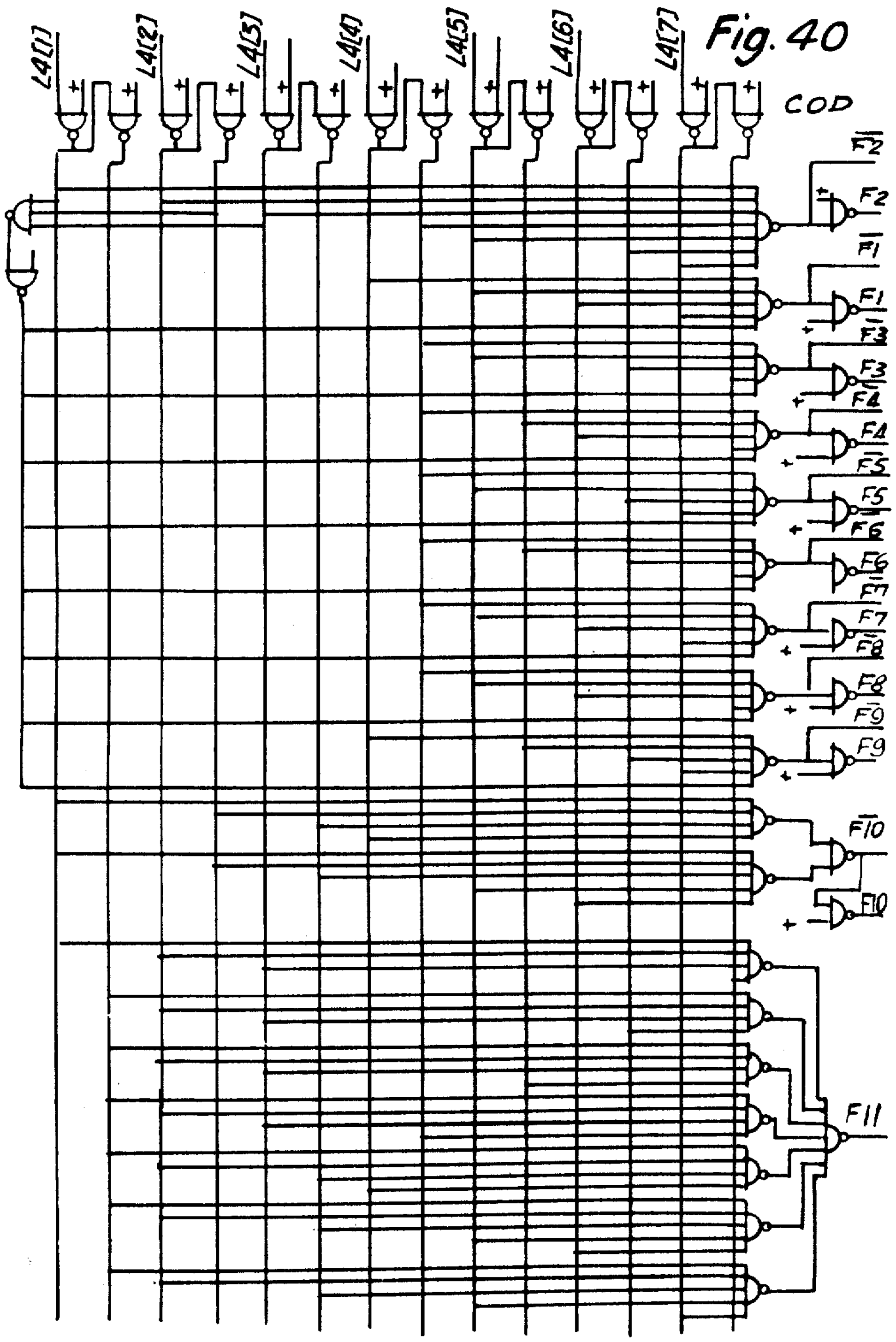
Figure 41A:
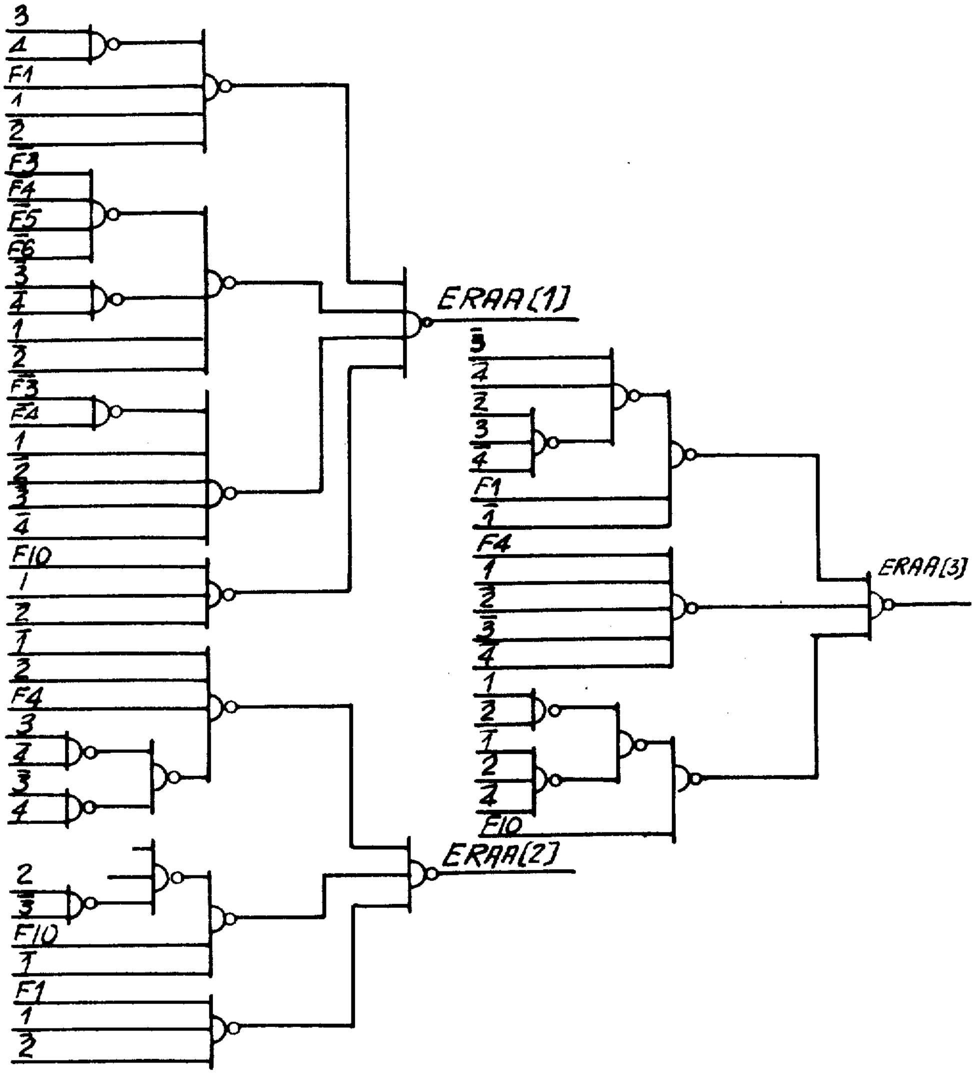
Figure 41B:
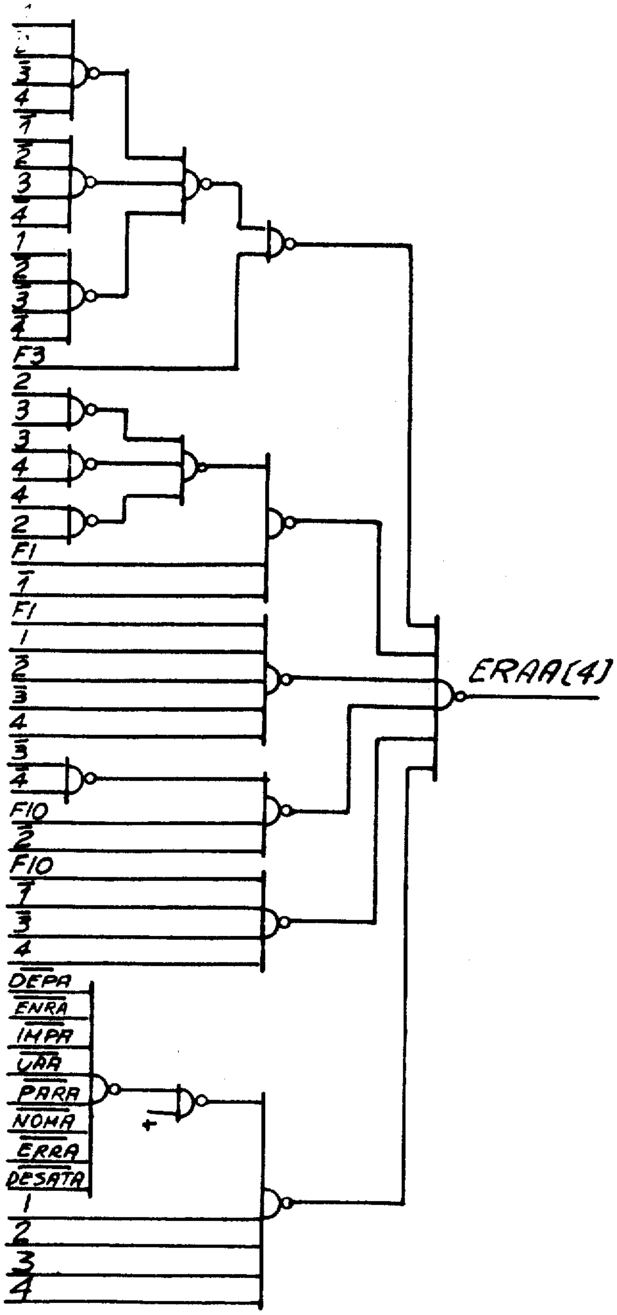
Figure 41C:
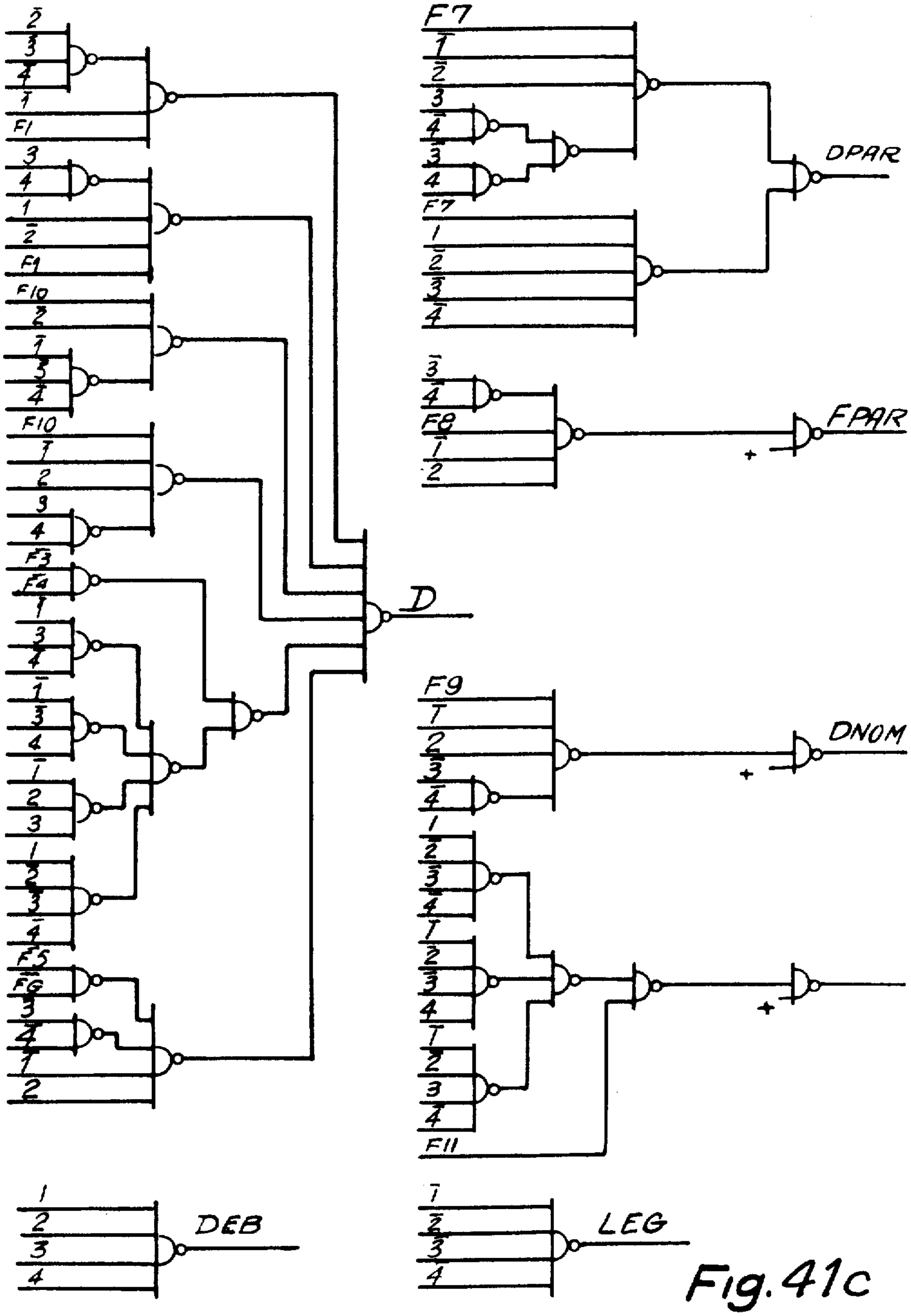
Figure 41D:
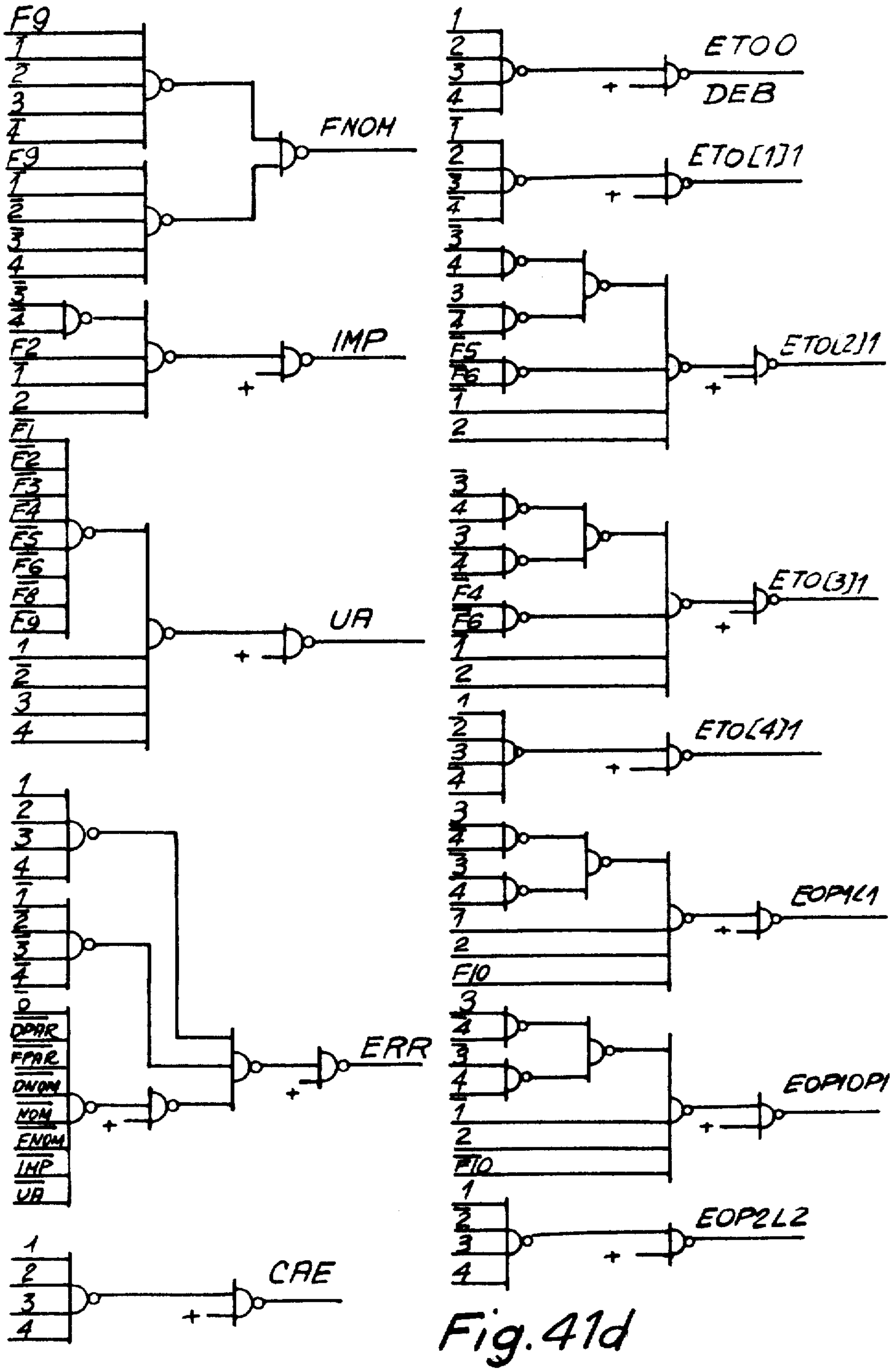

The coding block COD (1904, FIG. 19) converts the logic date coming from the group L4 in the interconnection channel (L4 [1], L4 [2] to L4 [7] into an eleven position code F1 to F11 on the group of conducting wires 1905 in accordance with the logic forms of FIG. 21. The names of variables L4 [1] to L4 [7] are abbreviated in accordance with a convention which has already been given but which is limited in scope to each circuit, in 1 to 7. The circuits enabling these forms to be produced are made up, as a non-limiting example, with the aid of "nand" groups, which are well known to the specialists and are shown in FIG. 40 in the most usual conventional form.

Figure 42:
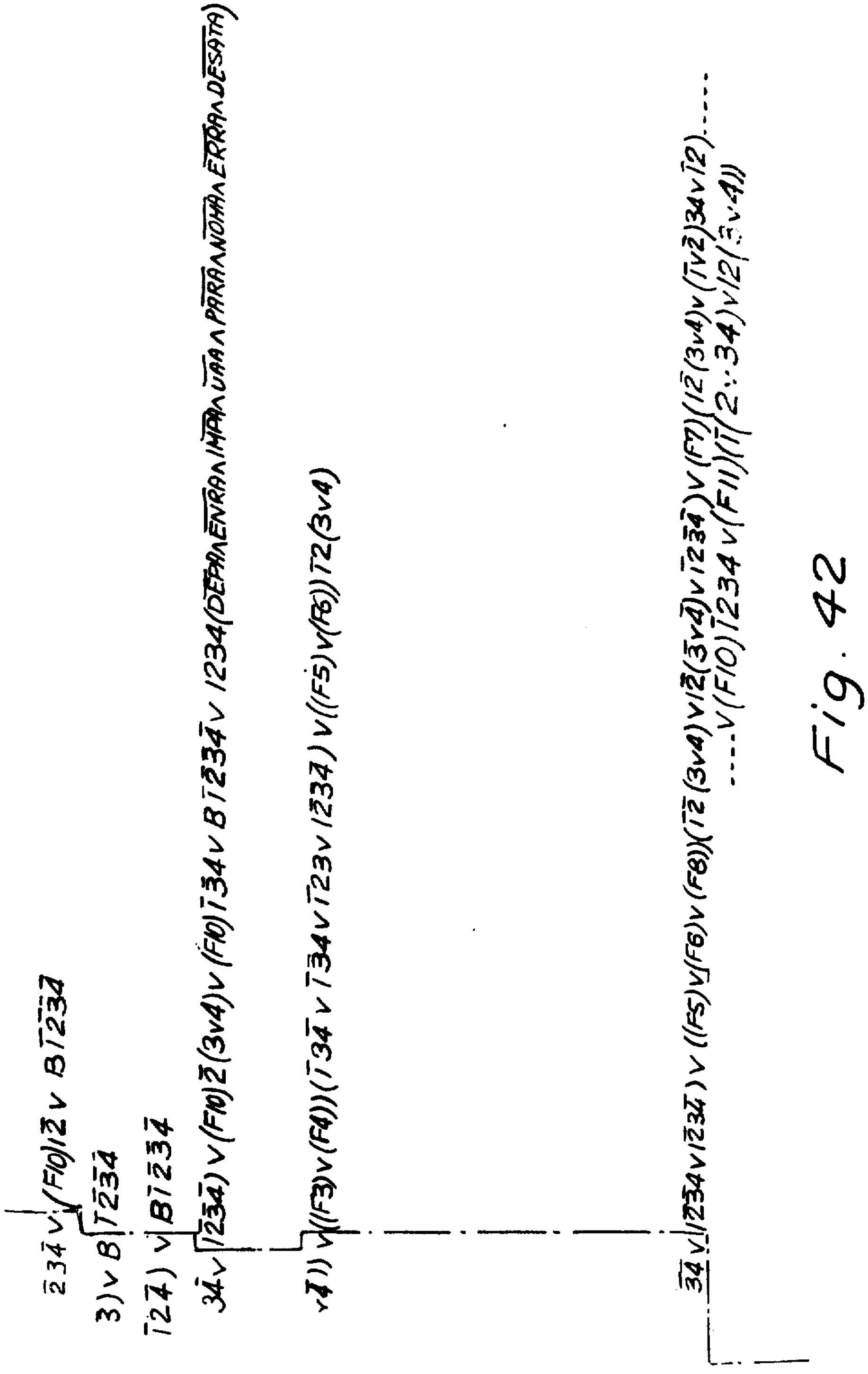

The circuits giving the four forms that define the values of the elements of the register RAA are shown in FIGS. **41*a* and 41*d*, together with the circuits producing the instructions and transfer instructions in the forms indicated in the table of FIG. 42** from the fifth line onwards.

Figure 43A:
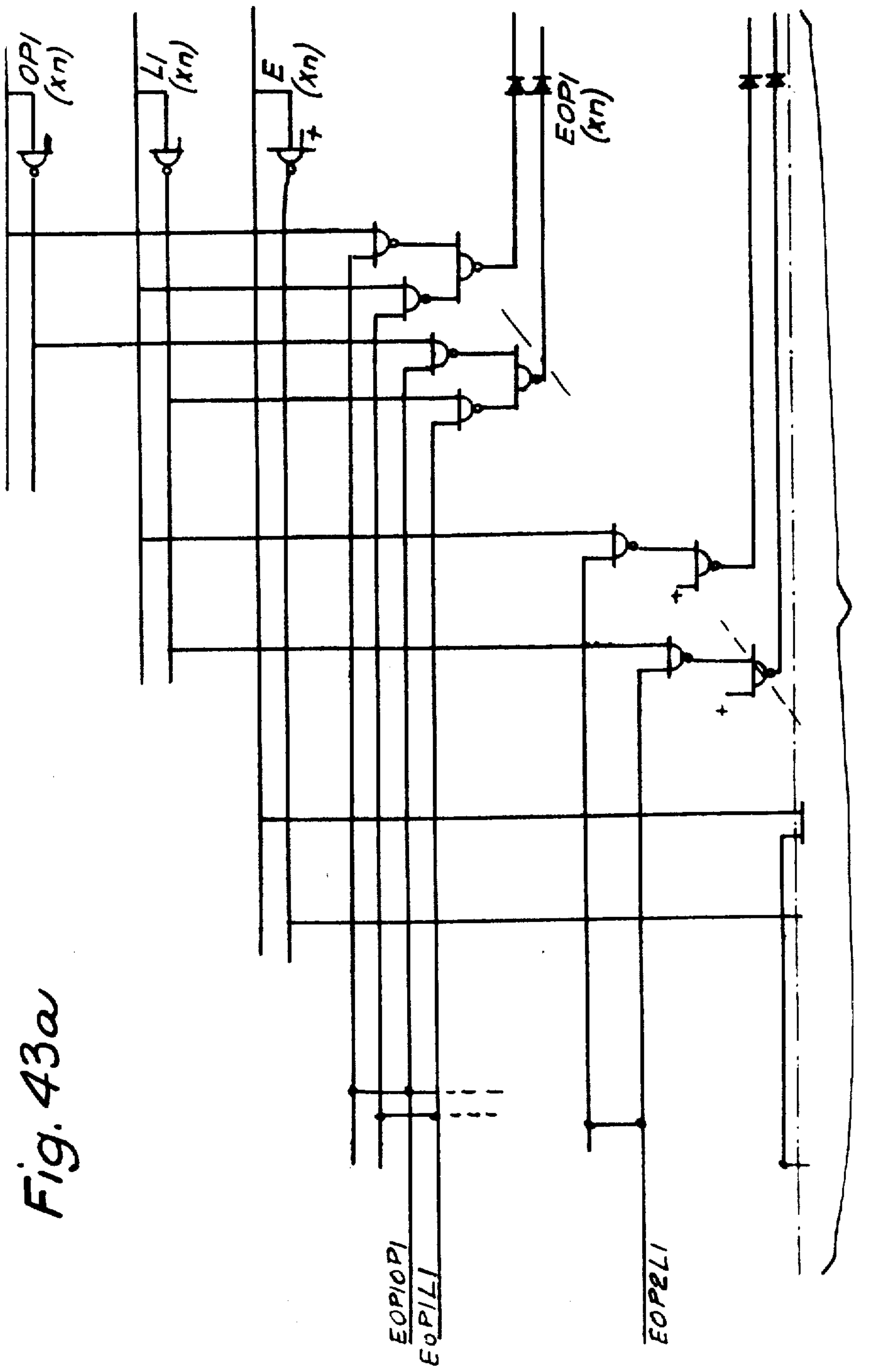
Figure 43B:
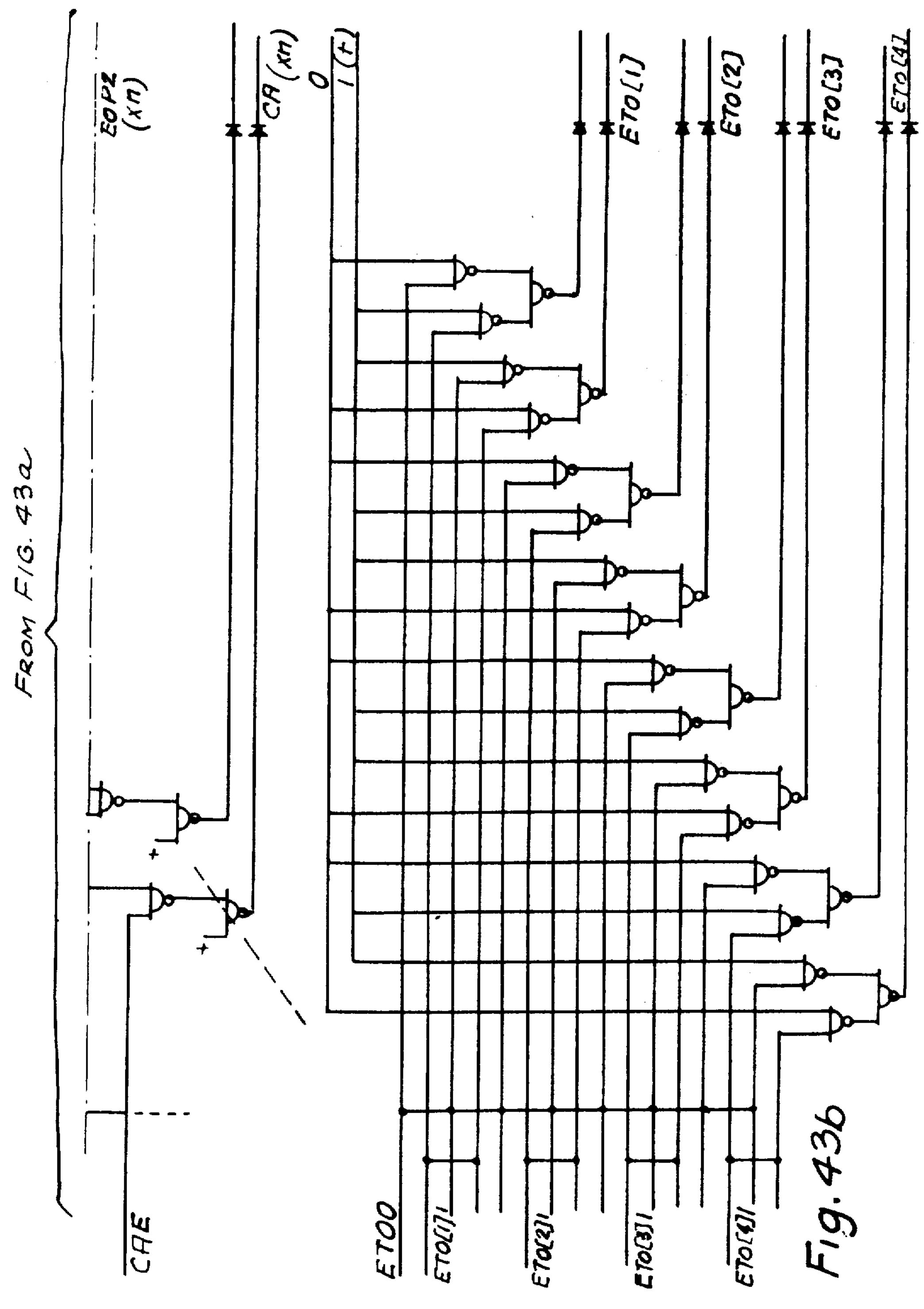

The switching circuits properly speaking which, on receiving transfer instructions such as EOP1L1, EOP1OP1, EOP2L1, CAE (see the last four lines of the table in FIG. 42), effectively allow the transfers described by EOP1 ← L1, EOP1 ← OP1, EOP2 ← L1 and CA ← E are represented by the FIGS. 43a and 43b.

Figure 44:
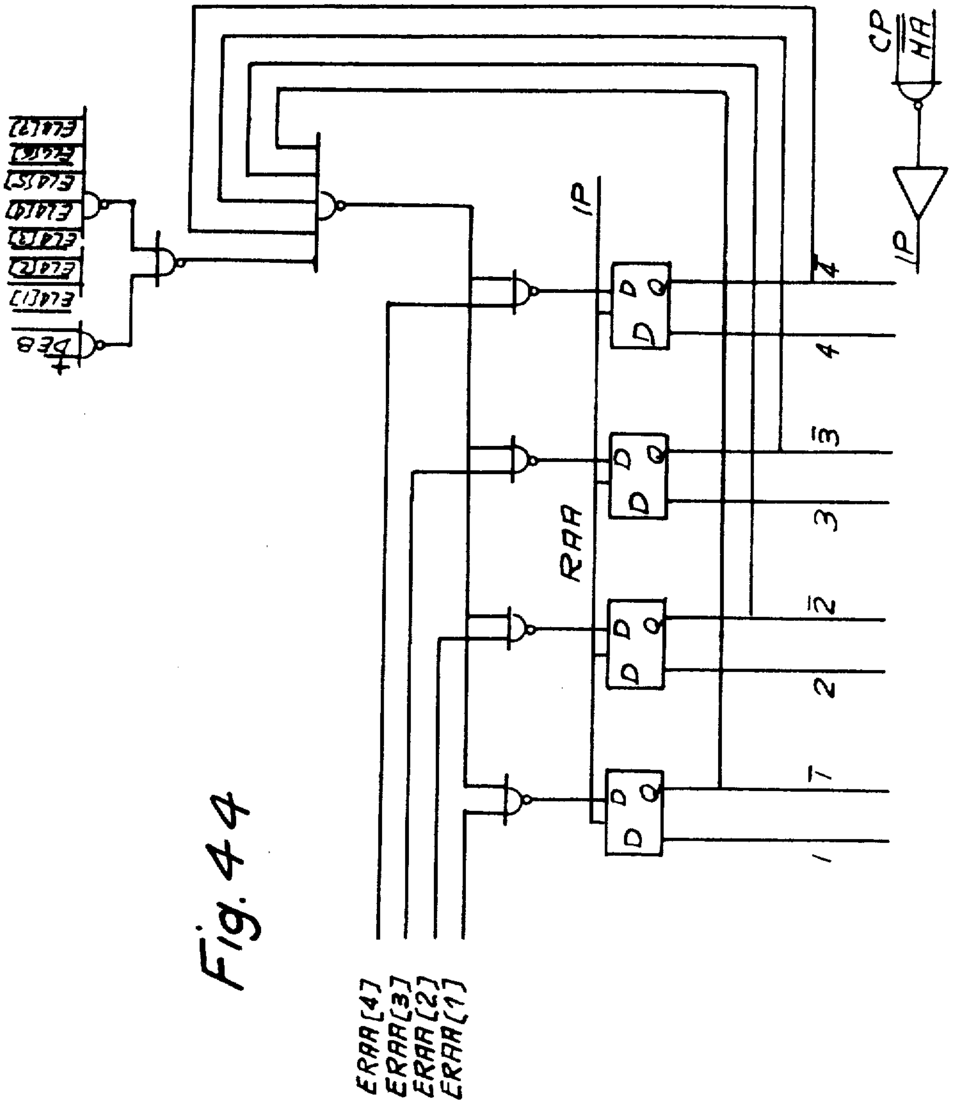

The detection circuits recognizing the symbol NL on the input group EL4 of the register L linking the memory and activating the sequential circuit 1909 of FIG. 19 are shown in detail in FIG. 44. It is appropriate to remember on this subject that the expression EL4 = 0001010, equivalent to (EL4 [1] = 0) and (EL4 [2] = 0) and (EL4 [3] = 0) and (EL4 [4] = 1) and (EL4 [5] = 0) and (EL4 [6] = 1) and (EL4 [7] = 0) will be translated by the boolean form analogous to F2 of the table in FIG. 21, already produced in the coder circuit of FIG. 40.

It should be noted carefully that the triggering of the sequential circuit can only be carried out if RAA = 0 on the one hand and none of the other sequential logic devices are operating on the other. The accidental or prolonged pressing of the NL key therefore has no effect on the carrying out of an evaluation since its effect is in logic addition with the signal DEB emitted by the majority of the sequential logic devices when they finish their particular work.

Also, distribution of the synchronizing pulse IP can be carried out if the memory is inoperative, state charecterised by a signal MA of logic zero level that prevents any accidental change in the register RAA during the execution of the memory cycles properly speaking.

Another example of the assembly of the sequential logic circuit as in FIG. 13, referenced ENR may be considered; its purpose is to record as they are printed out the various successive symbols of an expression in the evaluation chain in accordance with the table of sequences in FIG. 10.

The length of the commands of types LEG or H1 is variable and a signal MA, emitted on the standardizes interconnection channel is at logic 1 level as long as the reading or linking cycle carried out by the link memory is not completed.

Figure 46:
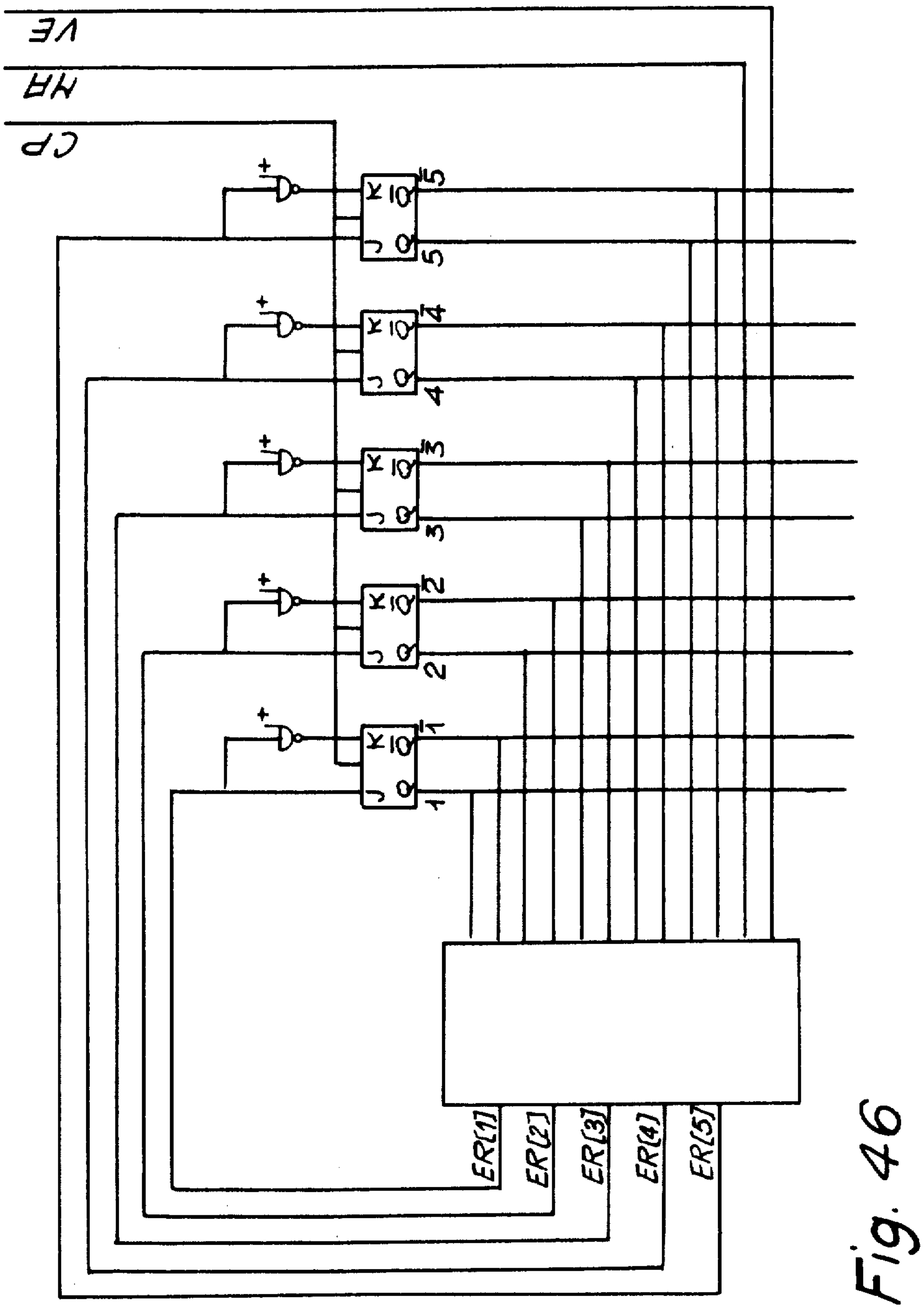

Any change in the state register proper to the sequential logic circuit being considered can therefore only be accepted if MA = 0, the memory having finished its work cycle. If type D flip-flops are used, the entry of synchronizing pulses IP must be prevented as long as MA = 1. This is the solution retained as a non-limiting example for the sequential logic circuit of the arithmetical analyzer. However, the use of type JK flip-flops both for the arithmetical analyzer and for the sequence registers of the other sequential circuits is not outside the framework of the invention. Prevention of changes then appears explicitly in the transfer expressions, the corresponding boolean definition forms of the successor states and the transfer instruction while it is accepted that the synchronizing pulse remains distributed permanently in time. In exchange, the boolean forms which are the reciprocals of those defined in FIG. 45 with respect to ER [1], ER [2], ER [3], ER [4] and ER [5] in accordance with the partial schematic of FIG. 46 which only concerns the flip-flops have to be materialized, the rest being of the same nature as the circuits described in the schematics 6-3-4-1, 6-3-7-1 and 6-3-10-1;

Referring to FIG. 45, line 0, a nul signal VE (of logic zero value) rerecords 0000 in the five flip-flops of the register R at each general synchronizing pulse IP and the recording of 00001, which really triggers the process of recording a symbol, cannot occur unless VE = 1; i.e. unless the circuits of the electric typewriter emit on the appropriate conducting wire a valid transmission signal.

In the same way, referring for example to the state of line 21, the linking command H1 is emitted and, in accordance with the text of the state of line 22, register R remains always in the state 10110 during the twenty synchronizing periods during which the link memory remains operative (this is characterized by MA = 1). During this time also, the flip-flop ENRA cannot be reset to zero, the corresponding command being cut off by $\overline{MA}$ which is then worth zero.

The computer device, which is the subject of the invention, can be used in all cases in which the use of a classical computer with instruction catalogue and adressing of constant dimension memory cells is necessary or advantageous. Provided with an adequate assembly of specialized sequential logic circuits analogous to those which are the subject of a detailed description in the present application, it allows in particular the rapid adjustment of programs by the immediate presentation of partial or complete results or errors and, due to this, reduces the preponderant and increasing part that program preparation takes with respect to execution in the investments users apply to data processing.

By the introduction and direct presentation of data, programs and results, the changes in supports such as the perforation of cards or tape and the parts of the program dealing with the direct and converse conversion of the codes specific to classical computers into alphanumerical codes are almost inexistent.

In the same way, the difficult problems which programmers have to resolve when, in classical computers not only data, programs and results specific to the user but also the various segments of operational programs such as assemblers, compilers, editors and monitors, coexist in variable and unforseen ways.

The immediate presentation of errors in the source language, i.e. the language used directly by the user is a precious advantage which is only found at present when a classical computer, provided with the numerous operational programs necessary, operates in the "interpreting" mode. It is known, in the present state of the art, that such an operation for the same computer results in executional speeds several tens of times smaller than those of the execution of classical compiled programs or "object programs." This disadvantage is eliminated in the computer devices analogous to the one described in the present application, provided that the comparison is made between classical computers and devices satisfying the present invention which are fitted with arithmetical units of the same speed and capacity.

One of the essential means of the present invention is the sequential logic circuit for name processing. In association with the linked cell memory, another essential means, it enables an algebraical number, of arbitrary length limited at first sight by the number of elements available in the memory, to be made to correspond a series of letters whose length is subject to the same limitations.

If it is admitted that the number in question results from a definite coding of a given text, the recording of a certain quantity of these couples of series of letters and numbers, conjugated with the rapidity of access, modification, print-out or erasure of these couples, enables rapid devices for filing and processing data to be produced. The hierarchic and lexicographic structure, described in particular on page 12 and the following pages as well as in FIG. 2 and its annexes, enables the data to be sorted in accordance with the series of letters considered as names (or labels) of variables or filing keys.

A computer device complying with or analogous to the description given in the present application reduces considerably the cost of studies and applications of sorting operations, operations which form the largest part of data processing applications.

In particular, a device containing only the input/output circuits, the name processing circuits and of course the link memory can be used with advantage as a device for the concentration-diffusion of data, device whose use becomes more and more necessary as the remote and timesharing use of banks of data increases.

It is understood that, for the price of the addition of an appropriate sequential logic circuit, the evaluation of an expression can be interrupted, thanks for example to the presence of a special symbol at the beginning and the end of the said expression. The user has therefore every possibility to add to a device satisfying the present invention sequential logic circuits which ensure the filing not only of constants but also of all expressions either calculable or not by simply calling for the name of the expression thus framed by the chosen symbol. The computer device, which is the subject of the present invention, can therefore record every program which can be carried out, the said program being able to be called for, modified or erased just like any declared variable.

It is also understood that, taking into account the similarity of all the sequential logic circuits, which are the means of the present invention, their study, assembly and checking can with advantage be carried out using any automatic means which end in the manufacture of circuits, in particular those called "highly integrated" based on bipolar (transistor) metallic semiconductors or unipolar (field effect devices) based on magnetic films, on logic devices and on supraconducting memory devices or based on circuits containing optical links.

Also, taking into account the identical semantics of a greater number of alphanumerical symbols in the majority of programming languages, the user is perfectly free to make devices satisfying the present invention capable of interpreting and evaluating texts written in different languages.

I claim:

1. A digital computer device for evaluating algebraic expressions without special translation programs, said computer device comprising:

chain memory means for recording, reading and erasing successive symbols of said algebraic expressions in the form of chains of memory elements reference to each other to effectively close said chains even though the elements may not be actually consecutively located in said chain memory means, specialized function means comprising at least one sequential logic module for recognizing and evaluating said algebraic expressions and for controlling said recording, reading and erasing of chains in said chain memory means, and standardized communication channel means including a group of electrical wires adapted for interconnection between said chain memory means and different elements of said specialized function means at any desired place along said wires, the interconnection with particular ones of said wires being defined by the physical distribution of the wires and the temporal and logic characteristics of the sequential logic modules.

2. A digital computer device as in claim 1 wherein said specialized function means comprises:

a chain starting sequential logic module means for producing starting chain structures in said chain memory means in response to a start signal from said standardized communication channel, a chain filling sequential logic module means for filling said starting chain structures with recorded data input to said computer device, and a chain output sequential logic module means for reading out data in predetermined ones of said chains upon command.

3. A digital computer device as in claim 2 wherein said specialized function means further comprises:

expression recognition logic means for recognizing the existence of predetermined algebraic expressions in said chains, for automatically routing said expressions to appropriate other parts of said specialized function means and for thereafter replacing said predetermined algebraic expressions with corresponding simplified expressions.

4. A digital computer device as in claim 3 wherein said specialized function means further comprises:

an arithmetic unit means for evaluating predetermined algebraic expressions.

5. A digital computer device as in claim 4 wherein said specialized function means further comprises:

bracket processing sequential logic module means for automatically recognizing both left and right hand brackets in algebraic expressions and for thereupon generating processing commands to insure the proper evaluation of such expressions.

6. A digital computer device as in claim 1 wherein said specialized function means comprises:

name recognition sequential logic module means for automatically recognizing names of variables, memory reading sequential logic module means for automatically reading a series of symbols from said chain memory means representing a numerical constant associated with the name of a recognized variable when the expression being evaluated implies such a recording, substitution sequential logic module means for substituting said series of symbols for said recognized variable in said chain memory means, and erasure sequential logic module means for erasing from said chain memory means the couple formed by the name of a variable and the numerical constant associated therewith, said modules being arranged to rapidly produce, maintain and extract names of variables associated with articles in files.

7. A digital computer device as in claim 1 wherein said specialized function means comprises:

name recognition sequential logic module means for automatically recognizing names of variables, memory reading sequential logic module means for automatically reading a series of symbols from said chain memory means representing a numerical constant associated with the name of a recognized variable when the expression being evaluated implies such a recording, substitution sequential logic module means for substituting said series of symbols for said recognized variable in said chain memory means, erasure sequential logic module means for erasing from said chain memory means the couple formed by the name of a variable and the numerical constant associated therewith, and bracket processing sequential logic module means for automatically recognizing both left and right-hand brackets in algebraic expressions and for thereupon generating appropriate processing commands to insure the proper evaluation of such expressions.

8. A digital computer device as in claim 1 wherein said specialized function means also includes sequential logic circuits in the form of electrical non-destructively read memory systems.

* * * * *

UNITED STATES PATENT OFFICE
CERTIFICATE OF CORRECTION

Patent No. 3,725,869 Dated April 3, 1973

Inventor(s) Boris Alexandre Sokoloff

It is certified that error appears in the above-identified patent and that said Letters Patent are hereby corrected as shown below:

In the heading:

Please add

--[30] Foreign Application Priority Data
November 25, 1969 France....69-40-531--

Signed and sealed this 15th day of July 1975.

(SEAL)
Attest:

RUTH C. MASON
Attesting Officer

C. MARSHALL DANN
Commissioner of Patents
and Trademarks